(12) United States Patent
Olson

(10) Patent No.: US 12,473,158 B2
(45) Date of Patent: Nov. 18, 2025

(54) SWEEP SYSTEM FOR GRAIN BINS

(71) Applicant: Sukup Manufacturing Co., Sheffield, IA (US)

(72) Inventor: Ryan Thomas Olson, Dows, IA (US)

(73) Assignee: Sukup Manufacturing Co., Sheffield, IA (US)

(*) Notice: Subject to any disclaimer, the term of this patent is extended or adjusted under 35 U.S.C. 154(b) by 257 days.

(21) Appl. No.: 18/323,827

(22) Filed: May 25, 2023

(65) Prior Publication Data
US 2023/0391565 A1 Dec. 7, 2023

Related U.S. Application Data

(60) Provisional application No. 63/347,755, filed on Jun. 1, 2022.

(51) Int. Cl.
B65G 65/48 (2006.01)
B65G 65/46 (2006.01)
B65G 69/08 (2006.01)

(52) U.S. Cl.
CPC ....... *B65G 65/4836* (2013.01); *B65G 65/466* (2013.01); *B65G 69/08* (2013.01); *B65G 65/4854* (2013.01)

(58) Field of Classification Search
CPC .. B65G 69/08; B65G 65/466; B65G 65/4854; B65G 65/4836; B65G 65/48
USPC ...................................................... 198/510.1
See application file for complete search history.

(56) References Cited

U.S. PATENT DOCUMENTS

| 2,998,123 | A | 8/1961 | Kooiker et al. |
| 3,014,575 | A | 12/1961 | Klein |
| 3,057,608 | A | 10/1962 | Patz et al. |
| 3,064,831 | A | 11/1962 | Cook |
| 3,151,749 | A | 10/1964 | Long |
| 3,175,676 | A | 3/1965 | Vander Schaaf |

(Continued)

FOREIGN PATENT DOCUMENTS

| BR | 112016008674 A2 | 9/2017 |
| CA | 2927760 A1 | 4/2015 |

(Continued)

OTHER PUBLICATIONS

Brock, 16:1 Reduction Wheel Upgrade Kit S055938 for Bin Sweeps, All pages, Oct. 2016, Milford Indiana.

(Continued)

*Primary Examiner* — James R Bidwell
(74) *Attorney, Agent, or Firm* — Christopher A. Proskey; BrownWinick Law Firm

(57) ABSTRACT

A sweep system having for removal of grain from a grain bin is presented. The sweep system has an elongated body extending a length between an inward end and an outward end and having a leading side and a trailing side. The elongated body is connected to a pivot point at the center of the grain bin and is configured to rotate around the pivot point. An agitator is connected to the outward end of the elongated body and is configured to agitate grain as the elongated body rotates around the pivot point. In one or more arrangements, the agitator is configured to support the sweep system on a floor of the grain bin. In one or more arrangements, the agitator is configured to move the sweep system forward during operation to facilitate rotation of the sweep system.

41 Claims, 86 Drawing Sheets

(56) References Cited

U.S. PATENT DOCUMENTS

| | | |
|---|---|---|
| 3,356,235 A | 12/1967 | Ladig |
| 3,394,825 A | 7/1968 | Reed |
| 3,532,232 A | 10/1970 | Sukup |
| 3,538,618 A | 11/1970 | Neuenschwander |
| 3,648,660 A | 3/1972 | Wennberg |
| 3,749,259 A | 7/1973 | Stock |
| 3,755,917 A | 9/1973 | Lambert, Jr. |
| 3,800,964 A | 4/1974 | Patterson |
| 3,851,774 A | 12/1974 | Laidig |
| 3,974,908 A | 8/1976 | Keichinger |
| 4,008,816 A | 2/1977 | Harrison |
| 4,029,219 A | 6/1977 | Rutten |
| 4,057,151 A | 11/1977 | Weaver |
| 4,063,654 A | 12/1977 | Shivvers |
| 4,103,788 A | 8/1978 | Sutton |
| 4,142,621 A | 3/1979 | Oliver |
| 4,183,706 A | 1/1980 | Jackson |
| 4,286,909 A | 9/1981 | Tingskog |
| 4,578,012 A | 3/1986 | Petit |
| 4,583,903 A | 4/1986 | Hutchison |
| 4,585,385 A | 4/1986 | Buschbom |
| 4,701,093 A | 10/1987 | Meyer |
| 5,099,983 A | 3/1992 | Valdez |
| 5,167,318 A | 12/1992 | Siemens |
| 5,988,358 A | 11/1999 | Jonkka |
| 6,431,810 B1 | 8/2002 | Weaver |
| 6,499,930 B1 | 12/2002 | Dixon |
| 8,210,342 B2 | 7/2012 | Lepp |
| 8,616,823 B1 | 12/2013 | Hoogestraat |
| 8,739,479 B1 | 6/2014 | Nelson et al. |
| 8,770,388 B1 | 7/2014 | Chaon |
| 8,850,758 B1 | 10/2014 | Nelson et al. |
| 8,959,846 B2 | 2/2015 | Polzin et al. |
| 8,967,936 B2 | 3/2015 | Sukup |
| 8,967,937 B2 | 3/2015 | Schuelke et al. |
| 9,055,717 B2 | 6/2015 | Stumpe et al. |
| 9,137,950 B1 | 9/2015 | Stumpe et al. |
| 9,156,608 B1 | 10/2015 | Skaife |
| 9,156,622 B1 | 10/2015 | Chaon |
| 9,199,807 B1 | 12/2015 | Schuelke |
| 9,288,946 B1 | 3/2016 | Schuld |
| 9,290,335 B1 | 3/2016 | Witt |
| 9,327,921 B1 | 5/2016 | Olson |
| 9,546,055 B2 | 1/2017 | Hoogestraat |
| 9,650,217 B1 | 5/2017 | Hoogestraat |
| 9,809,402 B2 | 11/2017 | Nelson et al. |
| 9,815,639 B2 | 11/2017 | Schuelke et al. |
| 9,864,344 B2 | 1/2018 | Nelson et al. |
| 9,975,711 B2 | 5/2018 | Nelson |
| 10,011,442 B2 | 7/2018 | Witt |
| 10,214,361 B2 | 2/2019 | Kaeb |
| 10,220,420 B2 | 3/2019 | Witt |
| 10,220,968 B2 | 3/2019 | Stumpe et al. |
| 10,227,188 B1 | 3/2019 | Chaon |
| 10,377,573 B2 | 8/2019 | Olson et al. |
| 10,442,641 B2 | 10/2019 | Nelson et al. |
| 10,654,668 B2 | 5/2020 | Olson |
| 10,676,294 B2 | 6/2020 | Harrenstein |
| 10,703,588 B1 | 7/2020 | Schram et al. |
| 10,836,582 B2 | 11/2020 | Olson |
| 11,104,528 B1 | 8/2021 | Bloemendaal et al. |
| 11,111,080 B2 | 9/2021 | Rauser |
| 11,136,205 B2 | 10/2021 | Gutwein |
| 11,267,664 B1 | 3/2022 | Bloemendaal et al. |
| 11,299,358 B1 | 4/2022 | Grass et al. |
| 11,337,374 B2 | 5/2022 | Olson |
| 11,414,281 B2 | 8/2022 | Olson |
| 11,454,444 B1 | 9/2022 | Bloemendaal et al. |
| 11,608,236 B2 | 3/2023 | Olson |
| 11,618,639 B1 | 4/2023 | Grass et al. |
| 11,623,829 B2 | 4/2023 | Bloemendaal |
| 11,708,227 B2 | 7/2023 | Olson |
| 2004/0213650 A1 | 10/2004 | Epp |
| 2004/0228711 A1 | 11/2004 | Hanig |
| 2005/0263372 A1 | 12/2005 | Hollander et al. |
| 2006/0285942 A1 | 12/2006 | Fridgen |
| 2012/0163947 A1 | 6/2012 | Koch |
| 2013/0064629 A1 | 3/2013 | Schuelke |
| 2013/0223960 A1* | 8/2013 | Schoenfeld ............ B65D 88/54 |
| | | 414/292 |
| 2015/0210485 A1 | 7/2015 | Hoogestraat |
| 2016/0107849 A1 | 4/2016 | Olson |
| 2016/0152422 A1 | 6/2016 | Nelson |
| 2017/0158443 A1 | 6/2017 | Harrenstein |
| 2017/0253444 A1* | 9/2017 | Kaeb ..................... B65G 69/08 |
| 2017/0275100 A1 | 9/2017 | Olson |
| 2018/0215559 A1 | 8/2018 | Olson |
| 2018/0237236 A1 | 8/2018 | Klubertanz |
| 2019/0322457 A1 | 10/2019 | Olson et al. |
| 2020/0290826 A1 | 9/2020 | Gutwein |
| 2020/0361726 A1 | 11/2020 | Olson |
| 2021/0051856 A1 | 2/2021 | Olson |
| 2022/0250861 A1 | 8/2022 | Olson et al. |
| 2023/0172112 A1 | 6/2023 | Olson |

FOREIGN PATENT DOCUMENTS

| | | | |
|---|---|---|---|
| CA | 2963634 A1 | 4/2016 | |
| CA | 2764847 C | 4/2019 | |
| CA | 2775932 C | 6/2019 | |
| CA | 3163612 A1 * | 10/2021 | ........... B65G 65/466 |
| CA | 2944342 C | 5/2022 | |
| JP | 63074821 A | 4/1988 | |
| JP | 3463773 B2 * | 11/2003 | ............ B65G 69/08 |
| WO | 2015/057835 A1 | 4/2015 | |
| WO | 2015/120359 A1 | 8/2015 | |
| WO | 2016/057264 A1 | 4/2016 | |
| WO | 2016/141083 A1 | 9/2016 | |

OTHER PUBLICATIONS

Haven Industries, Grain Saver Augers, Brochure, All pages, Jan. 1, 2015, Dexter Minnesota.
Westeel, Easyflow 2 U-Through Unload, Brochure, All pages, Jan. 1, 2015, Winnepeg Manitoba, Canada.
Sioux Steel Company, Newest Sweep Model, Brouchure, All pages, Jan. 1, 2015, Sioux Falls South Dakota.
Hutchinson, New Sweep End Wheel, Brochure, All pages, Jan. 1, 2015, Clay Center Kansas.
Springland Mfg., Automated U-Through Unload Systems, Brochure, All pages, Jan. 1, 2015, Manitoba Canada.
Norstar Industries, Grain Handling Systems, Brochure, All pages, Jan. 1, 2015, Morris Manitoba, Canada.
Brock, Bin sweeps, Brochure, All pages, Jan. 1, 2015, Milford Indiana.
GSI Group, Bin Unloading Systems, Brochure, All pages, Jan. 1, 2015, Assumption Illinois.
Sudenga Industries, Inc., Reduction Sweep Wheel, Brochure, All pages, Jan. 1, 2015, George Iowa.
Neco, Power Sweep Bin Unloading Systems, Brochure, All pages, Jan. 1, 2015, Omaha Nebraska.
Norwood Sales Inc., The Grain Handler, Website screenshots, All pages, Jan. 1, 2015, Horace North Dakota.
United Skid Tracks, Caterpillar 249B Track—Z-Lug, Oct. 4, 2021, Murfreesboro, TN, United States.
United Skid Tracks, Caterpillar Mini Excavators, Caterpillar Tracks, Oct. 4, 2021, Murfreesboro, TN, United States.
Patent Cooperation Treaty, International Search Report for PCT/US2022/045775, Mar. 14, 2023.
Brock Grain Systems, Commercial Bin Sweeps & Controllers, Sep. 30, 2021, Milford, IN, United States.
Norwood Sales Inc., The Grain Handler, Website screenshots, Oct. 2, 2017, Horace North Dakota.
Sukup, Unloading Equipment, Website screenshots, Apr. 1, 2019, Sheffield Iowa.
Sukup, Zero-Entry Commercial Paddle Sweep, Website Screenshots, Feb. 9, 2018, Sheffield Iowa.

* cited by examiner

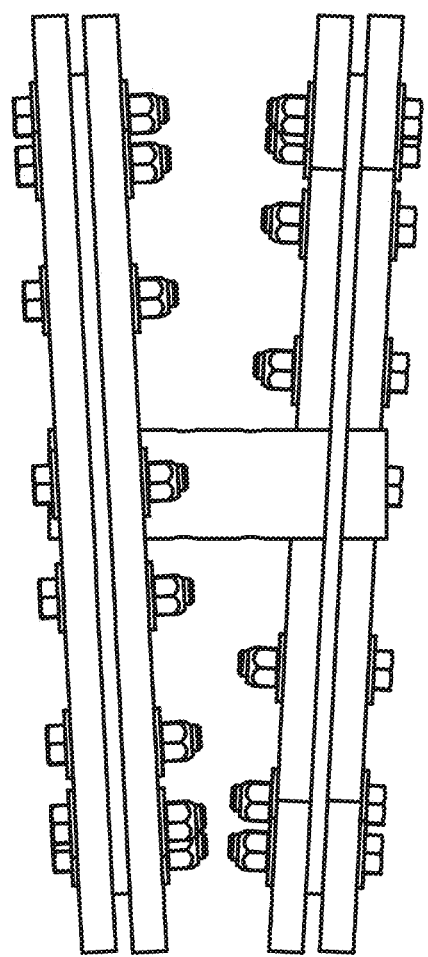
FIG. 65

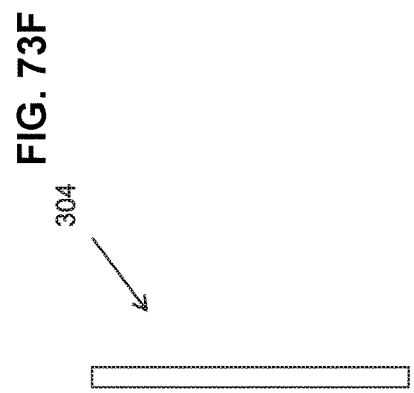
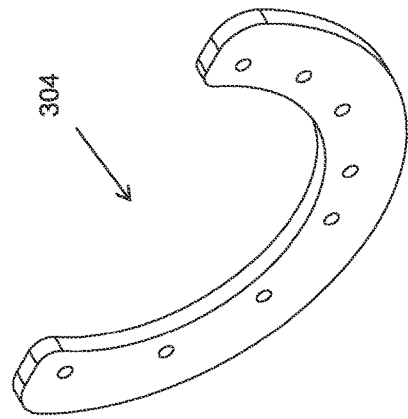
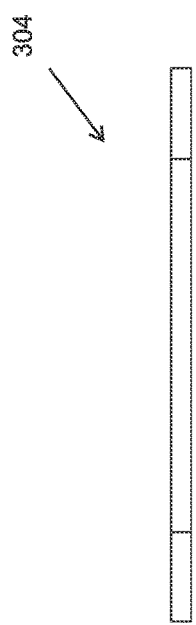
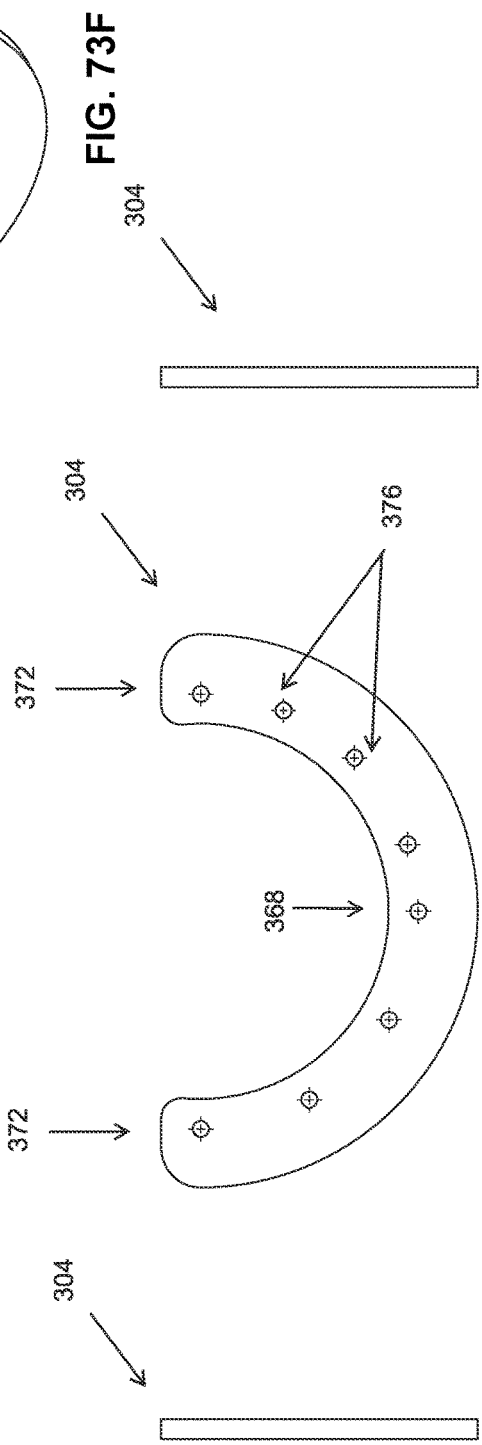

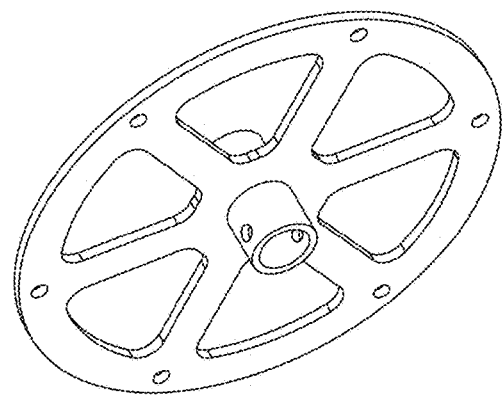
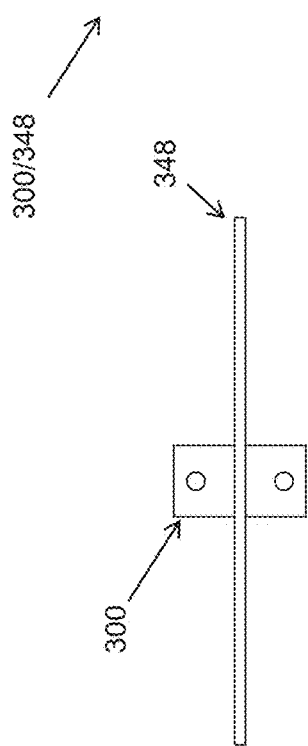
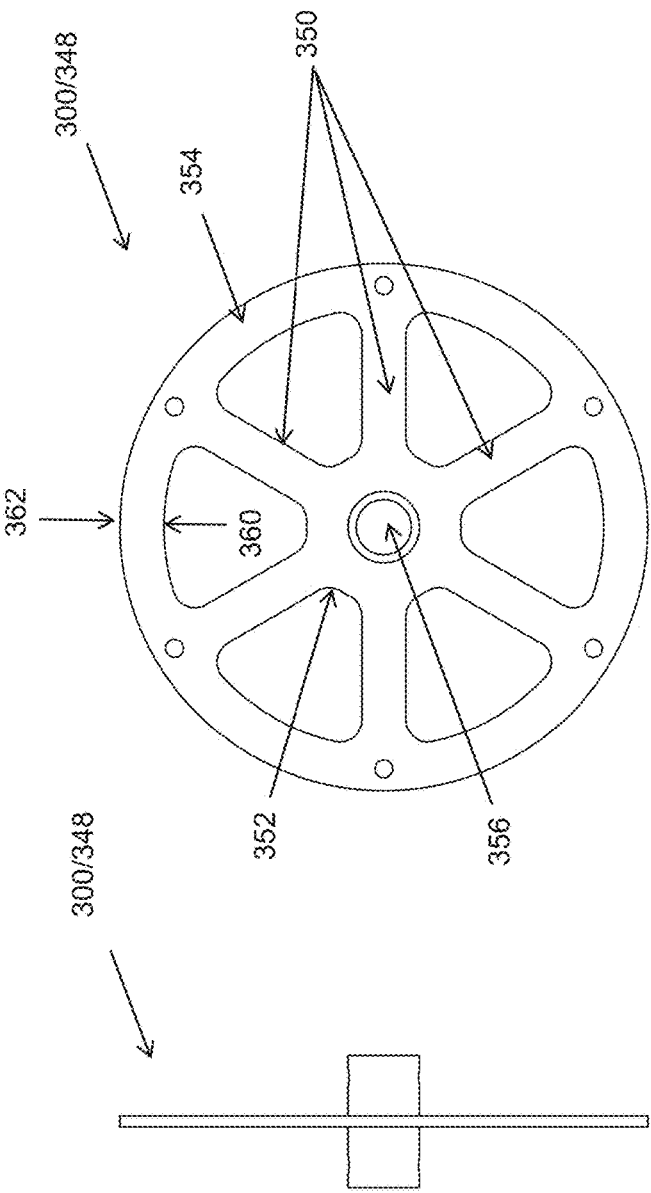
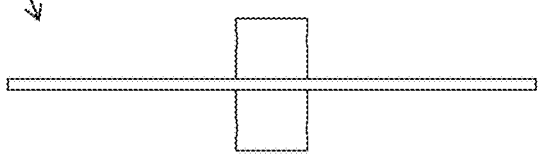

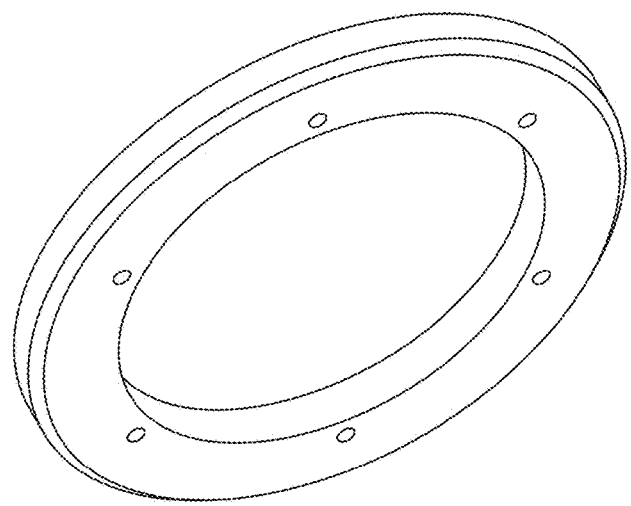
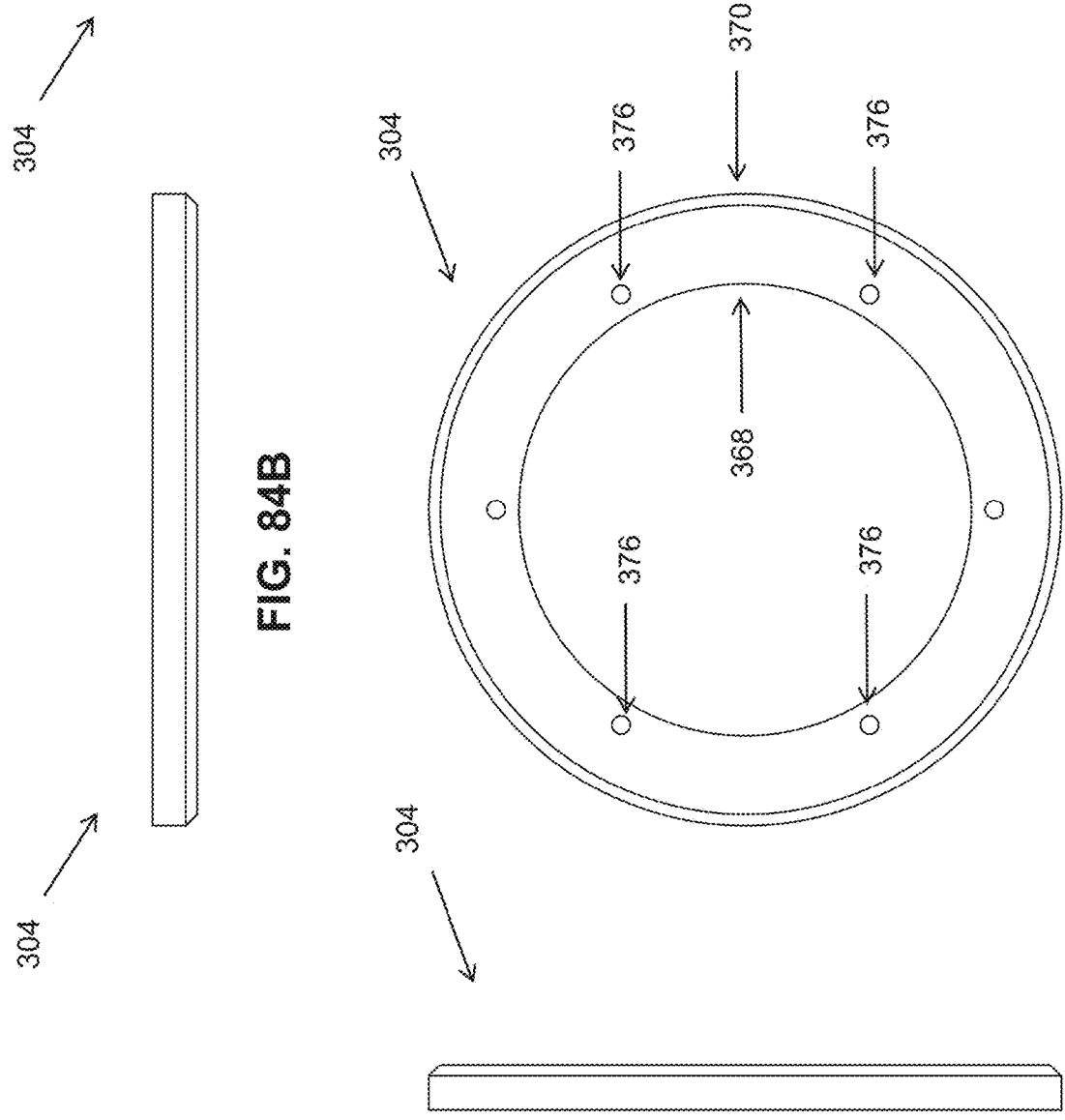

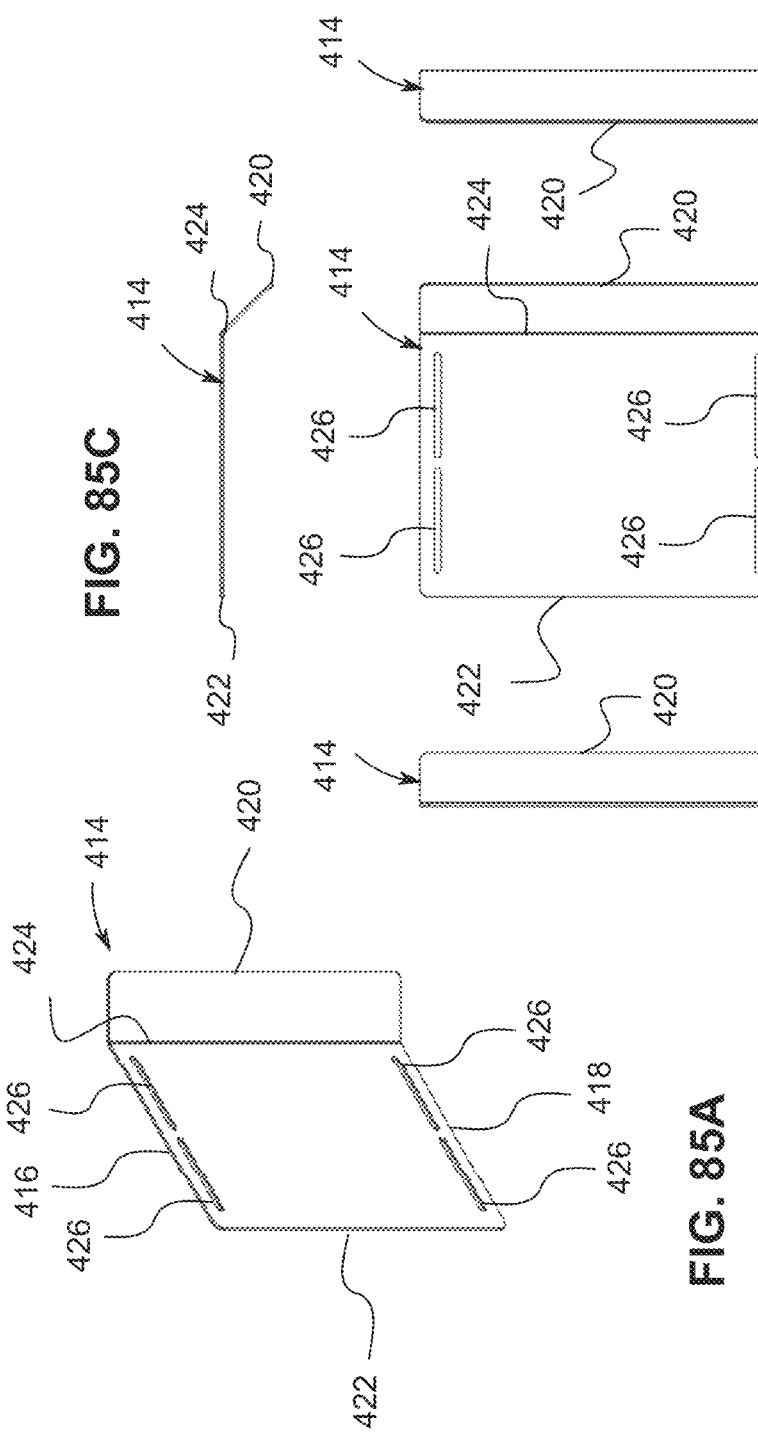

SWEEP SYSTEM FOR GRAIN BINS

CROSS REFERENCE TO RELATED APPLICATIONS

This application claims priority to U.S. Provisional Pat. App. No. 63/347,755 filed Jun. 1, 2022 and titled "SWEEP SYSTEM FOR FULL ELEVATED FLOOR GRAIN BINS", which is fully incorporated by reference herein. This application is also related to U.S. patent application Ser. No. 17/678,670 filed Feb. 23, 2022 and titled "SWEEP SYSTEM FOR FULL ELEVATED FLOOR GRAIN BINS", U.S. patent application Ser. No. 16/997,333 titled "SWEEP SYSTEM FOR FULL ELEVATED FLOOR GRAIN BINS" and published Feb. 25, 2021 as U.S. Pub. No. 2021/0051856, and U.S. Provisional App. No. 63/253,161 filed Oct. 7, 2021 and titled "TRACK DRIVEN SWEEP SYSTEM FOR GRAIN BINS", the entirety of each of which is hereby fully incorporated by reference herein.

FIELD OF THE DISCLOSURE

This disclosure relates to grain storage devices used in agriculture. More specifically and without limitation, this disclosure relates to a sweep system for grain bins.

Overview of the Disclosure

Grain bins are massive structures used to store bulk flowable grain products such as corn, soybeans, wheat, rice, or any other grain products or other material. Conventional grain bins are generally formed in a cylindrical shape with a corrugated sidewall covered by a peaked roof. Grain bins vary in height (ranging from twenty feet high to over a hundred and fifty feet high, or higher). Grain bins vary in diameter, (ranging from eighteen feet in diameter to over a hundred and fifty feet in diameter, or larger). The storage capacity of modern grain bins can range anywhere from a few thousand bushels to well over two million bushels.

Smaller grain bins tend to have an elevated floor formed of a plurality of planks that are supported by a plurality of floor supports that are positioned in spaced alignment to one another. These floor supports rest upon the foundation of the grain bin, which is typically a concrete slab, and provide support to the elevated floor. The space formed between the foundation and the elevated floor facilitates airflow below the elevated floor. Air blown into this space below the elevated floor passes through perforations in the planks of the elevated floor and through the grain stored in the grain bin. In this way, grain stored within the grain bin is conditioned using air flow through the grain. The use of the elevated floor provides many advantages.

Using an elevated floor for larger grain bins becomes problematic due to the immense weight of the grain stored within larger grain bins. As such, in many larger grain bins, the grain sits directly upon the concrete slab that forms the foundation of the grain bin. This arrangement provides the benefit of being strong and rigid. However, this arrangement lacks some of the benefits of an elevated floor, such as airflow through the floor and room beneath the floor for various components.

Grain bins may be unloaded in various ways. Many grain bins include a generally centrally positioned sump that facilitates removal of grain from the grain bin. While this configuration is effective at removing most of the grain from a grain bin, using a centrally positioned sump alone leaves a coned ring of grain that cannot be removed by a centrally positioned sump alone.

To avoid manually shoveling this coned ring of grain out of the grain bin, in many applications sweeps are used. Sweeps travel around the grain bin and help to move grain towards the centrally positioned sump so that the grain may be removed by the sump. In many applications, temporary sweeps are used.

Temporary sweeps require the user to manually install the sweep into the grain bin when the sweep is to be used. Temporary sweeps also require the user to manually remove the sweep after use. Installing and removing a temporary sweep is an undesirable, tedious, difficult, and dangerous task. To avoid manually installing and manually removing temporary sweeps, various configurations of "zero entry sweeps" have been developed.

Zero entry sweeps are configured to remain in the grain bin when it is filled thereby eliminating the need to enter the grain bin to install or remove the sweep from the grain bin. Hence the name "zero entry" as users are not required to enter the grain bin. While zero entry sweeps provide a number of advantages, there are a number of challenges associated with the use of zero entry sweeps. These challenges are exasperated when attempting to provide a zero entry sweep with a grain bin having an elevated floor. This is especially true for larger grain bins that require larger sweeps.

Therefore, for all the reasons stated above, and all the reasons stated below, there is a need in the art for an improved sweep system for grain bins.

Thus, it is a primary object of the disclosure to provide a sweep system for grain bins that improves upon the state of the art.

Another object of the disclosure is to provide a sweep system for grain bins that reduces or eliminates the need for a user to enter the grain bin.

Yet another object of the disclosure is to provide a sweep system for grain bins that works effectively.

Another object of the disclosure is to provide a sweep system for grain bins that is robust.

Yet another object of the disclosure is to provide a sweep system for grain bins that is durable.

Another object of the disclosure is to provide a sweep system for grain bins that can be used with all kinds of grain.

Yet another object of the disclosure is to provide a sweep system for grain bins that has a long useful life.

Another object of the disclosure is to provide a sweep system for grain bins that can be used with an elevated floor without damaging the elevated floor.

Yet another object of the disclosure is to provide a sweep system for grain bins that can be used with paddle sweeps, auger sweeps, or any other configuration of a sweep.

Another object of the disclosure is to provide a sweep system for grain bins that effectively removes the vast majority of grain from the grain bin.

Yet another object of the disclosure is to provide a sweep system for grain bins that is efficient to use.

Another object of the disclosure is to provide a sweep system for grain bins that improves safety.

Yet another object of the disclosure is to provide a sweep system for grain bins can be used with practically any grain bin.

Another object of the disclosure is to provide a sweep system for grain bins that does not cause sagging or collapse of the elevated floor.

Yet another object of the disclosure is to provide a sweep system for grain bins that helps to clear clumps in the grain.

Another object of the disclosure is to provide a sweep system for grain bins that is high quality.

These and other objects, features, or advantages of the disclosure will become apparent from the specification, figures and claims.

SUMMARY OF THE DISCLOSURE

A sweep system having for removal of grain from a grain bin is presented. In one or more arrangements, the sweep system has an elongated body extending a length between an inward end and an outward end and having a leading side and a trailing side. The elongated body is connected to a pivot point at the center of the grain bin and is configured to rotate around the pivot point. An agitator is connected adjacent to the outward end of the elongated body and is configured to agitate grain as the elongated body rotates around the pivot point. In one or more arrangements, the agitator is configured to support the sweep system on a floor of the grain bin. In one or more arrangements, the agitator is configured to move the sweep system forward during operation to facilitate rotation of the sweep system. In one or more arrangements, the agitator is configured to move the sweep system forward by engaging the floor of the sweep system in a manner to apply rearward frictional forces as agitator is rotated.

BRIEF DESCRIPTION OF THE DRAWINGS

FIG. 65 shows a bottom view of a segmented agitator for use with a sweep system, in accordance with one or more embodiments.

FIG. 73A shows a left side view of a rim member a segmented agitator for use with a sweep system, in accordance with one or more embodiments.

FIG. 73B shows a top view of a rim member a segmented agitator for use with a sweep system, in accordance with one or more embodiments.

FIG. 73C shows a front view of a rim member a segmented agitator for use with a sweep system, in accordance with one or more embodiments.

FIG. 73D shows a bottom view of a rim member a segmented agitator for use with a sweep system, in accordance with one or more embodiments.

FIG. 73E shows a right side view of a rim member a segmented agitator for use with a sweep system, in accordance with one or more embodiments.

FIG. 73F shows an upper front left perspective view of a rim member a segmented agitator for use with a sweep system, in accordance with one or more embodiments.

FIG. 83A shows a left side view of a central hub of an agitator for use with a sweep system, in accordance with one or more embodiments.

FIG. 83B shows a top view of a central hub of an agitator for use with a sweep system, in accordance with one or more embodiments.

FIG. 83C shows a front view of a central hub of an agitator for use with a sweep system, in accordance with one or more embodiments.

FIG. 83D shows an upper front left perspective view of a central hub of an agitator for use with a sweep system, in accordance with one or more embodiments.

FIG. 84A shows a left side view of a rim member of an agitator for use with a sweep system, in accordance with one or more embodiments.

FIG. 84B shows a top view of a rim member of an agitator for use with a sweep system, in accordance with one or more embodiments.

FIG. 84C shows a rear view of a rim member of an agitator for use with a sweep system, in accordance with one or more embodiments.

FIG. 84D shows an upper rear right perspective view of a rim member of an agitator for use with a sweep system, in accordance with one or more embodiments.

FIG. 85A shows an upper front right perspective view of a scraper for use with a sweep system, in accordance with one or more embodiments.

FIG. 85B shows a rearward edge view of a scraper for use with a sweep system, in accordance with one or more embodiments.

FIG. 85C shows a top view of a scraper for use with a sweep system, in accordance with one or more embodiments.

FIG. 85D shows an inward side view of a scraper for use with a sweep system, in accordance with one or more embodiments.

FIG. 85E shows a bottom view of a scraper for use with a sweep system, in accordance with one or more embodiments.

FIG. 85F shows a forward edge view of a scraper for use with a sweep system, in accordance with one or more embodiments.

DETAILED DESCRIPTION OF THE DISCLOSURE

Figure 1:
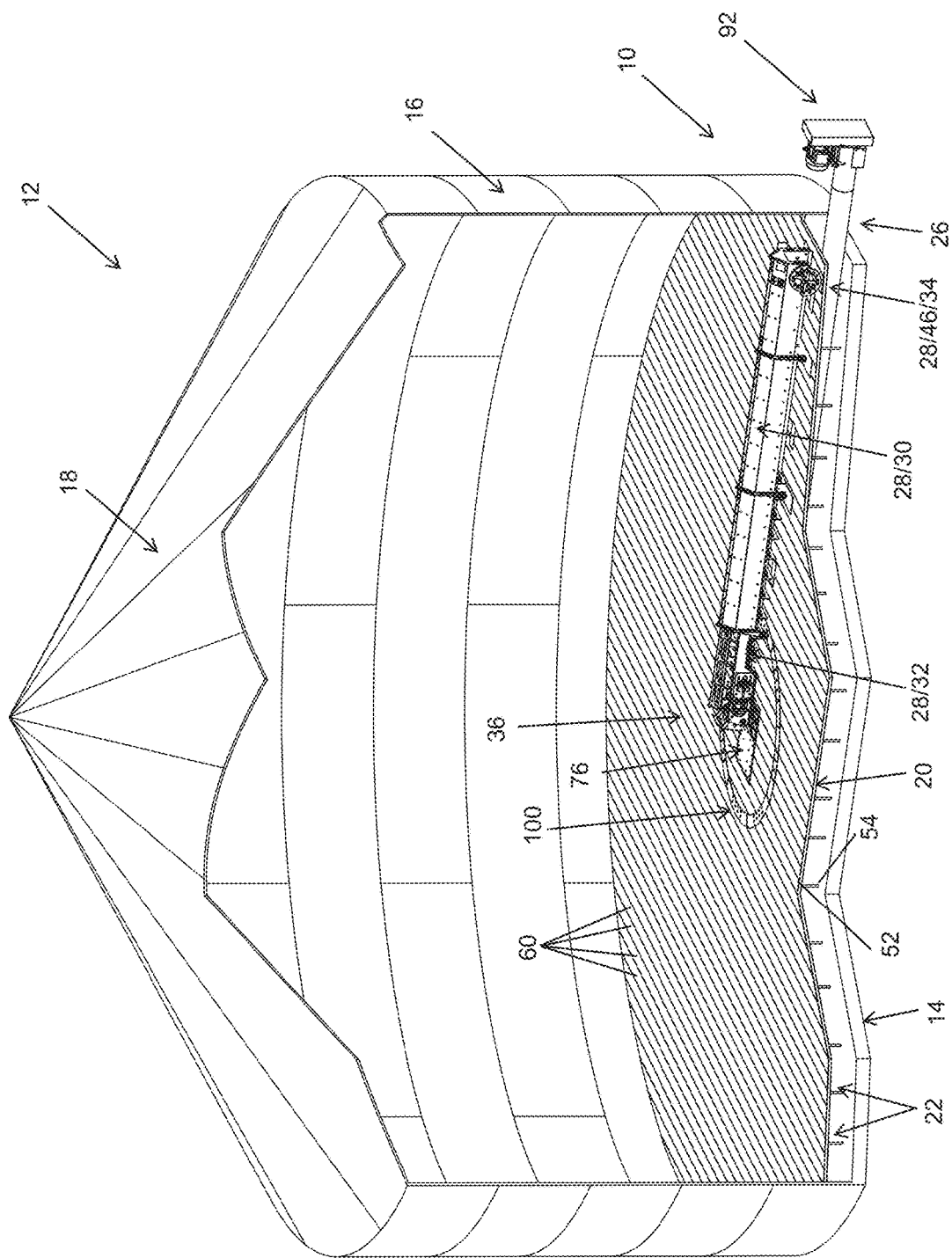
FIG. 1 shows a perspective cut-away elevation view of an exemplary grain bin having an exemplary sweep system, in accordance with one or more embodiments, the view showing a sweep system positioned on top of an elevated floor and just within the sidewall of the grain bin.
Figure 2:
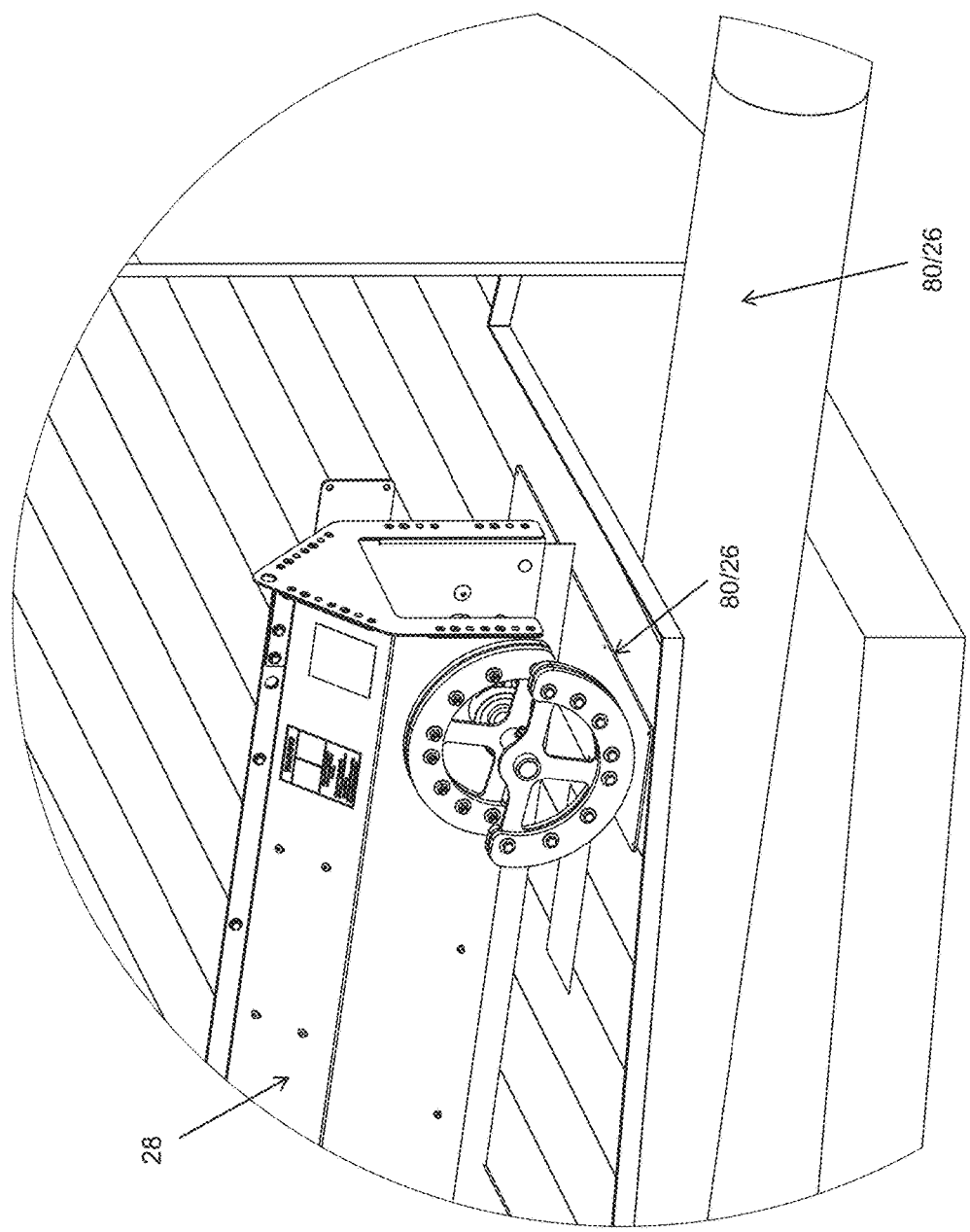
FIG. 2 shows a perspective view of an exemplary sweep system, in accordance with one or more embodiments, the view showing a tail section of the sweep.
Figure 3:
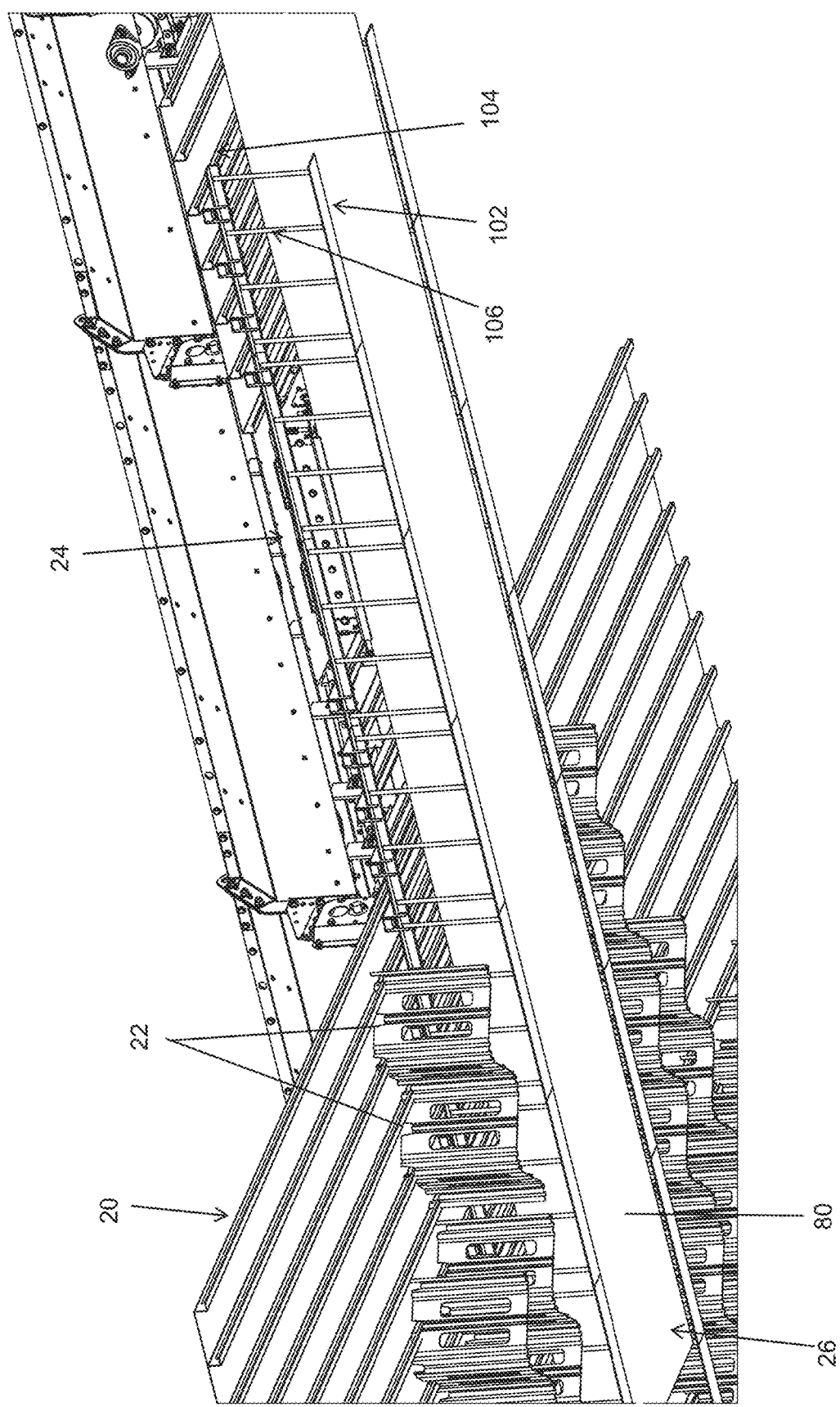
FIG. 3 shows a close up perspective view of an exemplary sweep system, in accordance with one or more embodiments, the view showing the sweep system positioned on top of an elevated floor of a grain bin.
Figure 4:
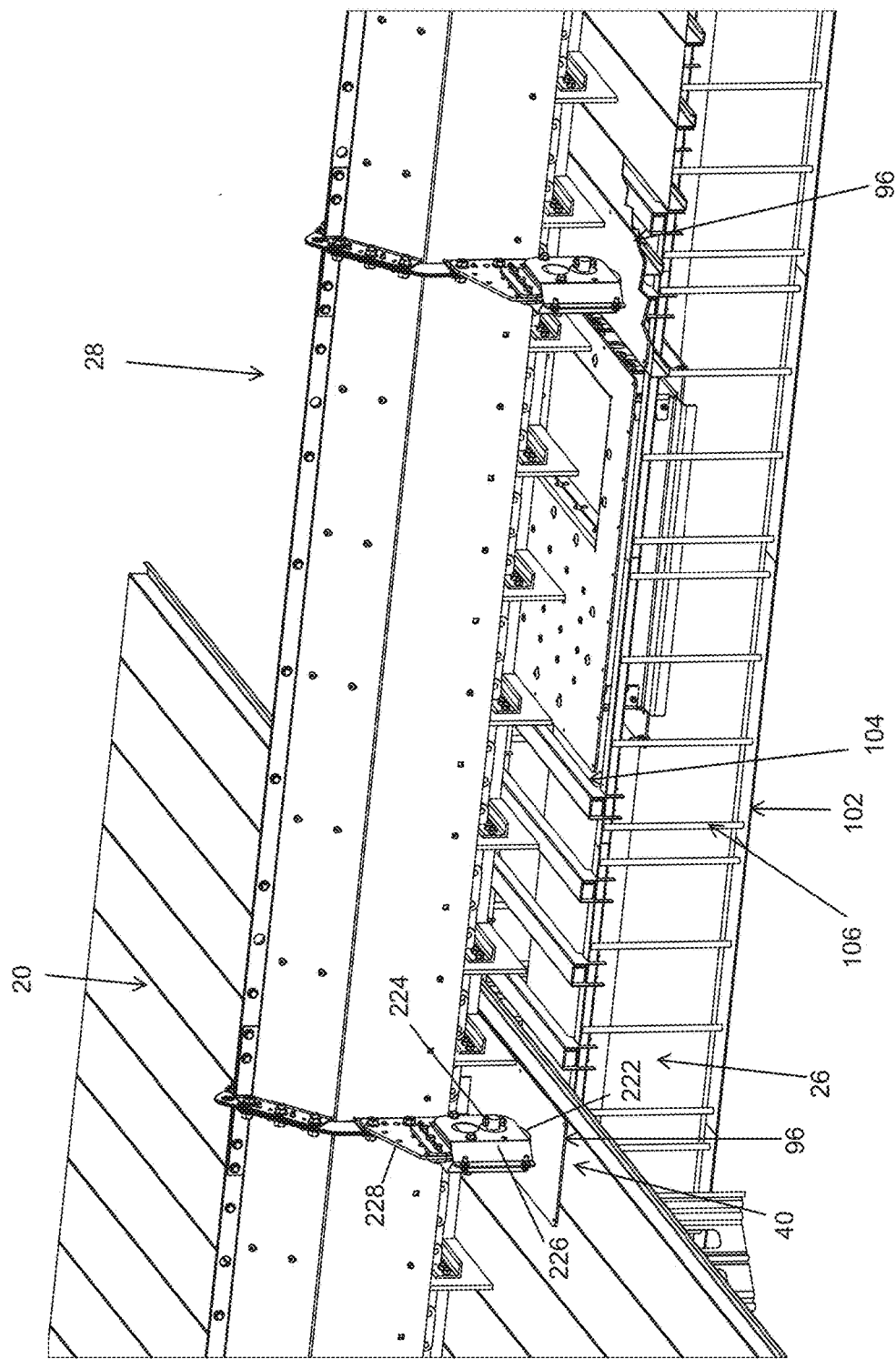
FIG. 4 shows a close up elevation view of an exemplary sweep system, in accordance with one or more embodiments, the view showing the sweep system positioned on top of an elevated floor of a grain bin.
Figure 5:
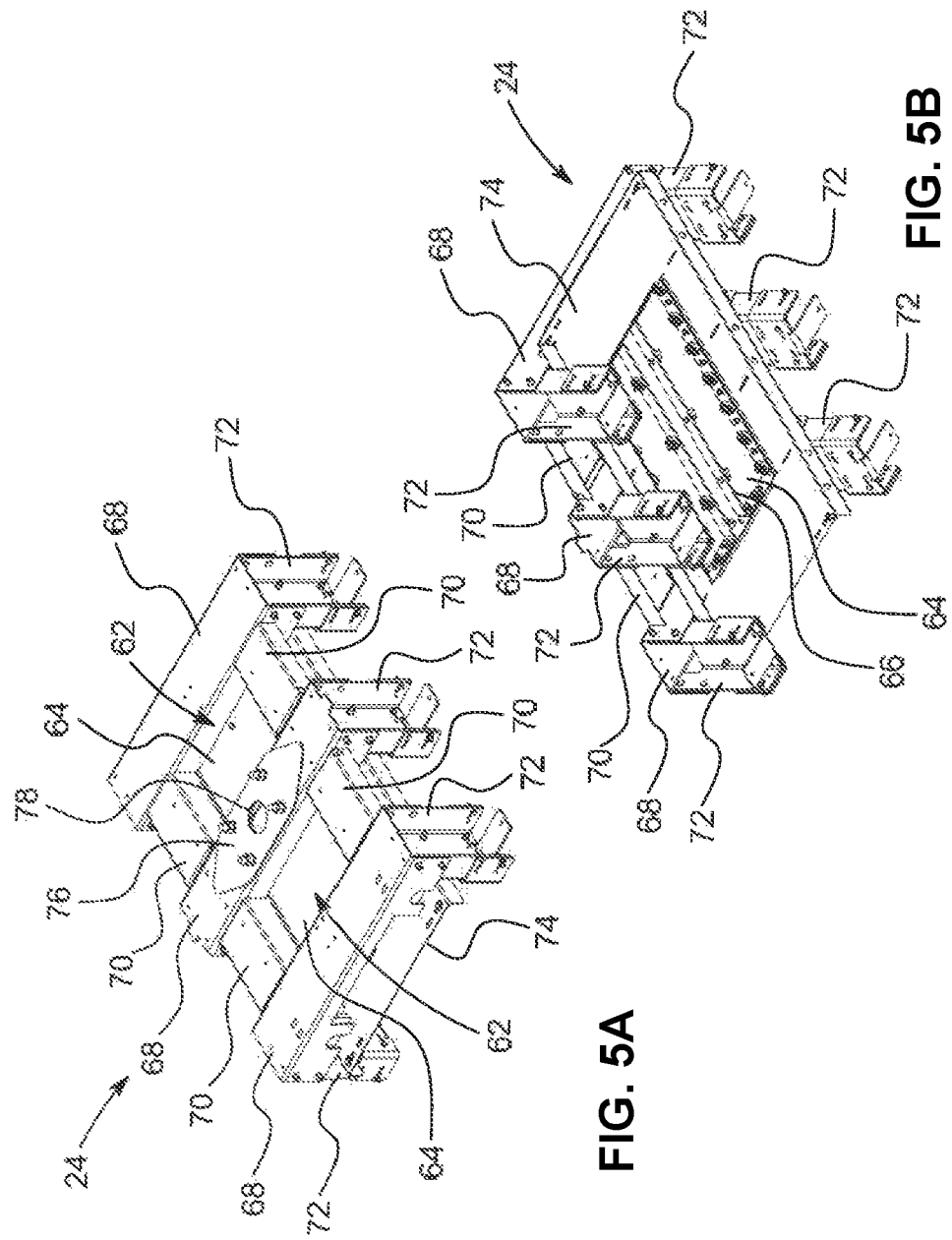
FIG. 5A shows an upper front side perspective view of a center sump of a sweep, in accordance with one or more embodiments.
FIG. 5B shows a lower front side perspective view of a center sump of a sweep, in accordance with one or more embodiments.
Figure 6:
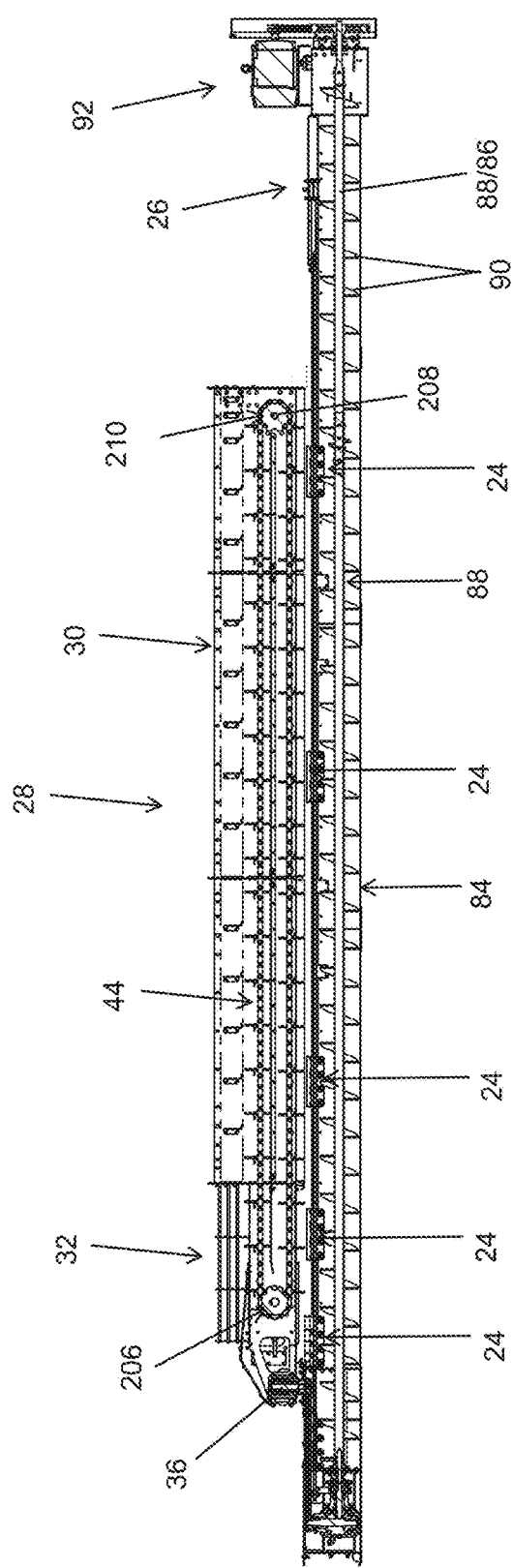
FIG. 6 shows an elevation view of an exemplary sweep system, in accordance with one or more embodiments; the view showing the sweep system positioned over an exemplary grain conveyer.
Figure 7:
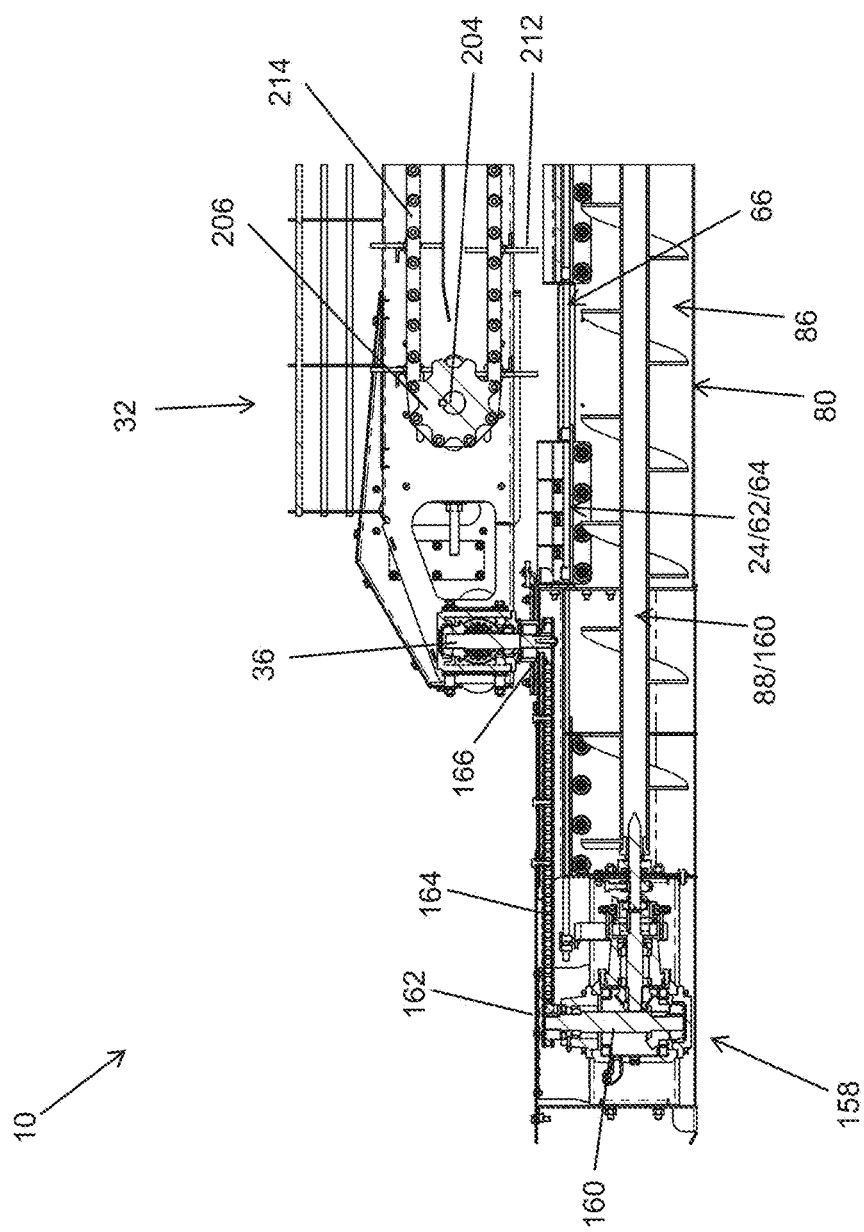
FIG. 7 shows an elevation view of a skeletonized head section of an exemplary sweep system, in accordance with one or more embodiments; the view showing a shaft and a sprocket positioned in the skeletonized head section.
Figure 8:
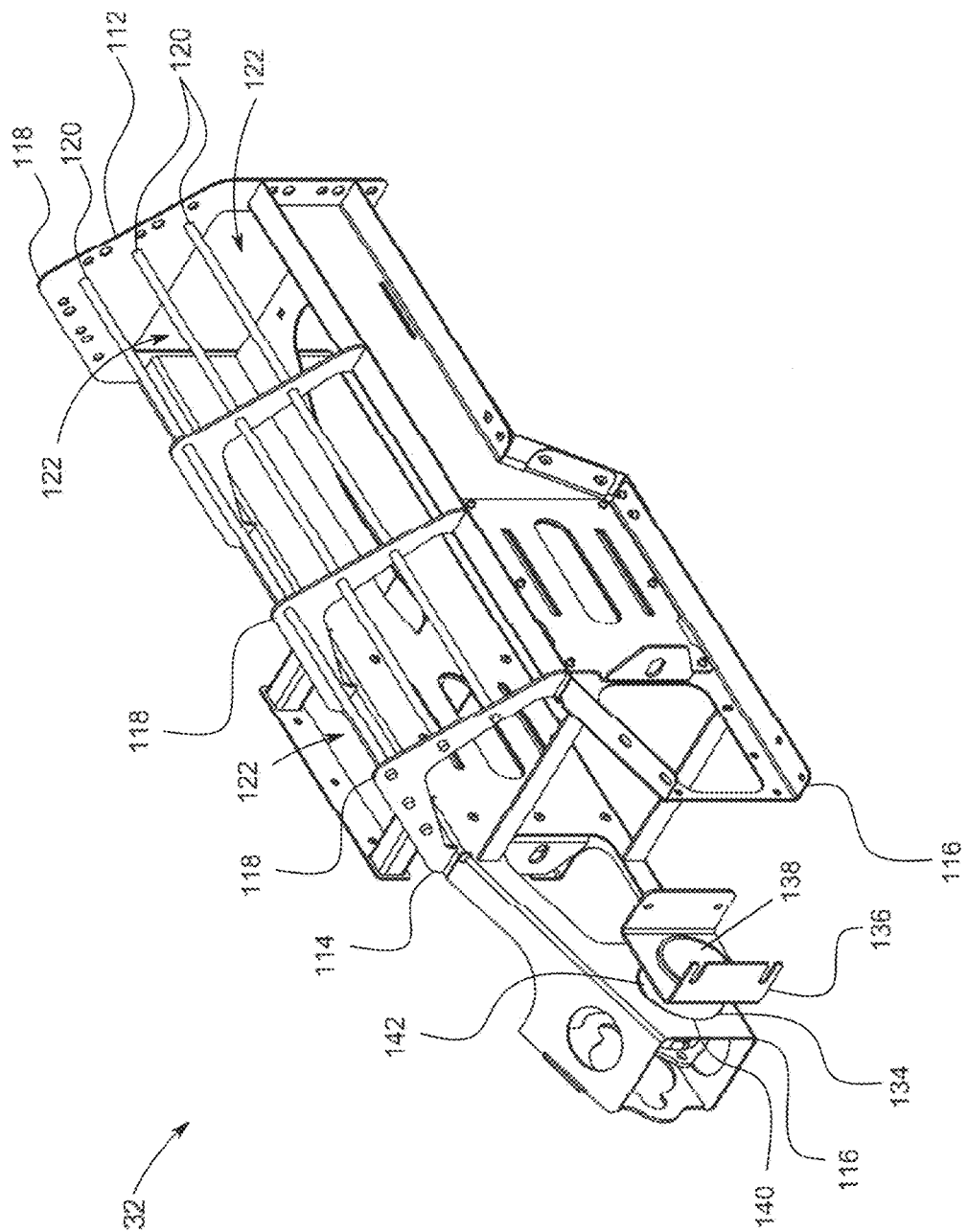
FIG. 8 shows an upper front right perspective view of a skeletonized head section of an exemplary sweep system, in accordance with one or more embodiments.
Figure 9:
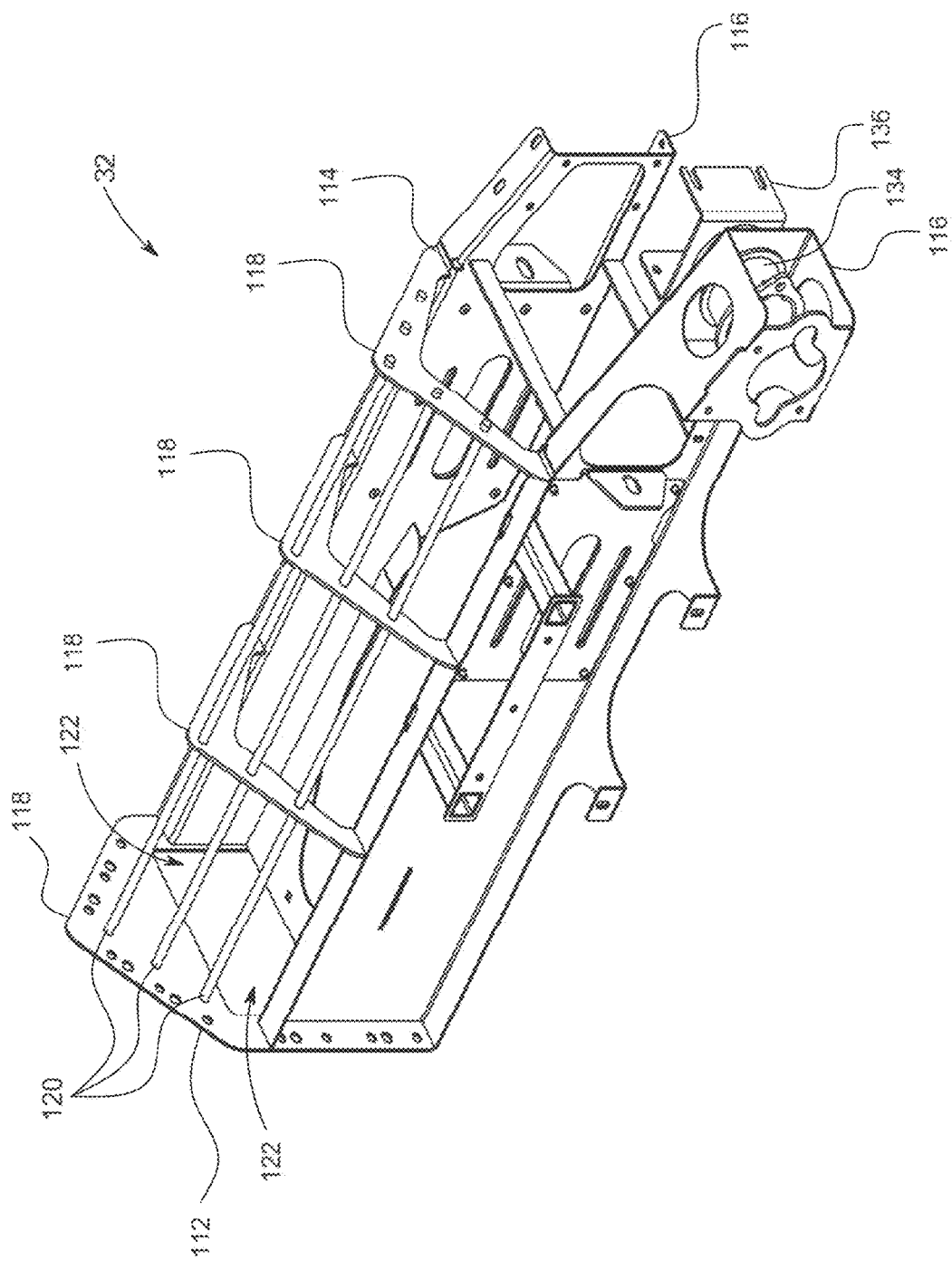
FIG. 9 shows an upper rear right perspective view of the skeletonized head section of an exemplary sweep system, in accordance with one or more embodiments.
Figure 10:
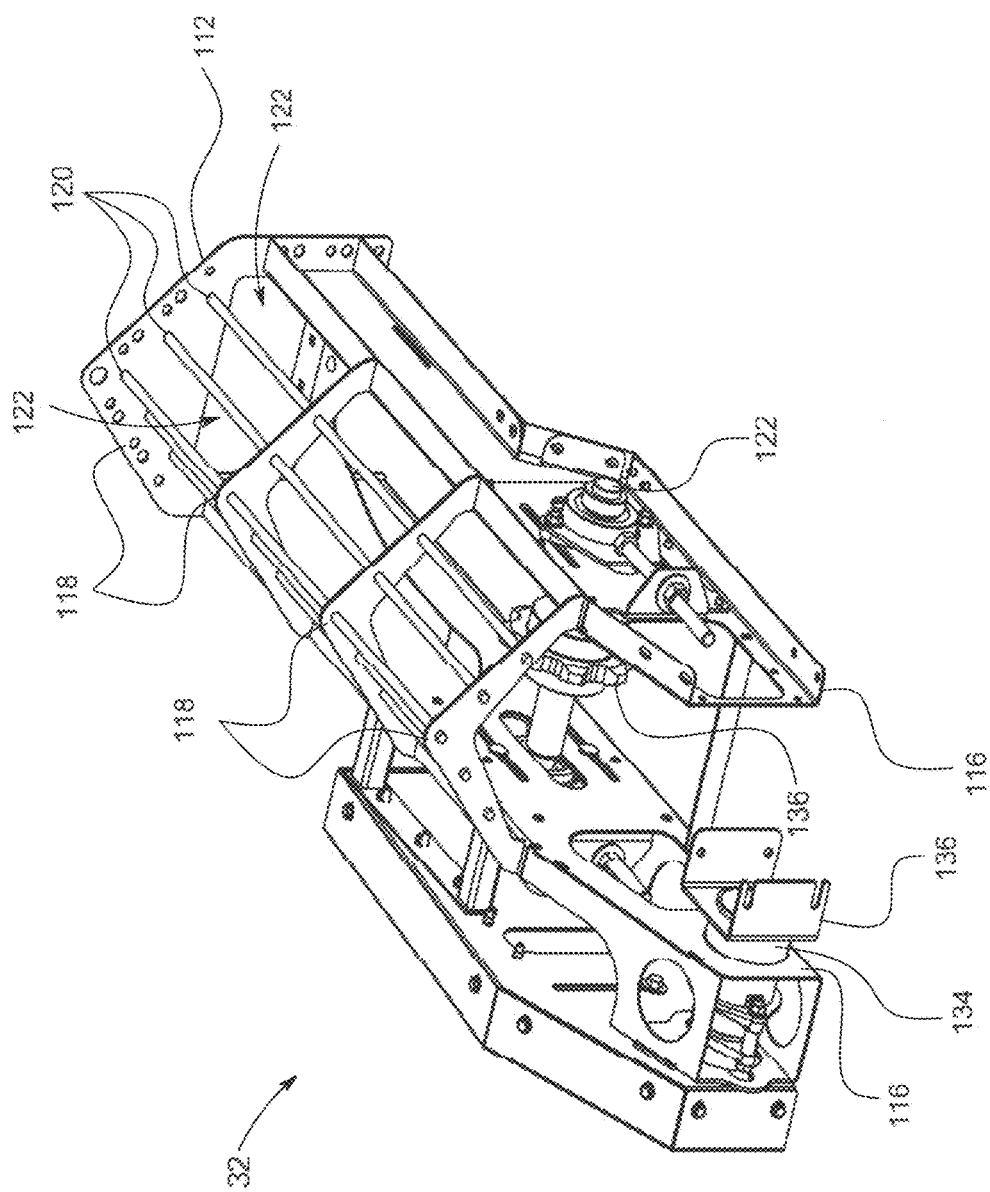
FIG. 10 shows an upper front right perspective view of a skeletonized head section of an exemplary sweep system, in accordance with one or more embodiments; the view showing a shaft and a sprocket positioned in the skeletonized head section.
Figure 11:
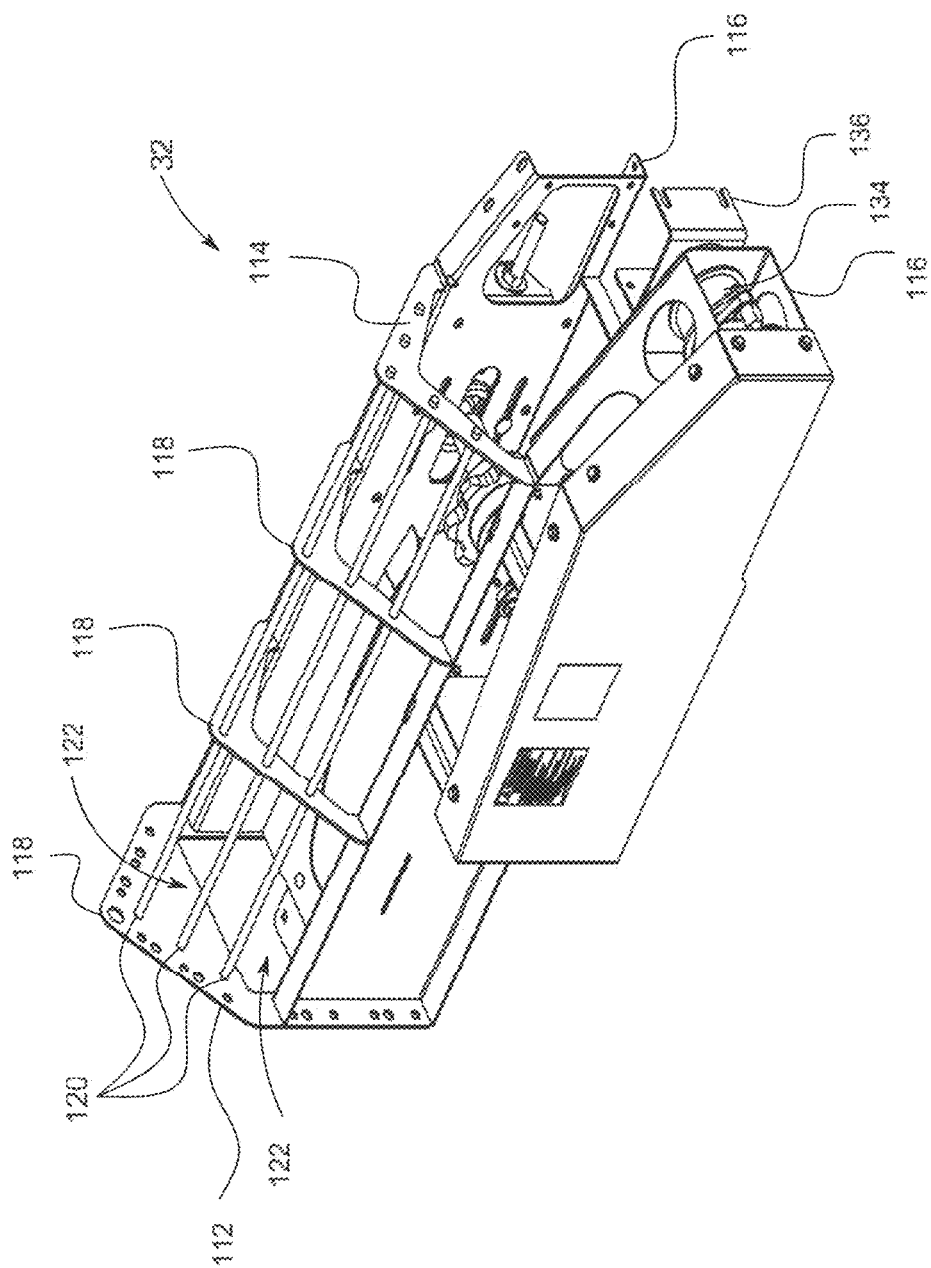
FIG. 11 shows an upper rear right perspective view of a skeletonized head section of an exemplary sweep system, in accordance with one or more embodiments; the view showing a shaft and a sprocket positioned in the skeletonized head section.
Figure 12:
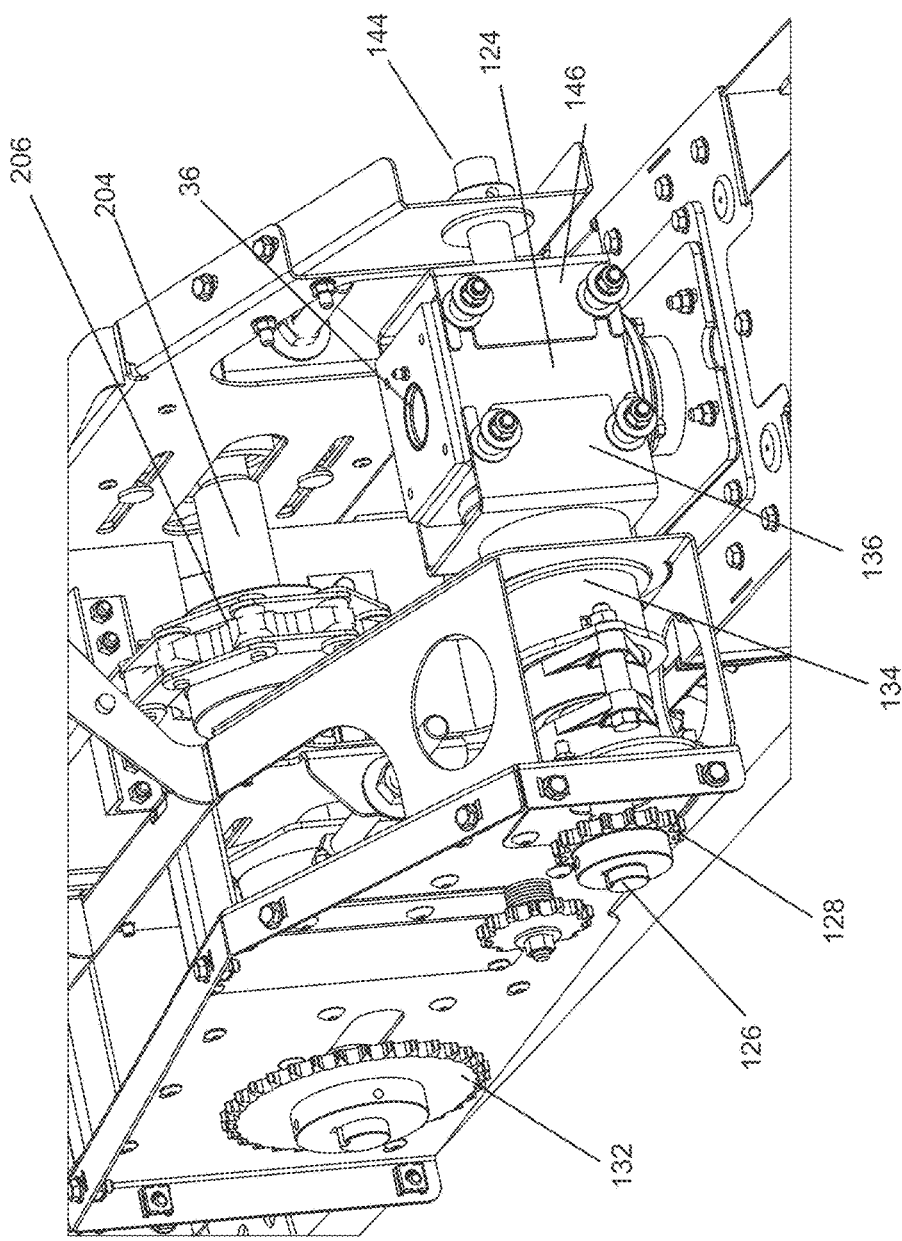
FIG. 12 shows a perspective view of a skeletonized head section of an exemplary sweep system, in accordance with one or more embodiments; the view showing a sprocket and a gearbox positioned in the skeletonized head section.
Figure 13:
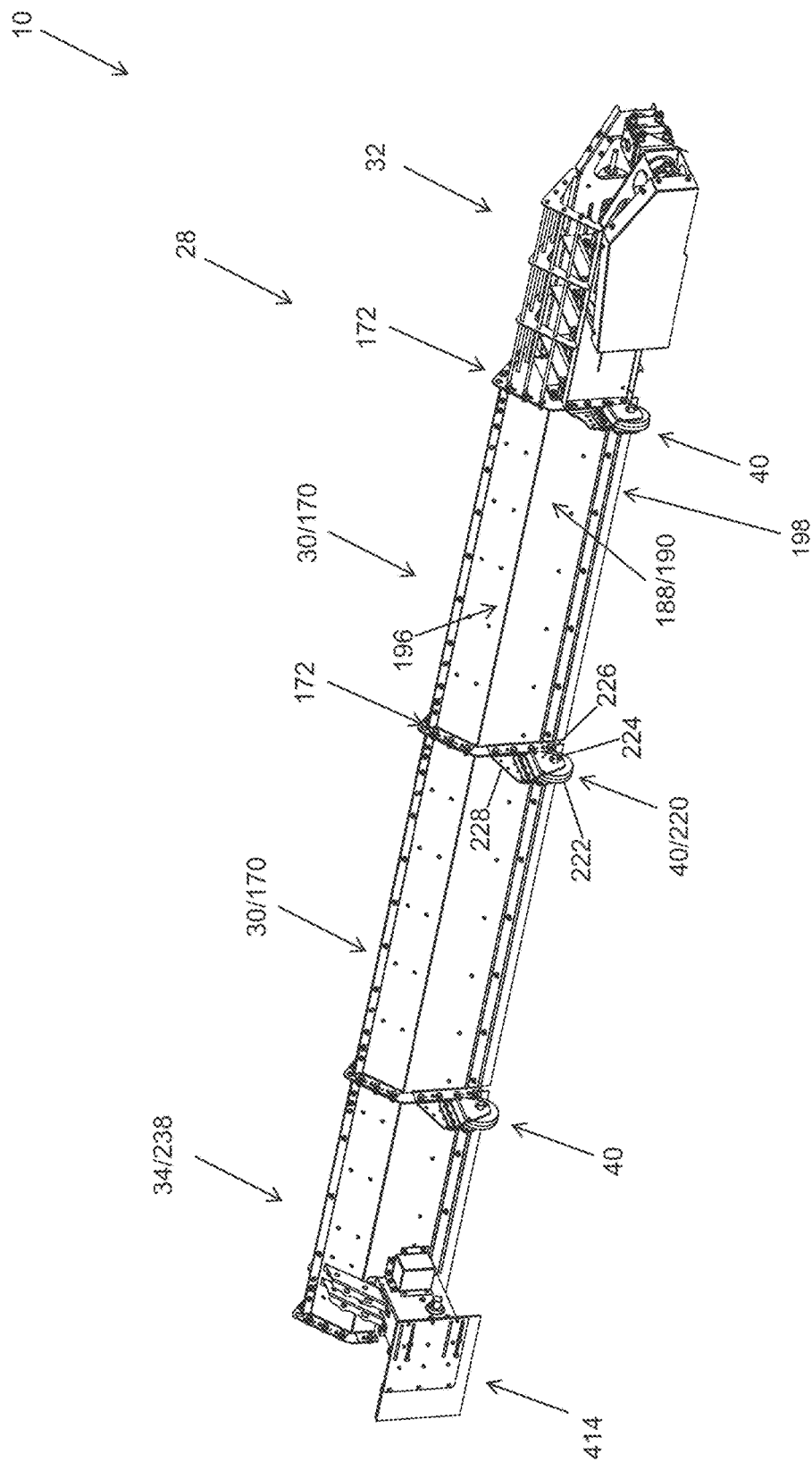
FIG. 13 shows an upper rear right perspective view of a sweep of an exemplary sweep system, in accordance with one or more embodiments; the view showing the sweep having carrier wheel supports positioned in a trailing edge of the sweep.
Figure 14:
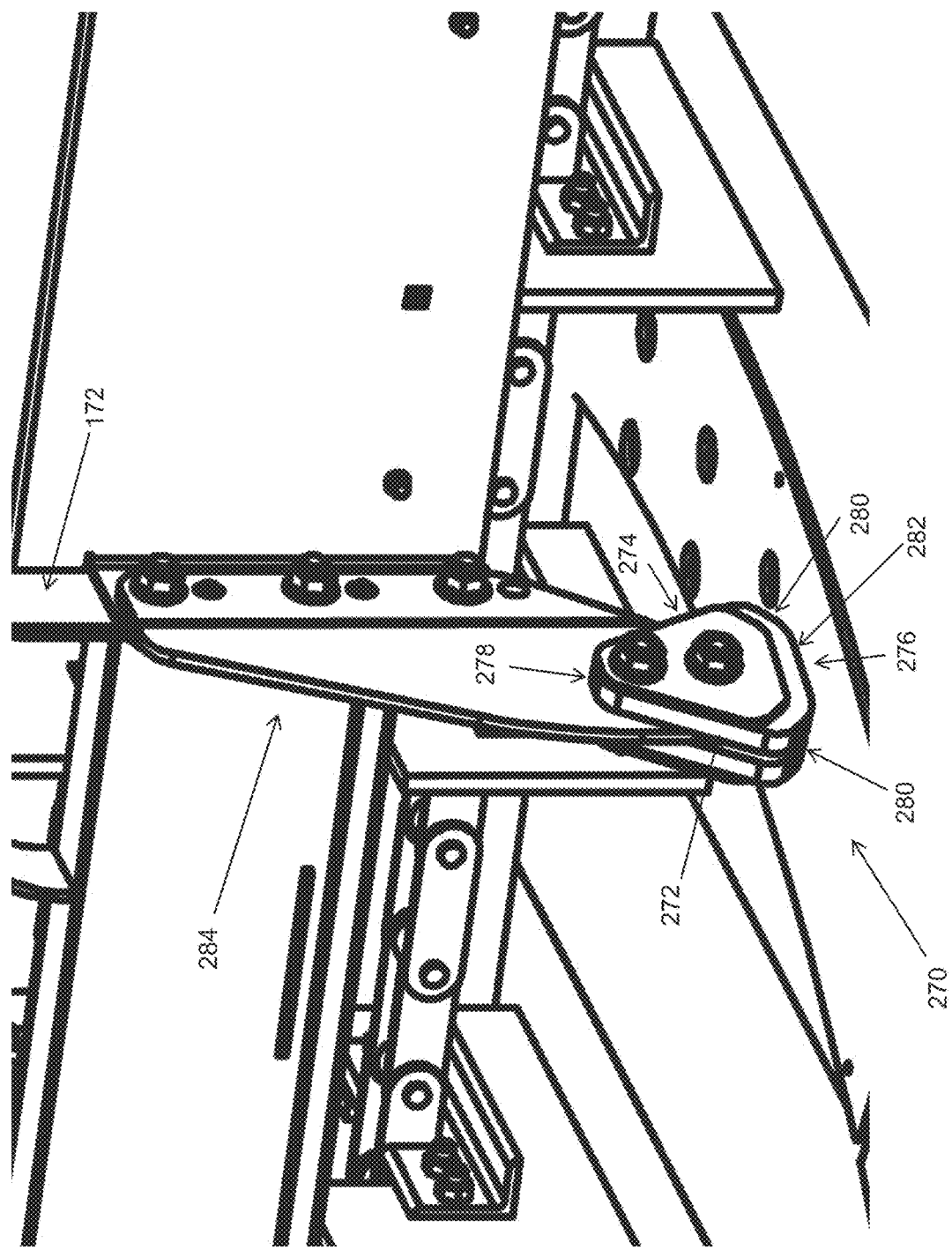
FIG. 14 shows an upper front left perspective view of a sweep of an exemplary sweep system, in accordance with one or more embodiments; the view showing a close up view of a support skid positioned on a leading edge of the sweep.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected, or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of grain bins. However, the embodiments are not so limited. It is appreciated that the embodiments may be adapted for use in other applications which may be improved by the disclosed structures, arrangements and/or methods. The system is merely shown and described as being used in the context of grain bins for ease of description and as one of countless examples.

System 10:

With reference to the figures, a sweep system for grain bins 10, or sweep system 10, or simply system 10 is presented. The system 10 is used in association with a grain bin 12 having a foundation 14, a sidewall 16, a peaked roof 18, an elevated floor 20 supported by a plurality of floor supports 22, a sump 24, and grain conveyor 26. The system 10 includes a sweep 28 having an elongated body 30, a head section 32, a tail section 34, a pivot point 36, sweep supports 40, a pusher 42 (optional), a sweep mechanism 44, and an agitator 46, among other features, systems, and components as is described herein and shown in the figures.

Grain Bin 12:

In the arrangement shown, sweep system 10 is used in association with a grain bin 12. Grain bin 12 may be formed of any suitable size, shape, and design and is configured to hold a bulk amount of flowable material such as grain, granular materials, and/or other like materials. In the arrangement shown, as one example, grain bin 12 is a large, generally cylindrical structure that sits upon a foundation 14. Foundation 14 may be formed of any suitable size, shape, and design and is configured to provide support to grain bin 12. In the arrangement shown, as one example, foundation 14 is a circular or cylindrical concrete slab, however any other form of a foundation is hereby contemplated for use. In the arrangement shown, as one example, foundation 14 provides support for the lower end of sidewall 16.

In the arrangement shown, as one example, grain bin 12 has a sidewall 16. Sidewall 16 may be formed of any suitable size, shape, and design and is configured to enclose the contents of grain bin 12 and enclose the hollow interior of grain bin 12. In the arrangement shown, as one example, sidewall 16 is cylindrical in nature and is formed of a plurality of sheets of corrugated material that are connected to one another in end-to-end relation to form rings. These rings are stacked on top of one another to form the desired height of sidewall 16 of grain bin 12. However, any other form or configuration of a sidewall 16 is hereby contemplated for use. In the arrangement shown, as one example, the upper end of sidewall 16 provides support for peaked roof 18.

In the arrangement shown, as one example, grain bin 12 has a peaked roof 18. Peaked roof 18 may be formed of any suitable size, shape, and design and is configured to enclose the upper end of grain bin 12 and enclose the hollow interior of grain bin 12. In the arrangement shown, as one example, peaked roof 18 is formed of a plurality of panels that extend from the peak of the roof 18 downward and outward to the upper edge of sidewall 16. However, any other form or configuration of a roof 18 is hereby contemplated for use.

In the arrangement shown, as one example, elevated floor 20, which is supported by a plurality of floor supports 22, is positioned within the hollow interior of grain bin 12.

Floor Supports 22:

In the arrangement shown, as one example, grain bin 12 includes a plurality of floor supports 22 which support elevated floor 20. Floor supports 22 are formed of any suitable size, shape, and design and are configured to provide support for elevated floor 20 as well as facilitate airflow between foundation 14 and elevated floor 20. In one or more arrangements, floor supports 22 have an elongated shape extending from an upper end 52, where floor supports 22 connect with elevated floor 20, to a lower end 54, where floor supports 22 connect with foundation 14. In some various arrangements, floor supports 22 may be implemented using elongated members of various shaped tubes, stock, beams, and/or other elongated members including but not limited to, tubing, beams (e.g., I-beams, H-beams T-beams, and/or any other type of beam), C-shaped channels, bars, rods, angle stock, or any other elongated tubes, stock, and/or other elongated members. However, the arrangements are not so limited. Rather, it is contemplated that in some arrangements, floor supports 22 may include a structure or assembly formed of multiple interconnected components.

In some various arrangements, floor support 22 may be connected with elevated floor 20 and/or foundation 14 using various means and/or methods including but not limited to, for example, screwing, nailing, bolting, riveting, welding, gluing, affixing, locking, friction fitting, threading, and/or forming the components out of a single piece of material such as stamping, machining, molding, casting, and/or by any other manner or method or the like.

Elevated Floor & Planks:

In the arrangement shown, as one example, grain bin 12 includes an elevated floor 20, which is supported by a plurality of floor supports 22. Elevated floor 20 is formed of any suitable size, shape, and design and is configured to support a mass of grain poured within the hollow interior of grain bin 12. In one arrangement, as is shown, elevated floor 20 rests upon the upper surface of upper ends 52 of floor supports 22 and establishes a generally planar upper surface.

In the arrangement shown, as one example, elevated floor 20 is formed of a plurality of planks 60. Planks 60 are formed of any suitable size, shape, and design and are configured to connect to one another to form elevated floor 20.

In one arrangement, as is shown, planks 60 extend a length in a generally straight manner between opposing ends. In the arrangement shown, as one example, planks 60 include a center wall that is generally flat and planar in shape and extends horizontally. This center wall connects at its outward edges to sidewalls which extend vertically. In one arrangement, the center wall has a plurality of openings or perforations therein that are large enough to allow air flow through the elevated floor 20 but not so large that grain can fall through the perforations. The sidewalls are generally flat and planar in shape and extend downward from the outward edges of the center wall in approximate parallel spaced alignment to one another and form a channel at their lower ends that facilitate nesting with adjacent planks.

Any other shape or configuration is hereby contemplated for use for planks 60. In the arrangement shown, the combination of bends and shapes that form planks 60 provides strength and rigidity to planks 60 in much the same way that corrugation provides strength and rigidity to a sheet of sheet metal.

In the arrangement shown, as one example, planks 60 nest in side-to-side alignment with one another and rest upon floor supports 22 to form elevated floor 20. The space between elevated floor 20 and foundation 14 allows for the passage of air there through. The space between elevated floor 20 and foundation 14 also allows room for other components of the system 10 such as sump 24 and grain conveyor 26.

Sump 24:

In the arrangement shown, as one example, system 10 includes at least one sump 24. Sump 24 is formed of any suitable size, shape, and design and is configured to selectively allow grain to pass through elevated floor 20 and into grain conveyor 26 thereby allowing grain out of grain bin 12. In the arrangement shown, as one example, a plurality of sumps 24 are shown in elevated floor 20 which are formed of an opening 62 that is covered by a gate 64 that selectively opens and closes by operation of a control mechanism 66 (not shown) so as to facilitate grain to enter grain conveyor 26 positioned below sump 24.

In the arrangement shown, a plurality of sumps 24 extend in a line in spaced relation with one another from just inward of the sidewall 16 of grain bin 12 to a generally centrally positioned sump 24, also known as the center sump 24. This spacing of a plurality of sumps 24 allows grain to be drained out of grain bin 12 from various positions within grain bin 12.

In the arrangement shown, as one example, a mounting plate 76 is attached to elevated floor 20 at a position nearby the center sump 24 as well as generally centrally positioned within grain bin 12. Mounting plate 76 serves to facilitate mounting of pivot point 36 to center sump 24 formed of horizontal supports 68, connectors 70 and vertical supports 72, serve to support the weight of the sweep 28 at pivot point 36.

In the arrangement shown, as one example, the hollow interior of the centrally positioned vertical support 72 and the centrally positioned horizontal support 68 of center sump 24 provide a protected passageway for an electrical lead 50 (not shown) to pass therethrough. That is, electrical lead 50 extends through the space between foundation 14 and elevated floor 20, which protects the electrical lead 50. Electrical lead 50 then extends upward within the hollow interior of the centrally positioned vertical support 72 and then through the hollow interior of centrally positioned horizontal support 68. Electrical lead 50 then passes through the hole 78 at the center of mounting plate 76, up the hollow interior of pivot point 36 and into sweep 28, as is described herein.

In one or more arrangements, sump 24 may be assembled (e.g., by screwing, bolting, and/or welding or other method or means for connecting components together) at the factory into a single unit which is then to be installed in the grain bin 12 as a single part. This arrangement saves installation time and improves quality and reduces cost.

Grain Conveyor 26:

In the arrangement shown, as one example, system 10 includes a grain conveyor 26. Grain conveyor 26 is formed of any suitable size, shape, and design and is configured to move grain out of grain bin 12, such as through a sump 24 or other opening in the elevated floor 20. In some various arrangements, grain conveyor 26 may be implemented using various grain movement devices including but not limited to, for example, an auger, a conveyor belt, a drag chain, and/or any other form of a grain movement device.

In the arrangement shown, as one example, grain conveyor 26 is positioned between foundation 14 and elevated floor 20. Generally speaking, the larger the grain conveyor 26 the greater the amount of grain the grain conveyor 26 can move. While moving more grain faster is advantageous, especially for large grain bins, the larger the grain conveyor 26 gets the more problematic it becomes to provide support above and around the grain conveyor 26 as floor supports 22 must be moved or removed to make space for the large grain conveyor 26.

In the arrangement shown, as one example, grain conveyor 26 includes a cylindrical shaped housing 80 forming a hollow interior 84 extending from a center sump 24 to an output end 82. In this example arrangement, an auger 86 or other grain movement device (e.g., a belt or drag chain) is positioned within the hollow interior 84. In one or more arrangements, auger 86 includes a shaft 88 with flighting 90 configured to facilitate removal of grain from grain conveyor 26 as shaft 88 is rotated. In an arrangement shown, as one example, grain conveyor 26 is powered by a motor 92 operably connected to shaft 88 of auger 86 at outward end 82 of grain conveyor 26. Motor 92 is formed of any suitable size, shape, and design and is configured to generate movement to drive grain conveyor 26. In some various arrangements, motor 92 may be implemented using various methods and/or means for generating movement including but not limited to, for example, an AC electric motor, a DC electric motor, pneumatic motor, hydraulic motor, combustion motor, and/or any other method or means for generating movement. When operated, motor 92 causes the rotation of auger 86, which facilitates the below-floor 20 transportation of grain from grain bin 12, from sumps 24, through hollow interior 84 of housing to output end 82 of grain conveyor 26.

Wear Plates 96 and Wear Tracks 100:

In the arrangement shown, as one example, grain bin 12 includes wear plates 96 and/or wear tracks 100 positioned on top of elevated floor 20. Wear plates 96 are formed of any suitable size, shape, and design and are configured to provide a strong support surface for sweep supports to rest when sweep 28 is positioned above sumps 24 and to distribute downward force of sweep support 40 across a wider area. When the grain bin 12 is filled, grain may place a large amount of downward force onto sweep 28, which is transferred downward through sweep supports 40 to elevated floor 20 for extended periods of time. To prevent sweep supports 40 from forming indentations, or otherwise damaging elevated floor 20, wear plates 96 are positioned between sweep supports 40 and elevated floor 20.

In the arrangement shown, as one example, wear plates 96 are formed of generally rectangular planar sheets of material and are laid over the top surface of elevated floor 20 and thereby form a generally flat surface upon which sweep supports 40 may rest. Wear plates 96 provide additional support for the weight of sweep supports 40 of sweep 28 and help to distribute this weight across a wider area. In the arrangement shown, as one example, sweep 28 includes three wear plates 96 positioned outward from a central wear track 100.

Wear tracks 100 are formed of any suitable size, shape, and design and are configured to provide a strong support surface for one or more sweep supports 40 to engage and ride along as sweep 28 is rotated during operation. In one or more arrangements, wear tracks 100 are formed of narrow sheets of solid material that is screwed or bolted to the upper surface of elevated floor thereby forming narrow rings at various diameters which a sweep support 40 is placed along sweep 28. In the arrangement shown, as one example, system 10 includes one wear track 100 positioned on elevated floor 20 at an inner sweep support 40 and extending in a circular path around grain bin 12. However, the arrangements are not so limited. Rather, it is contemplated that in some various arrangements, system 10 may include any number of wear tracks 100 positioned on elevated floor 20.

Unlike planks 60 of elevated floor 20, wear plates 96 and wear track 100 are solid and smooth and do not have perforations therein and therefor wear plates 96 and wear track 100 do not allow air to pass there through. The solid and smooth upper surface of wear track 100 improves the ability for sweep supports 40 to slide and/or roll thereon. However, solid wear plates 96 inhibit air flow through the grain. For this reason, in some arrangements, the size of wear plates 96 are minimized while providing adequate support for the weight of sweep 28. Due to the narrow nature of outer wear tracks 100, air flow through the grain around outer wear tracks 100 is not substantially affected.

Bridging Supports 102:

In the arrangement shown, as one example, system 10 includes one or more bridging supports 102. Bridging supports 102 are formed of any suitable size, shape, and design and are configured to provide support for sweep supports 40 and wear tracks 100 where needed. In the arrangement shown, as one example, bridging supports 102 are positioned below outer wear tracks 100 and over grain conveyor 26. In the arrangement shown, as one example, bridging supports 102 are formed of one or more horizontal members 104 that connect to vertical members 106. Vertical members 106 connect at their upper ends to horizontal members 104 and connect at their lower ends to foundation 14. In this way, horizontal members 104 provide horizontal support while vertical members 106 provide vertical support. In the arrangement shown, as one example, bridging supports 102 are formed of a pair of horizontal members 104 and vertical members 106 formed of square or rectangular hollow tubing that are positioned adjacent to one another. However, any other configuration is hereby contemplated for use and any other suitable structural member is hereby contemplated for use such as round tubing, angle iron, beams, solid bars or rods, and/or any other structural member.

In the arrangement shown, as one example, as sweep supports 40 travel over wear tracks 100, force is applied to bridging supports 102, which help support the weight of sweep 28, especially when traveling over grain conveyor 26.

In one or more arrangements, bridging support 102 as is described herein may be assembled by screwing, bolting and/or welding the components together at the factory into a single unit which is then to be installed in the grain bin 12 as a single part. This arrangement saves installation time and improves quality and reduces cost.

Sweep 28:

In the arrangement shown, as one example, system 10 includes a sweep 28. Sweep 28 is formed of any suitable size, shape, and design and is configured to rotate around pivot point 36 and move grain toward the center sump 24. In the arrangement shown, as one example, sweep 28 includes an elongated body 30 that extends a length from an inward end, positioned adjacent the center of grain bin 12, or pivot point, and an outward end, positioned adjacent the sidewall 16 of grain bin 12. In the arrangement shown, as one example, a head section 32 is positioned adjacent the inward end of sweep 28 and a tail section 34 is positioned adjacent the outward end of sweep 28 and elongated body 30 extends between the inward end and outward end of sweep 28.

Head Section 32:

In the arrangement shown, as one example, sweep 28 includes a head section 32. Head section 32 is formed of any suitable size, shape, and design and is configured to connect the inward end of sweep 28 to pivot point 36 as well as house various components of sweep 28 as is described herein.

Grain bin sweeps, such as sweep 28, are generally parked in alignment with the grain conveyor 26 that is positioned below the elevated floor 20 before the grain bin 12 is filled with grain. This positioning aligns the sweep 28 with the plurality of sumps 24 in the elevated floor 20 that fluidly connect with the grain conveyor 26. As such, the sweep 28 is parked over the sumps 24 and, therefore, the sweep 28 blocks the natural flow of grain out of the sumps 24.

When the user of a grain bin 12 wants to drain grain out of the grain bin 12, the user generally opens the center sump 24 or sumps 24. In doing so, grain is drained out of the middle of the grain bin 12. Draining grain out of the center of a grain bin 12 is important to maintain equal forces, or hoop stresses, within the grain bin 12. However, when sweep systems is positioned above the center sump 24 or sumps 24, sweep systems generally have a tendency to block the flow of grain out of the grain bin 12. In some cases, this blockage by the sweep 28 can cause the grain bin to get plugged.

However, it is important to align the sweep 28 above the sumps 24 as the sumps 24 must remove the grain around the sweep 28 before the sweep 28 can be operated. As such, there is a conflict. The sweep 28 must be positioned over the sumps 24 so that the sumps 24 can drain grain out of the grain bin around the sweep 28. However, in doing so, that is positioning the sweep 28 above the sumps 24 the sweep 28 blocks the flow of grain out of the sumps 24.

In the arrangement shown, as one example, head section 32 is configured to allow the passage of grain through the head section 32. In the arrangement shown, as the grain flows through head section 32, the grain also flows through the inward positioned end of sweep mechanism 44. This allows the grain to flow through the head section 32 and out the sumps 24 positioned below the head section 32. This improves the efficiency of emptying a grain bin 12 and reduces the potential for blocks or plugs. However, the embodiments are not so limited. Rather, it is contemplated that in some various arrangements, system 10 may be implemented with a conventional covered head section.

In the example arrangement shown, head section 32 extends a length from an outward end 112 to an inward end 114. The outward end 112 connects to and/or forms the inward end of sweep 28. The inward end 114 connects to arms 116 that connect to pivot point 36 as is further described herein.

In the arrangement shown, as one example, head section 32 includes a plurality of frame members 118 that extend in approximate parallel spaced relation to one another. In the arrangement shown, as one example, these frame members 118 are generally planar in shape and have straight sides with a peaked top and a hollow interior that lets the passage of sweep mechanism 44 there through. In the arrangement shown, as one example, a plurality of bars 120 extend through and connect adjacent frame members 118. In the arrangement shown, as one example, one bar 120 extends through the approximate peak of the frame members 118 with a plurality of bars 120 extending downward along the angled sides of the peak of frame members 118 in approximate equal spaced parallel spaced alignment. In the arrangement shown, as one example, these bars 120 connect all frame members 118 of head section 32 thereby giving head section 32 structural strength and rigidity while also allowing grain to pass through the head section 32.

In the arrangement shown, as one example, when viewed from above or below, there are large exposed openings 122 between uncovered frame members 118 and bars 120. These exposed openings 122 allow the passage of grain through the head section 32. In this way, the plurality of openings 122 in head section 32 gives head section 32 a skeletonized look and therefore in this way head section 32 may be described as skeletonized.

In the arrangement shown, although head section 32 is uncovered, the elongated body 30 of sweep 28 remains covered. The cover of elongated body 30 helps to facilitate movement of links 214 and paddles 212 of sweep mechanism 44 when large amounts of grain remain on top of elongated body 30 before the sweep mechanism 44 is operated. In one or more arrangements, shaft 204, which rotates the links 214 and paddles 212 of sweep mechanism 44, is located within skeletonized head section 32. In the arrangement shown, shaft 204 is positioned approximately in a central section of head section 32. In this location, lower paddles 212 are able to move grain for removal through center sump 24. It is recognized that weight of grain in the uncovered head section 32 may obstruct movement of links 214 and paddles 212 of sweep mechanism 44. However, shaft 204 of sweep mechanism 44 in this location provides a balance that promotes functional operability of the sweep system with grain able to pass through the skeletonized head section 32 without overly inhibiting movement of sweep mechanism 44.

Head Section Allows for Vertical Movement as Well as Angular Movement:

In one or more arrangements, head section 32 allows for vertical movement as well as angular movement of sweep system 10. This vertical movement as well as angular movement of the inward end of sweep 28 provides substantial advantages and allows sweep 28 to move and articulate as it engages variations in the elevated floor 20 during operation as it rotates around pivot point 36 and as it travels over elevated floor 20.

In one or more arrangements, the inward end 114 of head section 32 includes a pair of arms 116 that extend toward and connect to gearbox 124, which is positioned at the upper end of pivot point 36. Gearbox 124 is formed of any suitable size, shape, and design and is configured to transmit rotational energy and force from the shaft of pivot point 36 to shaft 126, which rotates sprocket 128, which rotates chain 130 (not shown), which rotates sprocket 132, which rotates shaft 204, which rotates the links 214 and paddles 212 of sweep mechanism 44. Connecting sweep 28 through head section 32 in this manner facilitates a relatively direct and secure and rigid connection with minimal chains, sprockets and gearing, which improves the robustness of the design, improves efficiencies, and reduces loss of energy.

In one or more arrangements, one arm 116 receives a cylindrical collar 134 that surrounds shaft 126. Collar 134 is connected to a bracket 136 that connects to the exterior surface of gearbox 124 by way of fasteners such as screws or bolts. This collar 134 is received within opening 138 in arm 116. Opening 138 is generally cylindrical in shape so as to allow the upward and downward rotation of the outward end of sweep 28. This is also known as rotational movement of the outward end of sweep 28. This rotational movement allows the outward end of sweep 28 to climb or accommodate variations in the elevated floor 20 of grain bin 12, which is common due to variations in the poured concrete of the foundation 14 of grain bin 12, variations in the parts and components of the system 10, variations due to installation, as well as settling, shifting, or other movement or variation. If it were not for the ability for the outward end of sweep 28 to angularly adjust, the sweep 28 could engage the elevated floor 20 in the high spots, thereby damaging the elevated floor 20 and/or sweep 28. Similarly, if it were not for the ability for the outward end of sweep 28 to angularly adjust, the sweep 28 could pass-over grain on the elevated floor 20 in the low spots thereby not fully emptying the grain bin 12 and leaving grain behind.

However, this opening 138 is also taller than it is wide, and in this way, it is slot-shaped with flat sides and rounded ends. This added vertical height allows for the vertical movement of the inward end of sweep 28. This vertical movement allows for the inward end of sweep 28 to move up and down in a limited and controlled manner to accommodate variations in the elevated floor 20 of grain bin 12, which are common due to variations in the poured concrete of the foundation 14 of grain bin 12, variations in the parts and components of the system 10, variations due to installation, as well as settling, shifting, or other movement or variation.

The combination of the rotational freedom and the vertical freedom of the inward end of sweep 28 provides sweep 28 with unprecedented freedom and flexibility, which leads to less potential for breakage, less potential for wear, and a more durable and more versatile sweep 28 that can operate under practically any conditions.

In one or more arrangements, the opposite arm 116 also includes an opening 138 with flat sides 140 and rounded ends 142. This arm 116, however, receives a shaft 144 of a bracket 146 that is similarly affixed to the exterior surface of gearbox 124. In the arrangement shown, as one example, shaft 144 is non-rotational in nature, meaning it is affixed to gearbox 124 and does not rotate.

In this way, both sides of gearbox 124 are connected to arms 116 by way of cylindrical components (134, 144). In this way, both sides of the connection of head section 32 or sweep 28 to gearbox 124 allow for vertical movement as well as rotational movement.

One Motor that Powers Grain Conveyor and Sweep Mechanism:

One or more arrangements, sweep mechanism 44 of sweep 28 is operably connected to grain conveyor 26 to facilitate powering of grain conveyor 26 and sweep mechanism 44 by a single motor 92. That is, a single motor 92 powers and causes the rotation of a grain conveyor 26 that facilitates the below-floor 20 removal of grain from grain bin 12, as well as causes the rotation of the links 214 and paddles 212 of sweep mechanism 44 of sweep 28 that facilitates the movement of grain toward the sumps 24 in the center of grain bin 12. However, the embodiments are not so limited. Rather, it is contemplated that in one or more arrangements sweep 28 may be powered by a separate motor (e.g., connected to gearbox 124) to facilitate powering of sweep 28 independent of grain conveyor 26.

Sweep mechanism 44 of sweep 28 may be operably connected to grain conveyor 26 (or motor) using any suitable mechanical arrangement. In the arrangement shown, as one example, the inward end of shaft 88 of grain conveyor 26 connects to gearbox 158 that transmits laterally extending rotation to vertically extending rotation. In this example arrangement, gearbox 158 causes the rotation of shaft 160, which causes the rotation of sprocket 162 that is connected to the upper end of shaft 160. Sprocket 162 is connected to chain 164 and as such the rotation of sprocket 162 causes rotation of chain 164. The opposite side of chain 164 is connected to sprocket 166, which is connected to the lower end of the shaft of pivot point 36.

In this example arrangement, the rotation of pivot point 36 causes the rotation of the gears within a gearbox 124 positioned within head section 32, which causes the rotation of shaft 126, which causes the rotation of sprocket 128, which causes the rotation of chain 130, which causes the rotation of sprocket 132, which causes the rotation of shaft 204, which causes the rotation of sprocket 206, which causes the rotation of the inward end of sweep mechanism 44.

In this way, a single motor 92 drives or powers grain conveyor 26 and sweep mechanism 44 of sweep 28. This mechanical arrangement may saves cost by reducing expensive components, such as multiple motors as well as the coordinated control and electrical connection of multiple motors. In some arrangements, this mechanical arrangement may also improves efficiencies, durability, and uptime by eliminating additional motors and the potential for any one of the multiple motors to go down or fail.

Elongated Body 30:

In one or more arrangements, sweep 28 includes an elongated body 30. Elongated body is formed of any suitable size, shape, and design and is configured to connect at its inward end to head section 32, to connect at its outward end to tail section 34, and to house sweep mechanism 44. In the arrangement shown, as one example, elongated body 30 is formed of a plurality of sections 170 that connect to one another in end-to-end linear alignment. In the arrangement shown, as one example, each section 170 includes an end frame 172 positioned at each opposing end of the section 170 that extend in approximate parallel spaced relation to one another.

In the arrangement shown, as one example, end frames 172 include an opening 184 at their middle that allows the passage of sweep mechanism 44 there through. In the arrangement shown, as one example, end frames 172, when viewed from the leading side 186 or the trailing side 188 or from above or below, are generally flat and planar in shape.

In the arrangement shown, as one example, the lower side of end frame 172 on the trailing side 188 extends a distance below the leading side 186. The lower extension of the trailing side 188 of end frame 172 supports and/or holds and/or is connected to a back plate 190 that stops grain and prevents grain from being passed over as the sweep 28 moves around pivot point 36. In the arrangement shown, as one example, back plate 190 is a generally flat and straight member that extends between opposing end frames 172 and is positioned just rearward of sweep mechanism 44. In use, the lower edge of back plate 190 passes over the upper surface of elevated floor 20 with close tolerances thereby scraping most if not all of the grain off of the elevated floor 20.

In this example arrangement, the lower end of end frame 172 on the leading side 186 on end frame supports and/or holds and/or is connected to a front plate 200 that helps prevent grain from entering into an upper portion of sweep mechanism 44. In the arrangement shown, as one example, front plate 200 is a generally flat and straight member that extends between opposing end frames 172 and is positioned just forward of sweep mechanism 44. In the arrangement shown, as one example, lower edge of front plate 200 is positioned a distance above upper surface of elevated floor 20 to permit grain to enter a lower portion of sweep mechanism 44 so it may be moved by sweep mechanism 44 toward center sump 24.

In the arrangement shown, as one example, a front cover plate 194 is connected to and covers the front side or leading side 186 of section 170 and extends between opposing end frames 172. In the arrangement shown, as one example, a rear cover plate 196 is connected to and covers the rear side or trailing side 188 of section 170 and extends between opposing end frames 172.

In the arrangement shown, as one example, the elongated body 30 of sweep 28 is formed by attaching sections 170 in end-to-end relation to one another. More specifically, the outward facing surfaces of two end frames 172 are placed in planar engagement with one another and are affixed to one another by passing a plurality of screws and/or bolts through the overlapping exterior peripheral edges of end frames 172. This process is repeated until using sections 170 until the desired length of elongated body 30 is formed. A tail section 34 is then added to the outward end of elongated body 30.

Sweep Supports 40:

In the arrangement shown, as one example, system 10 includes a plurality of sweep supports 40. Sweep supports 40 are formed of any suitable size, shape, and design and are configured connect to either the leading side or trailing side of the elongated body 30 of sweep 28 and provide support to sweep 28.

Carrier Wheels 220:

In one or more arrangements, sweep supports 40 are implemented as carrier wheels 220 having a rolling member 222 that connects to an axle 224 that extends through rolling member 222 as well as a pair of opposing guides 226 that converge together at a point overhead rolling member 222 and extend rearward on each side of rolling member 222, where opposing guides 226 connect to an attachment plate 228. In the arrangement shown, as one example, attachment plate 228 operably connects opposing guides 226 to elongated body 30.

In one or more arrangements shown, as one example, carrier wheels 220 are spaced along the length of elongated body 30 to provide support along the length of elongated body 30. In this example arrangement, carrier wheels 220 may be attached to the leading side 186 or trailing side 188 by connecting attachment plates 228 to joined end frames 172 (e.g., screwing, bolting, and/or welding the attachment plates 228 to end frames 172. In the arrangement shown, as one example, the angle and/or orientation of rolling member 222 may be set by rotating the position of attachment plates 228 relative to elongated body 30.

Support Skid(s) 270:

Additionally or alternatively, in one or more arrangements, sweep supports 40 may include one or more support skids 270 in addition to or in lieu of carrier wheels 220. Support skid(s) 270 are formed of any suitable size, shape, and design and are configured connect to either the leading side or trailing side of the elongated body 30 of sweep 28 and provide support to sweep 28. In one or more arrangements, system 10 includes a support skid 270 positioned at an end frame 172 of a section 170 of elongated body 30 proximate to an outward end of head section 32 of sweep 28. In this example arrangement, support skid 270 has a pair of generally triangular planar members having a front edge 272 and a back edge 274 extending upward from a lower edge 276 to an upper end 278. In the arrangement shown, lower edge 276 has a smooth generally planar surface with sloped portions 280 that slope upwards at front and back ends where lower edge 276 meets front edge 272 and back edge 274. Sloped portions 280 of lower edge 276 help to prevent support skid 270 from catching on obstructions of floor 20 and help facilitate smooth sliding of support skid 270 during operation. In one or more arrangements, lower edge 276 of support skid 270 is formed of a lower friction material 282 having a lower coefficient of friction (e.g., UHMW or other low friction material).

In various arrangement, support skids 270 may be attached to sweep 28 using various means and/or methods for attachment. In one or more arrangements, as one example, support skids 270 may be attached to the leading side 186 and/or trailing side 188 by brackets 284 that are attached to end frames 172 of sections 170 of elongated body 30. In one or more arrangements, support skids 270 may be spaced along the length of elongated body 30 to provide support along the length of elongated body 30. In one arrangement, support skids 270 ride on a skid track positioned on top of or in floor 20.

Sweep Mechanism 44:

In the arrangement shown, as one example, system 10 includes a sweep mechanism 44 positioned in elongated body 30 of sweep 28. Sweep mechanism 44 is formed of any suitable size, shape, and design and is configured move grain along the length of elongated body 30 and into center sump 24. In the arrangement shown, as one example, sweep mechanism 44 is what is known as a paddle sweep, having a plurality of links 214 that separate adjacent paddles 212.

In the arrangement shown, as one example, the links 214 of sweep mechanism 44 wrap around the sprocket 206 and shaft 204 at the inward end of sweep 28. In the arrangement shown, as one example, the links 214 of sweep mechanism 44 wrap around the sprocket 210 and shaft 208 of the tail section weldment 238 at the outward end of sweep 28. Sprockets 206 and 210 may be toothed wheels, as is shown, or may be any other device that supports or facilitates rotation of another member such as a paddle sweep, a drag chain, a belt, a conveyor, and/or any other grain movement device.

As sweep mechanism 44 rotates around the inward positioned shaft 204 and sprocket 206 and the outward positioned shaft 208 and sprocket 210, the paddles 212 extend downward from links 214 and engage the grain and urge the grain toward center sump 24.

While some arrangements may be primarily shown and/or described with reference to a paddle sweep type sweep mechanism 44, the embodiments are not so limited. Rather, it is contemplated that in some various arrangements, a sweep mechanism 44 may be configured to move grain toward center sump 24 using various methods and/or means including but not limited to, for example, a paddle sweep, a drag chain, a belt, an auger, and/or any other grain moving device.

Tail Section 34:

In the arrangement shown, as one example, sweep 28 includes a tail section 34 connected to the outward end of elongated body 30 of sweep 28. Tail section 34 is formed of any suitable size, shape, and design and is configured to facilitate the rotation of sweep 28 around pivot point 36. In the arrangement shown, as one example, tail section 34 includes tail section weldment 238 and optionally a pusher 42 connected to weldment 238 among other components.

Weldment 238:

In the arrangement shown, as one example, tail section 34 includes a tail section weldment 238. Tail section weldment 238 is formed of any suitable size, shape, and design and is configured to attach to the outward end of elongated body 30 and connect with pusher 42 and/or agitator 46 to facilitate the movement of sweep 28 around pivot point 36. In the arrangement shown, as one example, tail section weldment 238 includes an end frame 246, a back plate 250, a front cover plate 252, a rear cover plate 254, and a front plate 258, which are similar, if not identical to, end frame 172, back plate 190, front cover plate 194, rear cover plate 196, and front plate 200 described with reference to sections 170.

Pusher 42:

In one or more arrangements, system 10 includes one or more pushers 42. Pushers 42 are formed of any suitable size, shape, and design and are configured to rotate a drive wheel 290 or track to facilitate movement of sweep 28. In the arrangement shown, as one example, pusher 42 includes a drive wheel 290, a mounting assembly 292, and a drivetrain 294, among other components. Mounting assembly 292 is formed of any suitable size, shape, and design and is configured to operably connect front drive wheel 290 and drivetrain 294 to sweep 28. In the arrangement shown, as one example, mounting assembly 292 includes a pair of arms configured to operably connect an axle of drive wheel 290 with weldment 238 of tail section 34 of sweep 28.

Drivetrain 294 is formed of any suitable size, shape, and design and is configured to operably connect with and rotate drive wheel 290 to facilitate movement of sweep 28. In the arrangement shown, as one example, drivetrain 294 is configured to mechanically connect an axle of drive wheel 290 with shaft 208 at outward end of sweep mechanism 44. In this example arrangement, rotation of sweep mechanism 44 causes drive wheel 290 to rotate thereby powering pusher 42 by the same motor used to drive sweep mechanism (e.g. motor 92). In one or more arrangements, drivetrain 294 may include a gearbox configured to transmit rotational energy and force from the shaft 208 of sweep mechanism 44 to drive wheel 290. In some arrangements, such a gearbox may be configured to rotate drive wheel 290 at a fixed gear ratio (e.g., 1:1, 1:2, 1:4, and/or any other ratio) relative to shaft 208. Additionally or alternatively, in one or more arrangements, the gearbox of drivetrain 294 may be configured to adjust rotation speed of drive wheel 290 relative to shaft 208 dynamically during operation to facilitate control of forward movement of sweep 28 that is independent of sweep mechanism 44. Such independent control of drive wheel 290 may be desirable, for example to maintain sweep 28 in position to contact with grain to optimize movement of grain by sweep mechanism 44.

Although one or more arrangements may be primarily discussed and/or illustrated with reference to a drivetrain 294 configured to pusher 42 by operably connecting pusher 42 to sweep mechanism 44, the embodiments are not so limited. Rather, it is contemplated that in one or more arrangements, pusher 42 may be powered by a separate motor (e.g., connected to drivetrain 294 and/or directly to drive wheel 290) to facilitate powering of pusher 42 independent of sweep 28 and/or grain conveyor 26.

Tail Section Support:

Conventional grain sweeps utilize one or more drive wheels 290 positioned behind the sweep to push the sweep around its pivot point. However, it can be difficult for such drive wheels 290 to support the weight of sweep 28 and/or grain at an outward end of sweep 28. Accordingly, some sweep systems utilize foam filed tires to provide additional support at the outward end of sweep 28. However, such tires can be expensive and difficult to source. Additionally or alternatively, some sweep systems include an additional carrier wheel at the outward end to provide additional support. However, through careful observation, it has been surprisingly discovered that such carrier can get stuck on grain and/or inhibit forward movement of sweep 28. In addition to or in lieu of drive wheels 290 and/or carrier wheels 220, in one or more arrangements, system 10 includes one or more agitators 46 configured to provide support for the outward and of sweep 28.

Figure 15:
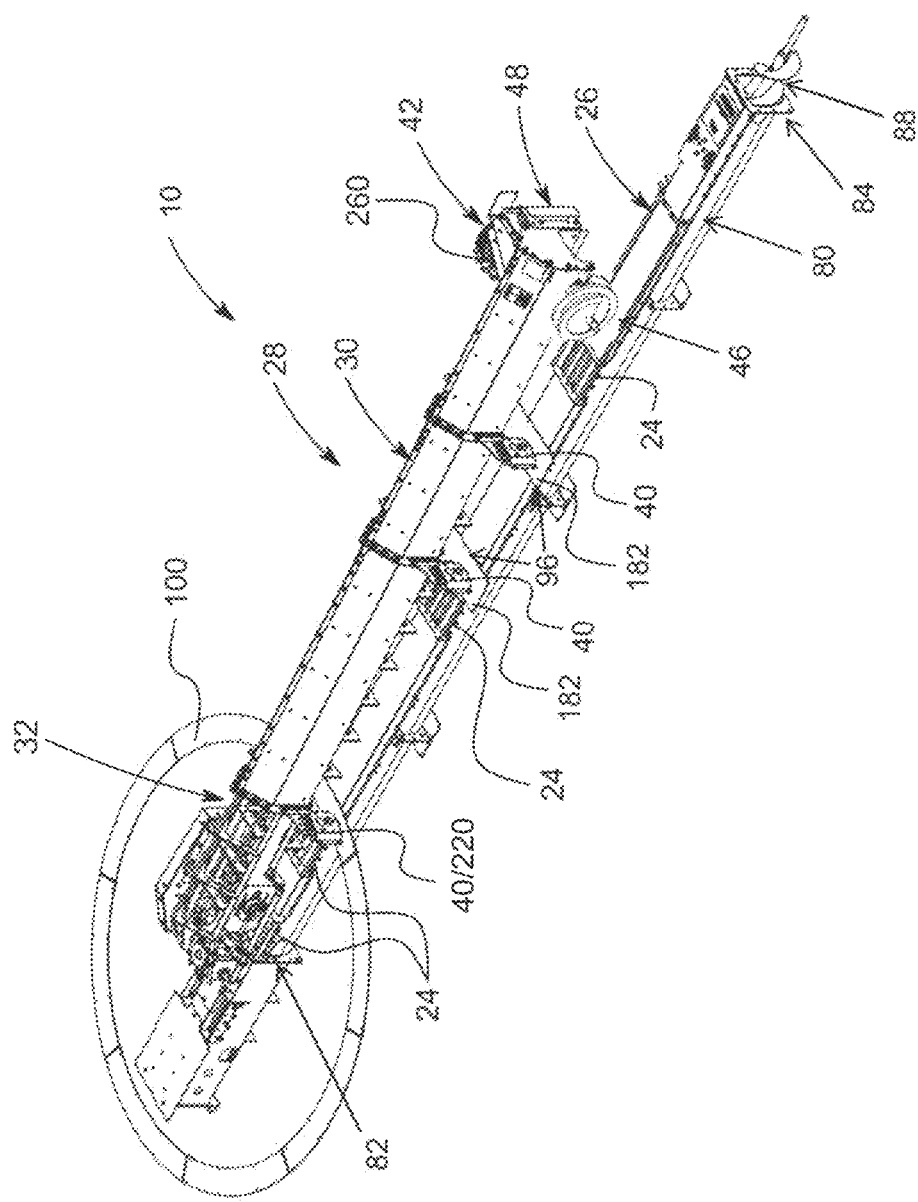
FIG. 15 shows an upper front left perspective view of a sweep of an exemplary sweep system, in accordance with one or more embodiments; the view showing the sweep system positioned above an exemplary grain conveyor; the view showing the elevated floor omitted; the view showing a drive wheel and an agitator supporting an outward end of the sweep.
Figure 16:
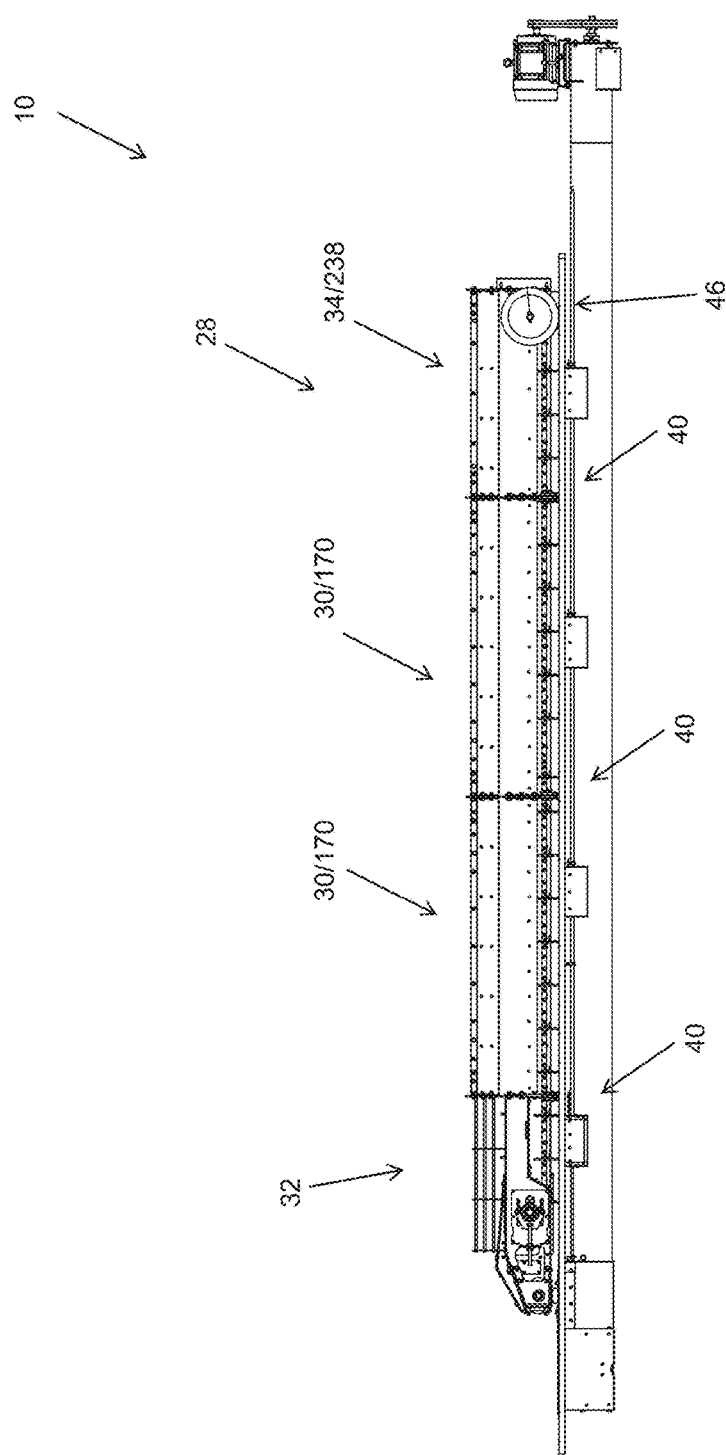
FIG. 16 shows a front view of a sweep of an exemplary sweep system, in accordance with one or more embodiments; the view showing the sweep system positioned above an exemplary grain conveyor; the view showing a drive wheel and an agitator supporting an outward end of the sweep.
Figure 17:
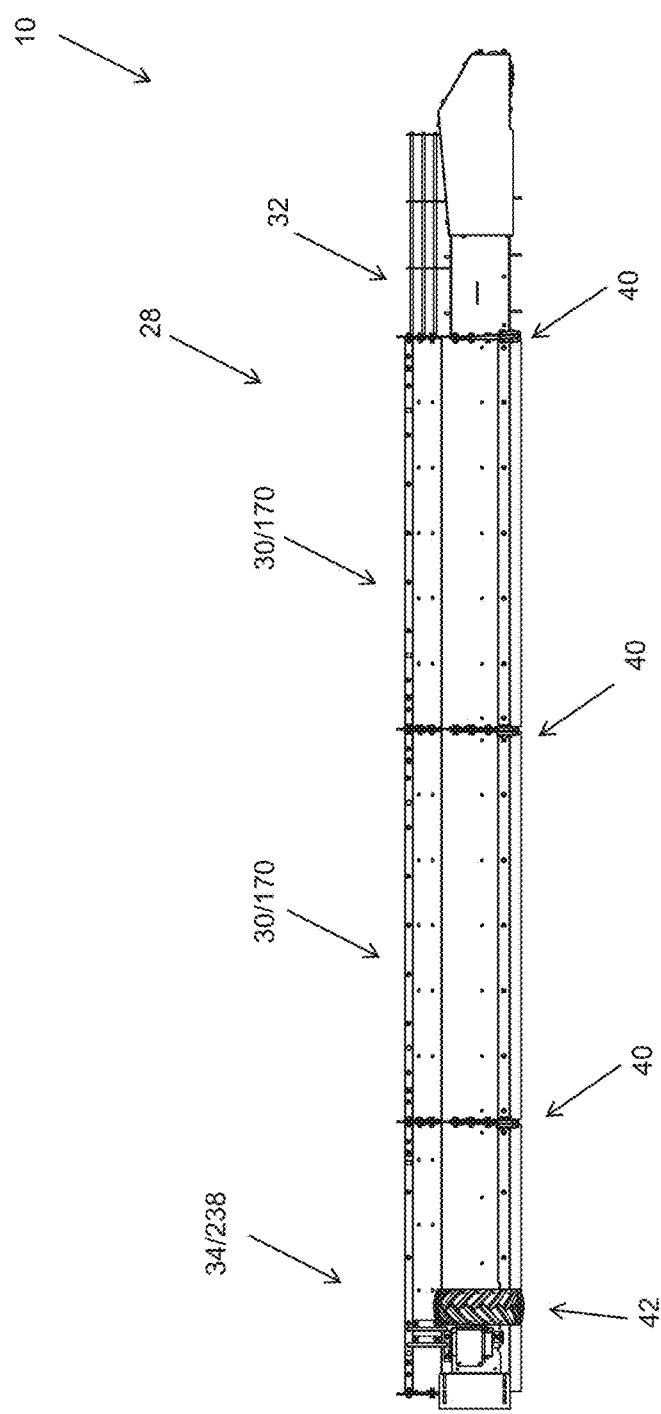
FIG. 17 shows a rear view of a sweep of an exemplary sweep system, in accordance with one or more embodiments.
Figure 18:
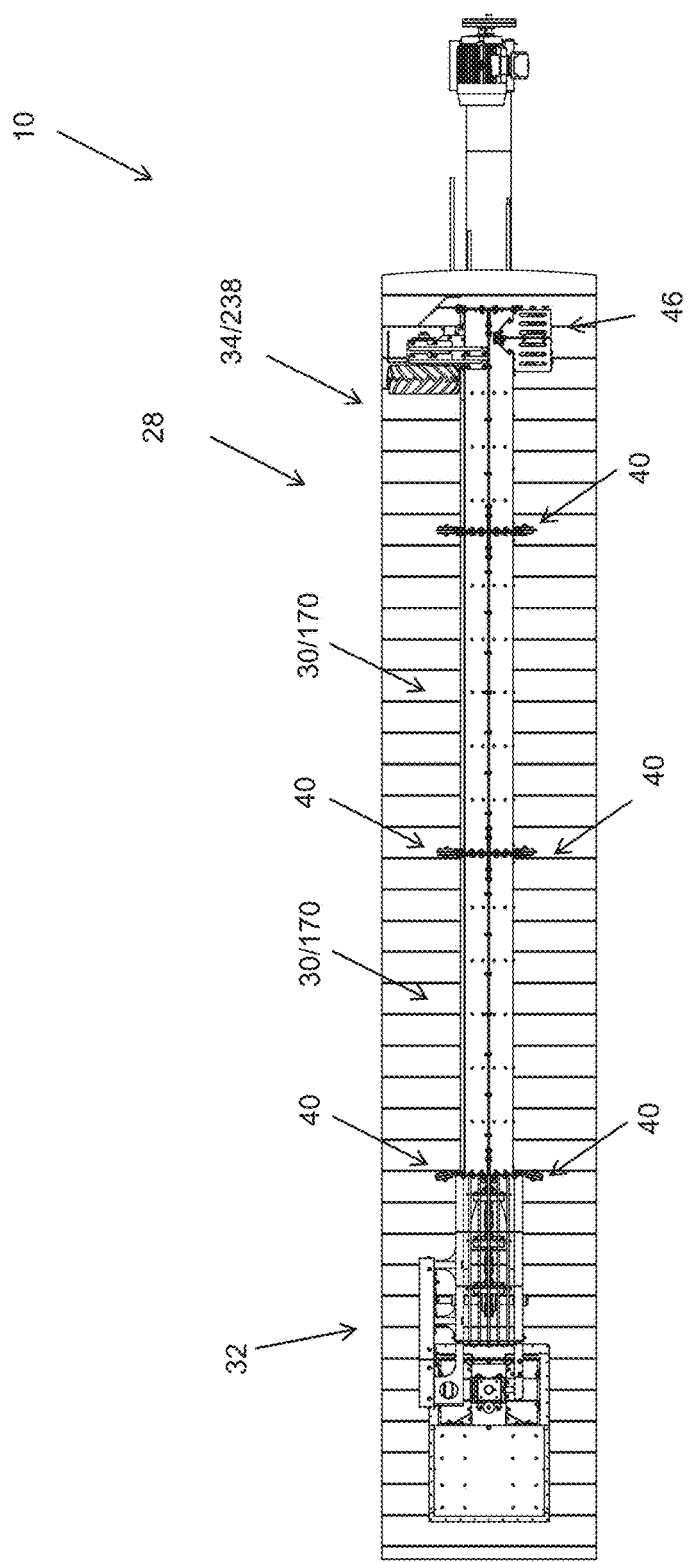
FIG. 18 shows a top of an exemplary sweep system, in accordance with one or more embodiments; the view showing a drive wheel and an agitator supporting an outward end of the sweep.
Figure 19:
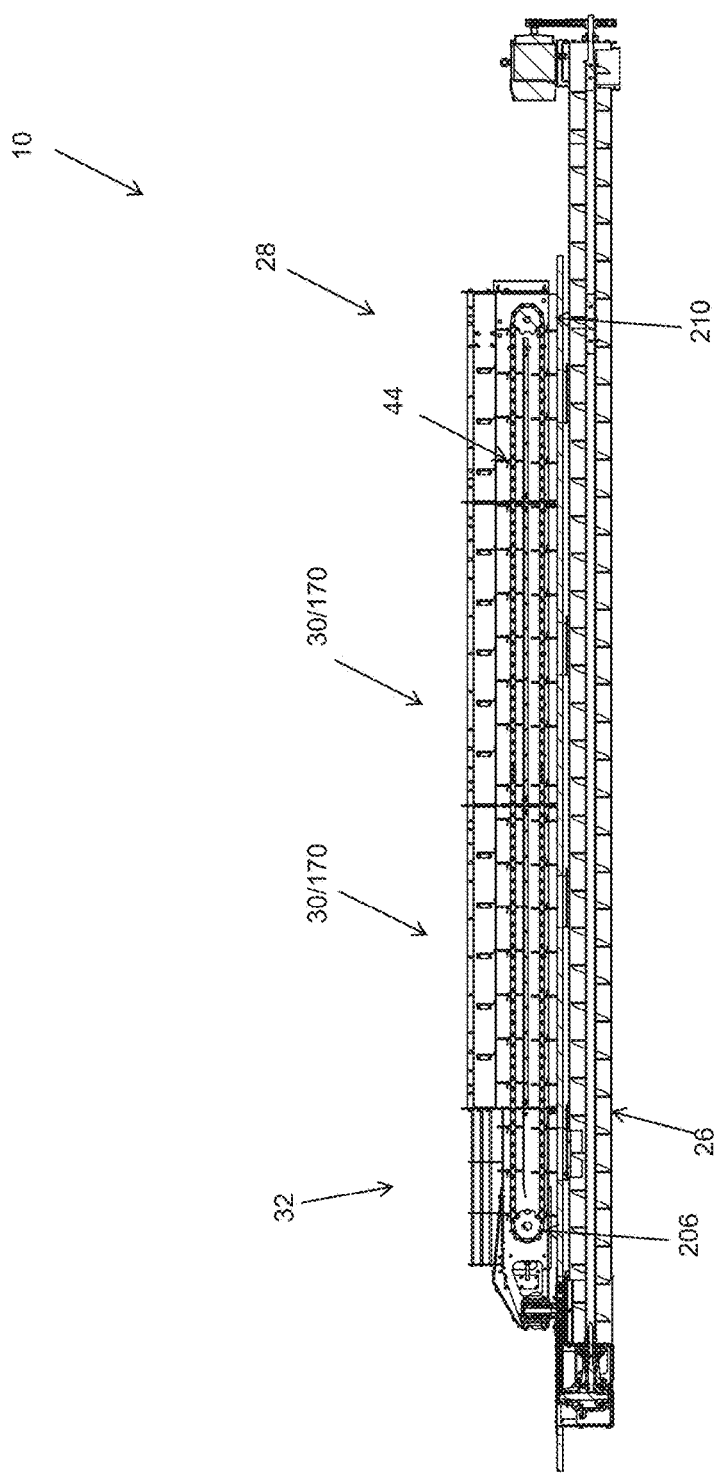
FIG. 19 shows a front cross section view of an exemplary sweep system, in accordance with one or more embodiments, the view showing a sweep positioned over a grain conveyer of the system.
Figure 20:
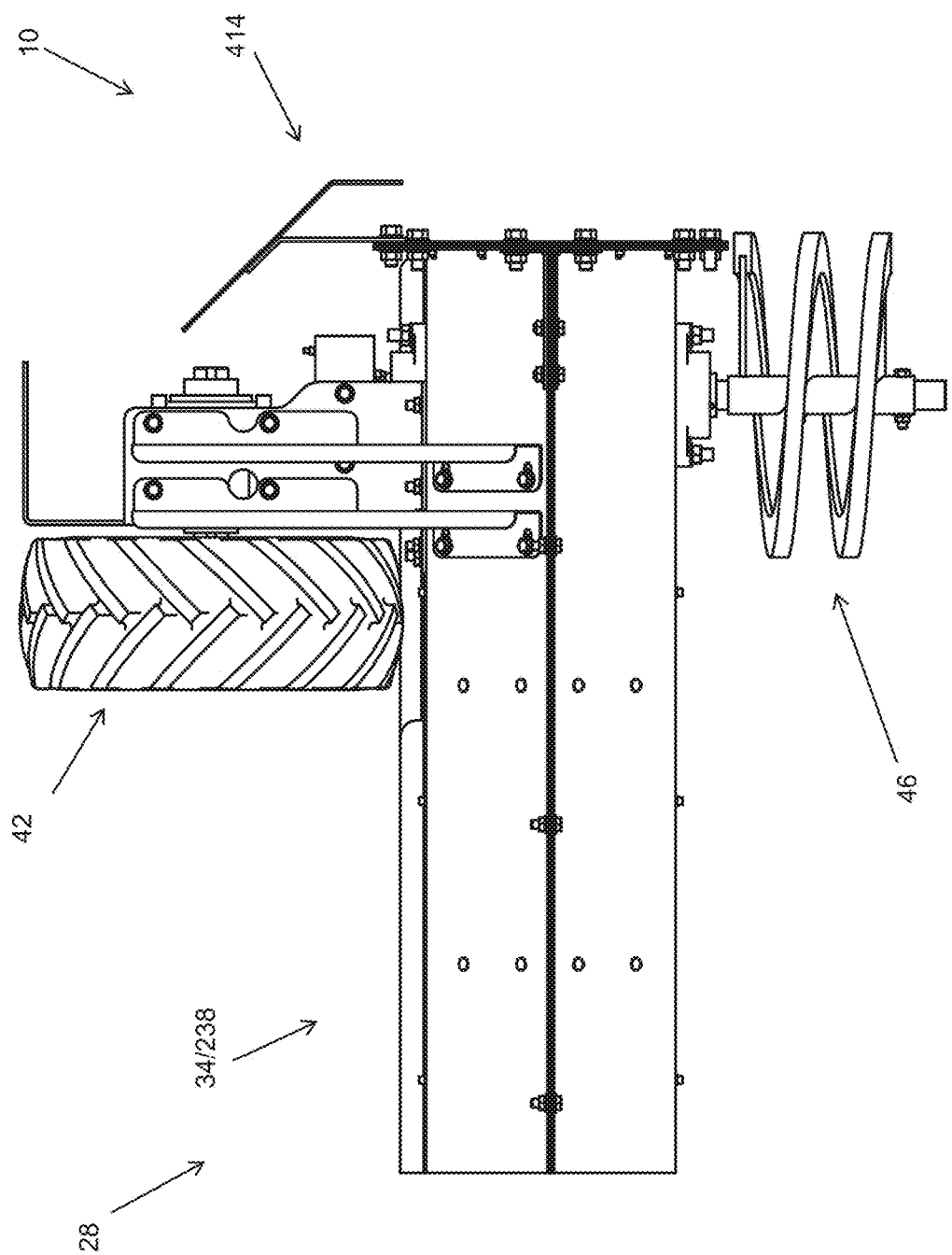
FIG. 20 shows a top view of a tail section of a sweep of an exemplary sweep system, in accordance with one or more embodiments; the view showing a drive wheel and a helical agitator supporting an outward end of the sweep.
Figure 21:
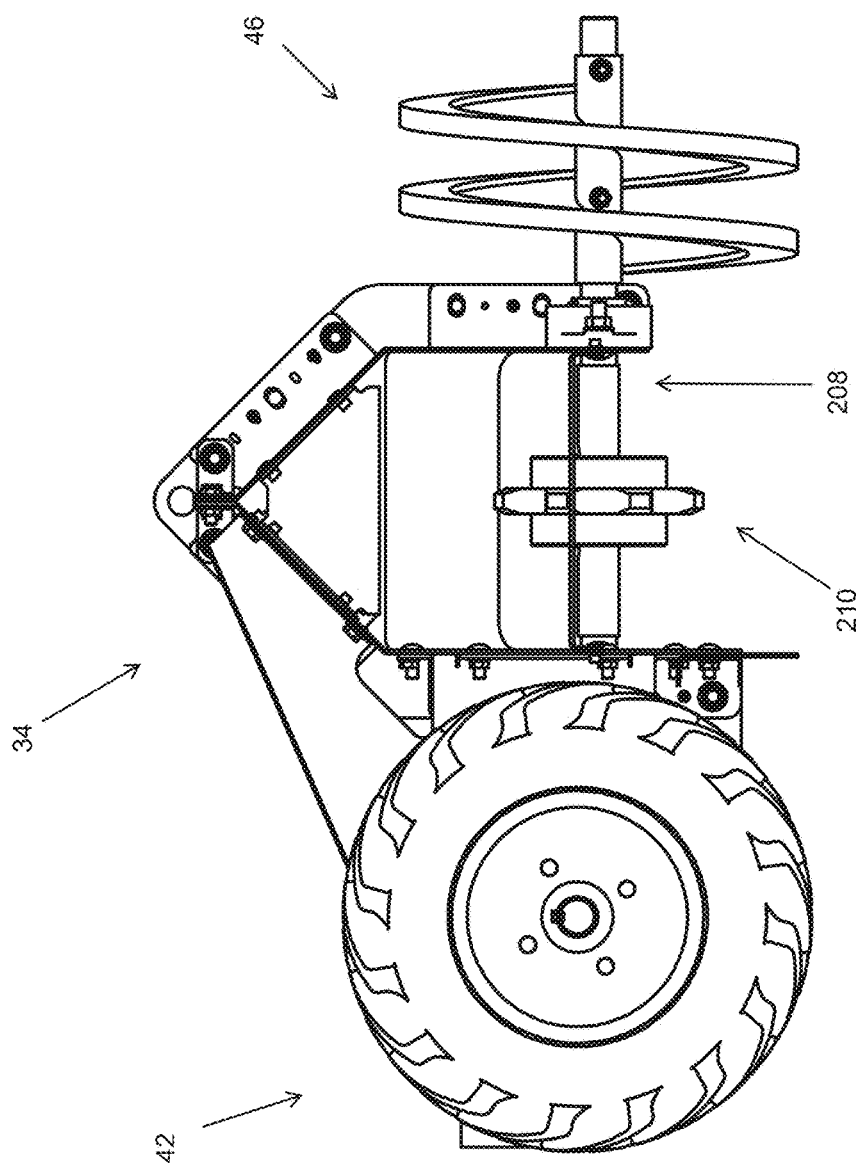
FIG. 21 shows a cross section view of a tail section of a sweep of an exemplary sweep, in accordance with one or more embodiments; the view showing a drive wheel and a helical agitator supporting an outward end of the sweep.
Figure 22:
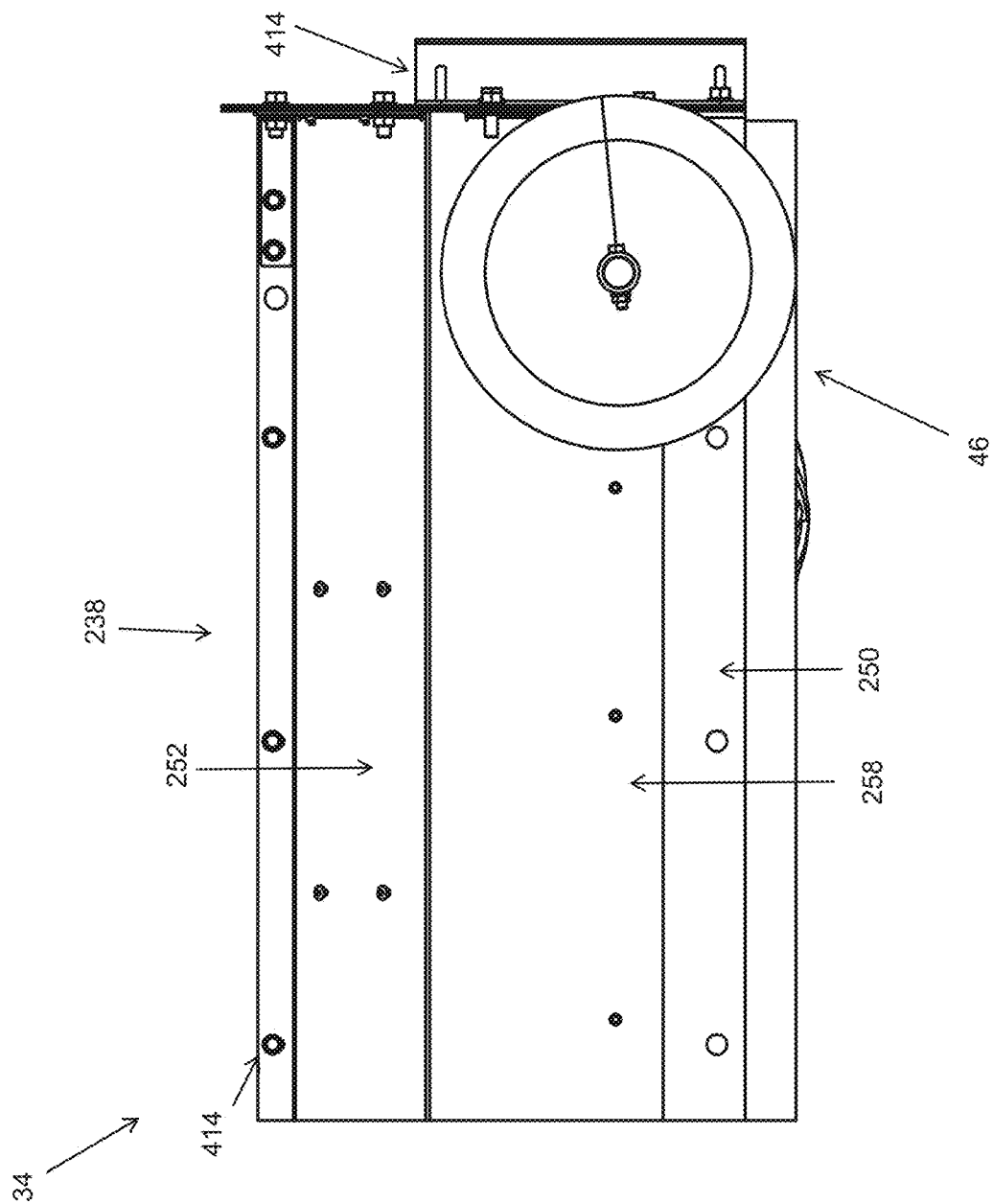
FIG. 22 shows a front view of a tail section of a sweep of an exemplary sweep, in accordance with one or more embodiments; the view showing a helical agitator supporting an outward end of the sweep.
Figure 23:
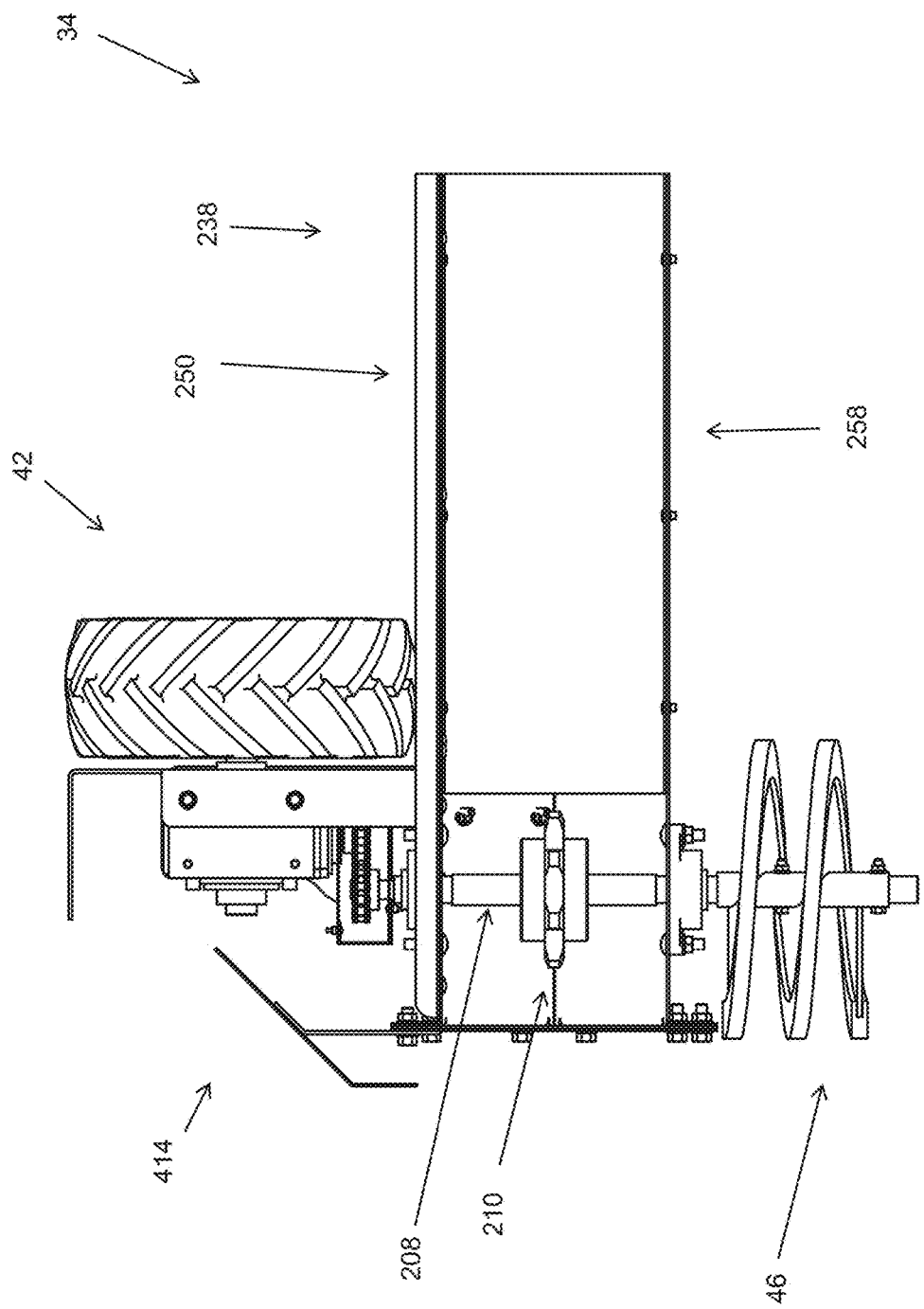
FIG. 23 shows a bottom view of a tail section of a sweep of an exemplary sweep, in accordance with one or more embodiments; the view showing a drive wheel and a helical agitator supporting an outward end of the sweep.
Figure 24:
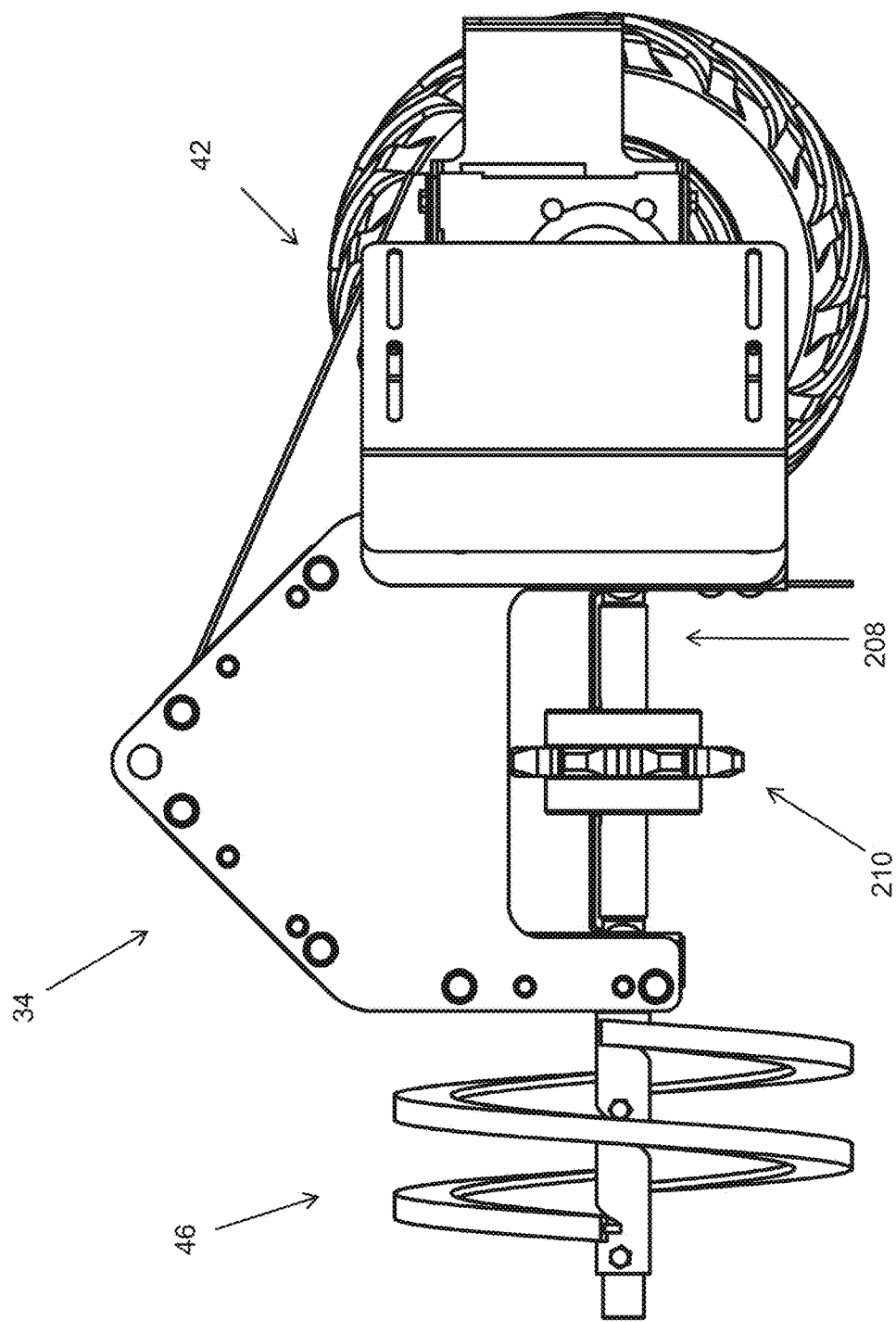
FIG. 24 shows a right side view of a sweep of an exemplary sweep, in accordance with one or more embodiments; the view showing a drive wheel and a helical agitator supporting an outward end of the sweep.
Figure 25:
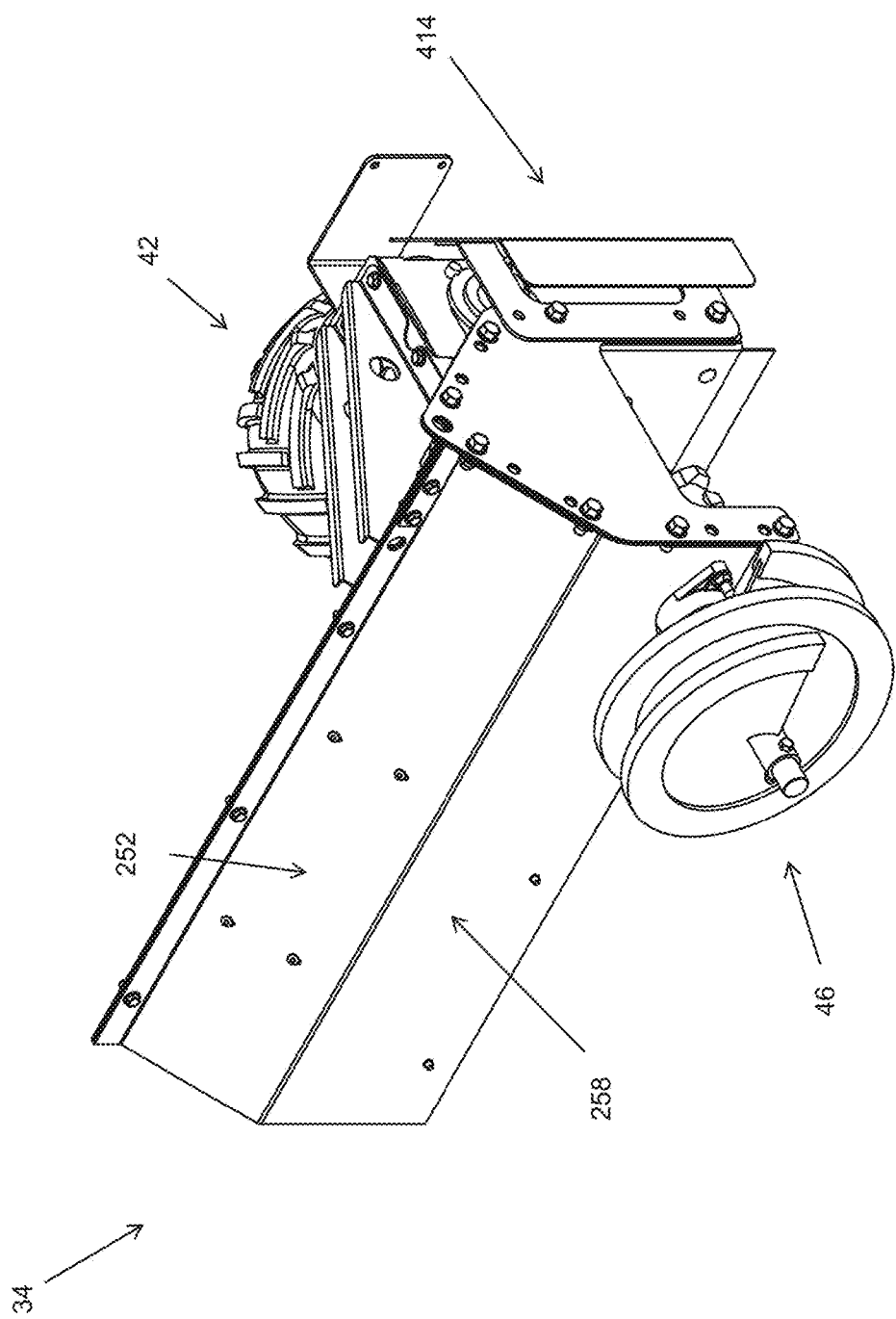
FIG. 25 shows an upper front right side view of a sweep of an exemplary sweep, in accordance with one or more embodiments; the view showing a drive wheel and a helical agitator supporting an outward end of the sweep.
Figure 26:
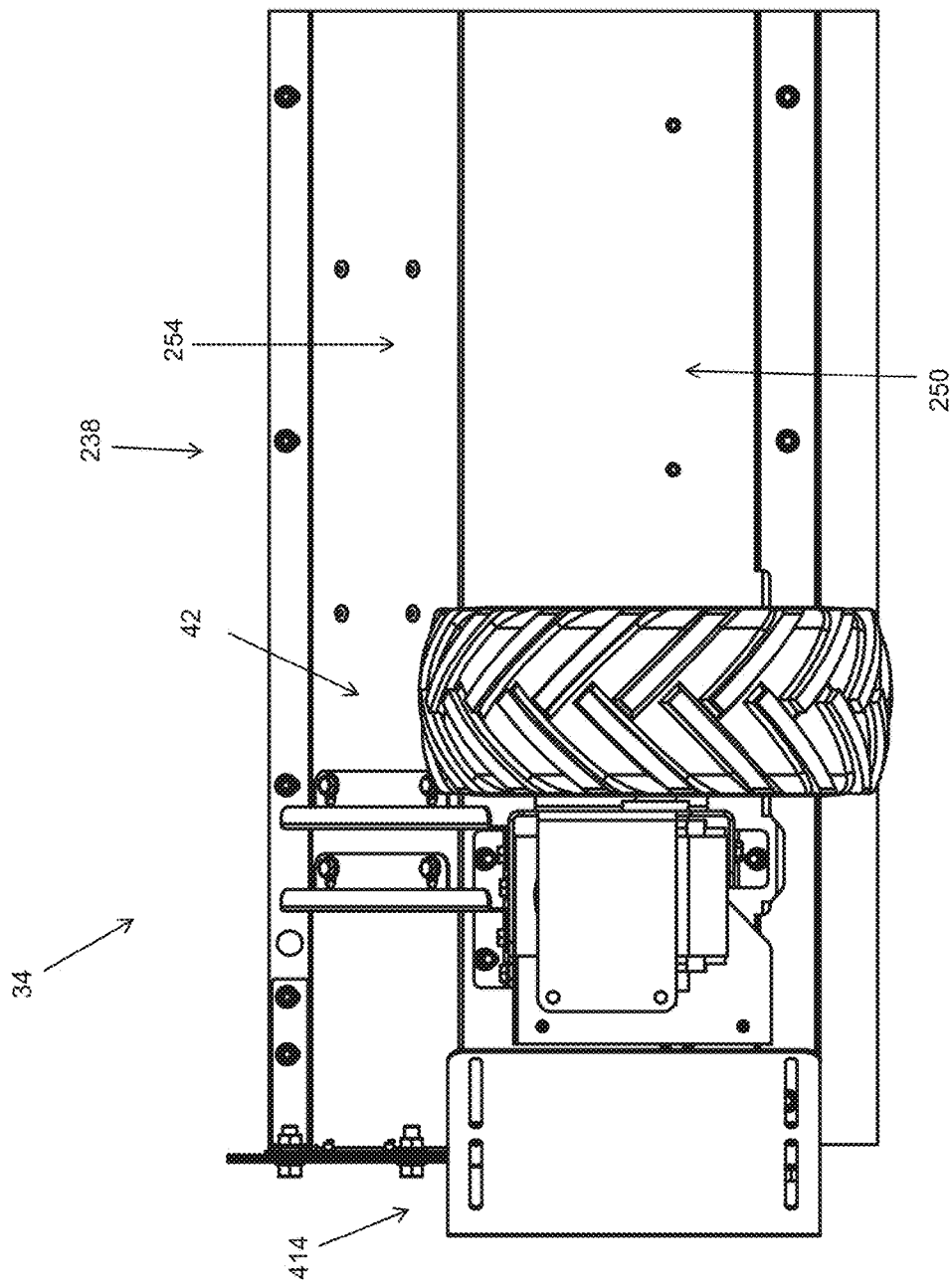
FIG. 26 shows a rear view of a sweep of an exemplary sweep system, in accordance with one or more embodiments.
Figure 27D:
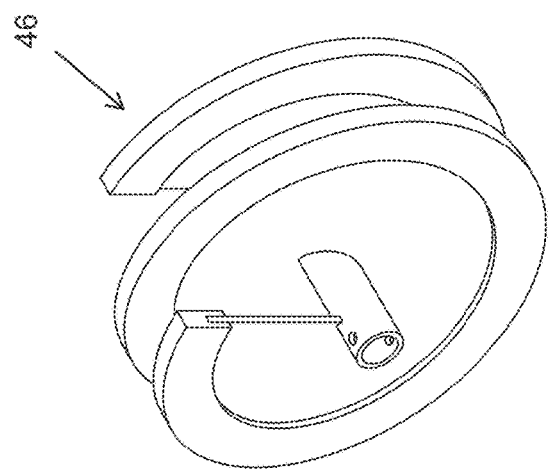
FIG. 27D shows an upper front left perspective view of a helical agitator for use with a sweep system, in accordance with one or more embodiments.
Figure 27B:
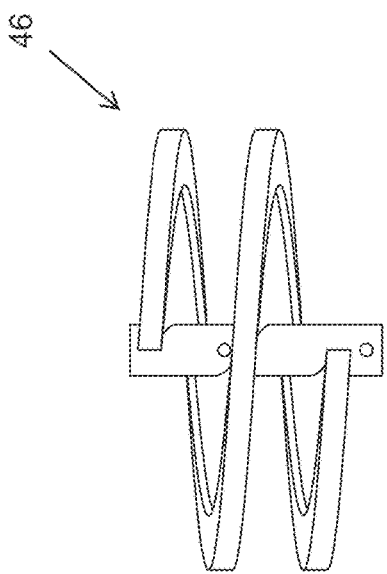
FIG. 27B shows a top view of a helical agitator for use with a sweep system, in accordance with one or more embodiments.
Figure 27C:
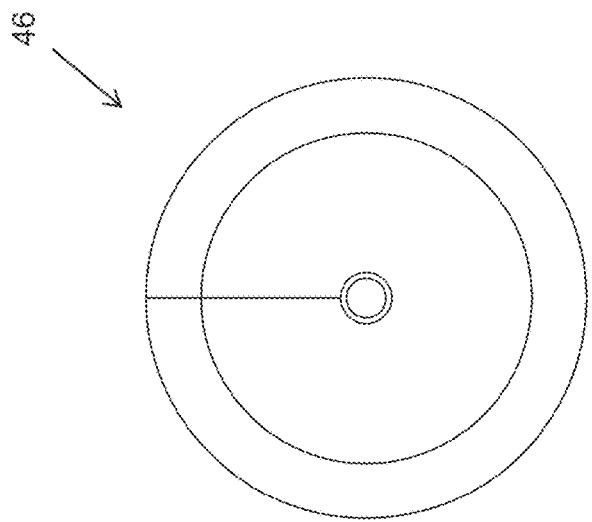
FIG. 27C shows a front view of a helical agitator for use with a sweep system, in accordance with one or more embodiments.
Figure 27A:
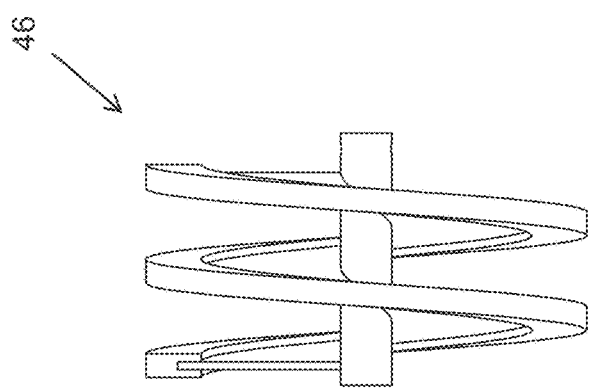
FIG. 27A shows a left side view of a helical agitator for use with a sweep system, in accordance with one or more embodiments.
Figure 28:
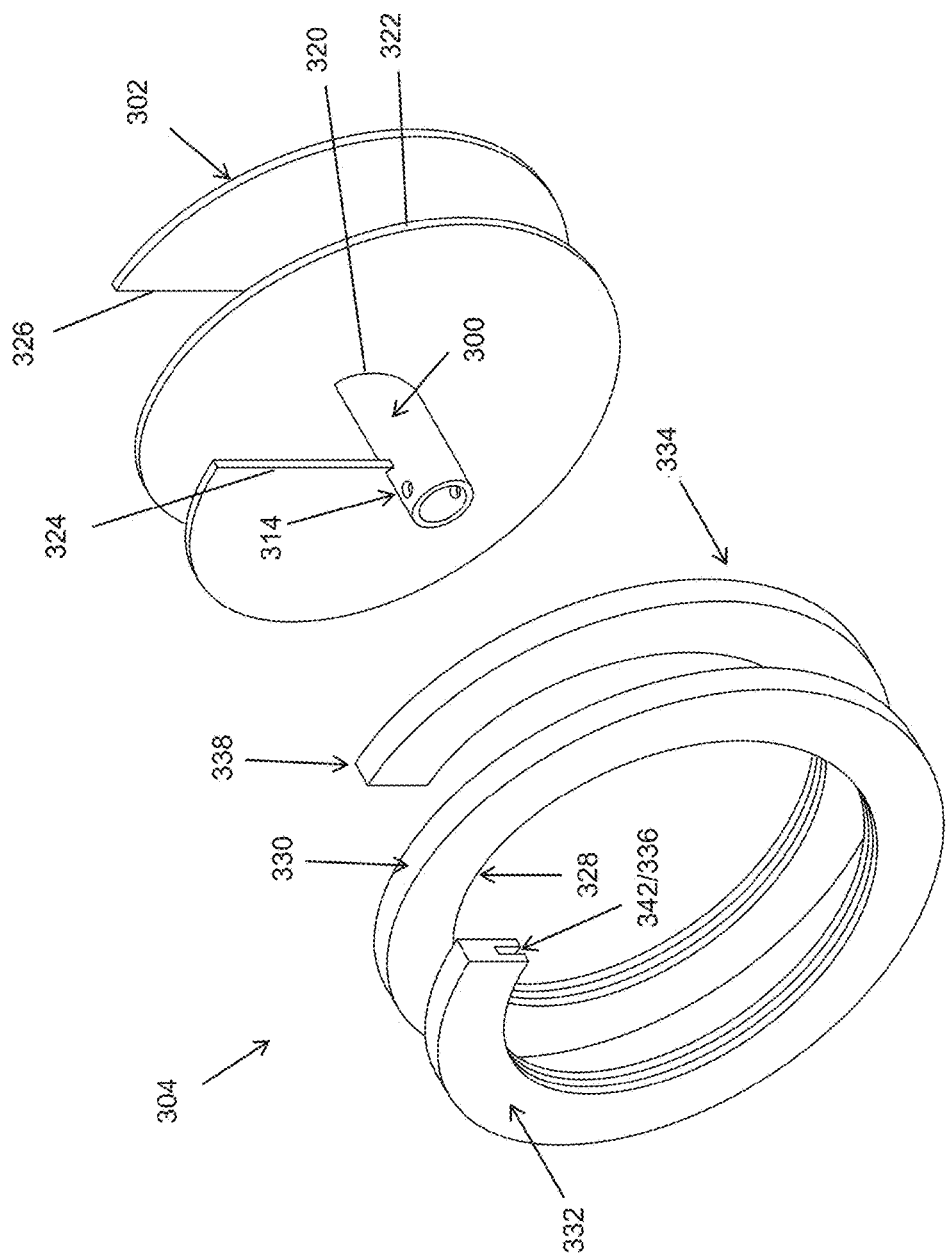
FIG. 28 shows an exploded upper front left perspective view of a helical agitator for use with a sweep system, in accordance with one or more embodiments.
Figure 29D:
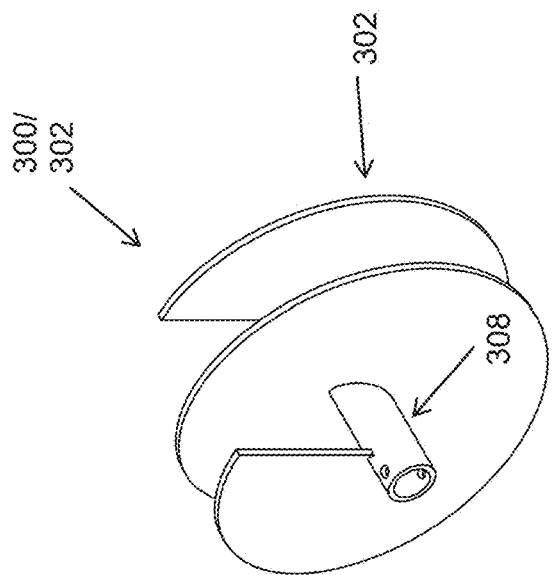
FIG. 29D shows an upper front left perspective view of a central hub of a helical agitator for use with a sweep system, in accordance with one or more embodiments.
Figure 29B:
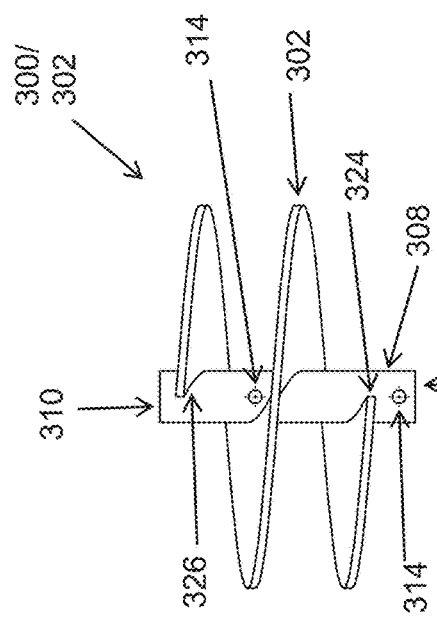
FIG. 29B shows a top view of a central hub of a helical agitator for use with a sweep system, in accordance with one or more embodiments.
Figure 29C:
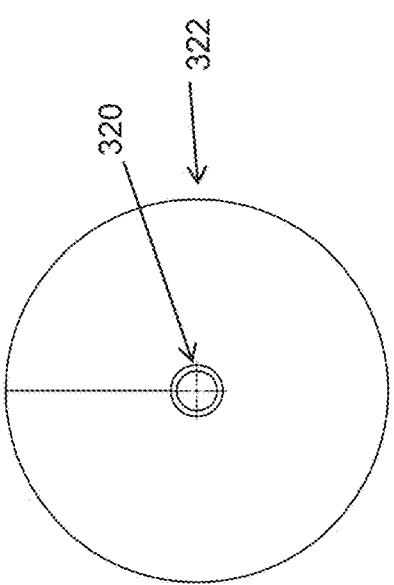
FIG. 29C shows a front view of a central hub of a helical agitator for use with a sweep system, in accordance with one or more embodiments.
Figure 29A:
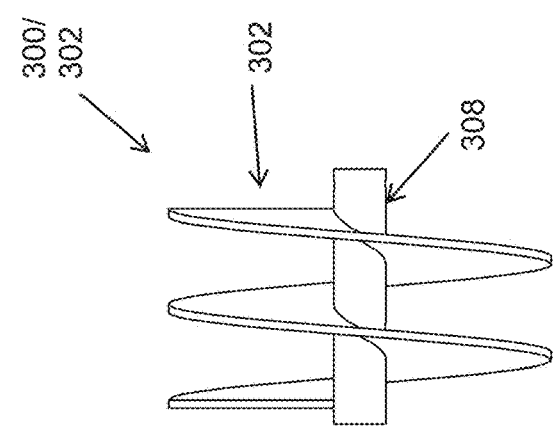
FIG. 29A shows a left side view of a central hub of a helical agitator for use with a sweep system, in accordance with one or more embodiments.
Figure 30D:
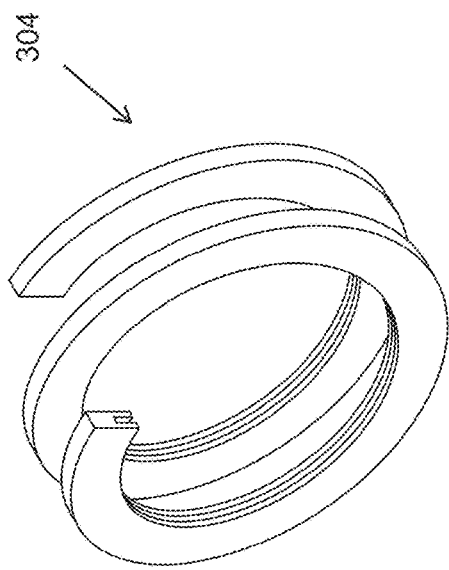
FIG. 30D shows an upper front left perspective view of a rim member of a helical agitator for use with a sweep system, in accordance with one or more embodiments.
Figure 30B:
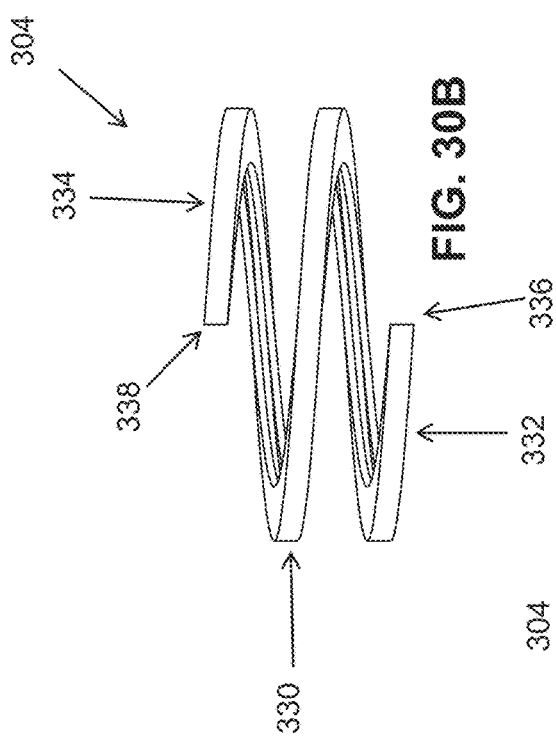
FIG. 30B shows a top view of a rim member of a helical agitator for use with a sweep system, in accordance with one or more embodiments.
Figure 30C:
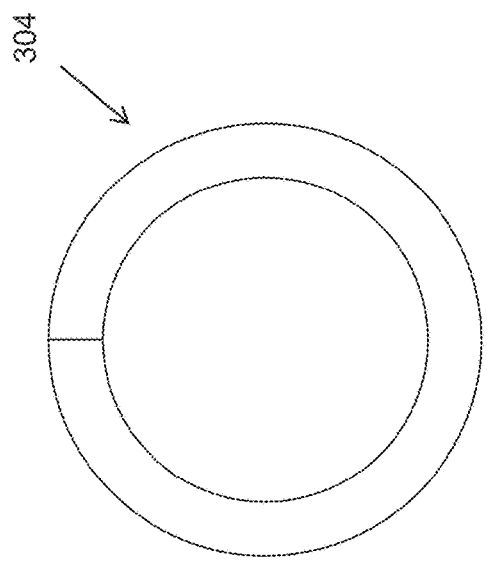
FIG. 30C shows a front view of a rim member of a helical agitator for use with a sweep system, in accordance with one or more embodiments.
Figure 30A:
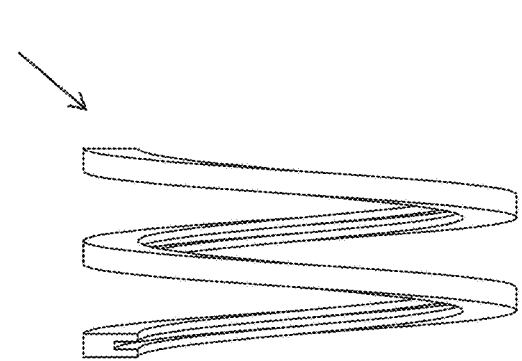
FIG. 30A shows a left side view of a rim member of a helical agitator for use with a sweep system, in accordance with one or more embodiments.
Figure 31:
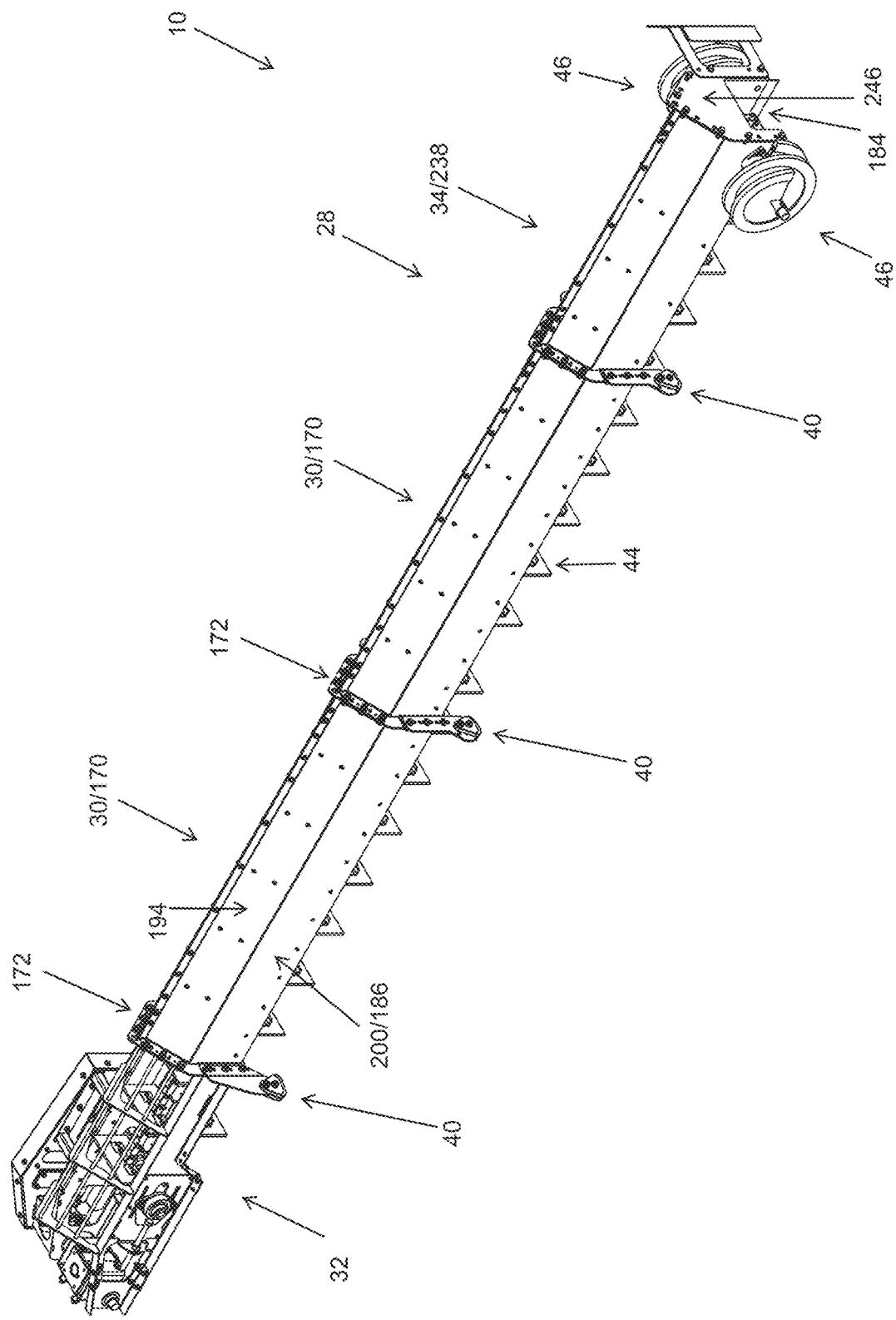
FIG. 31 shows an upper front left perspective view of a sweep of an exemplary sweep system, in accordance with one or more embodiments; the view showing a front helical agitator and a rear helical agitator supporting an outward end of the sweep.
Figure 32:
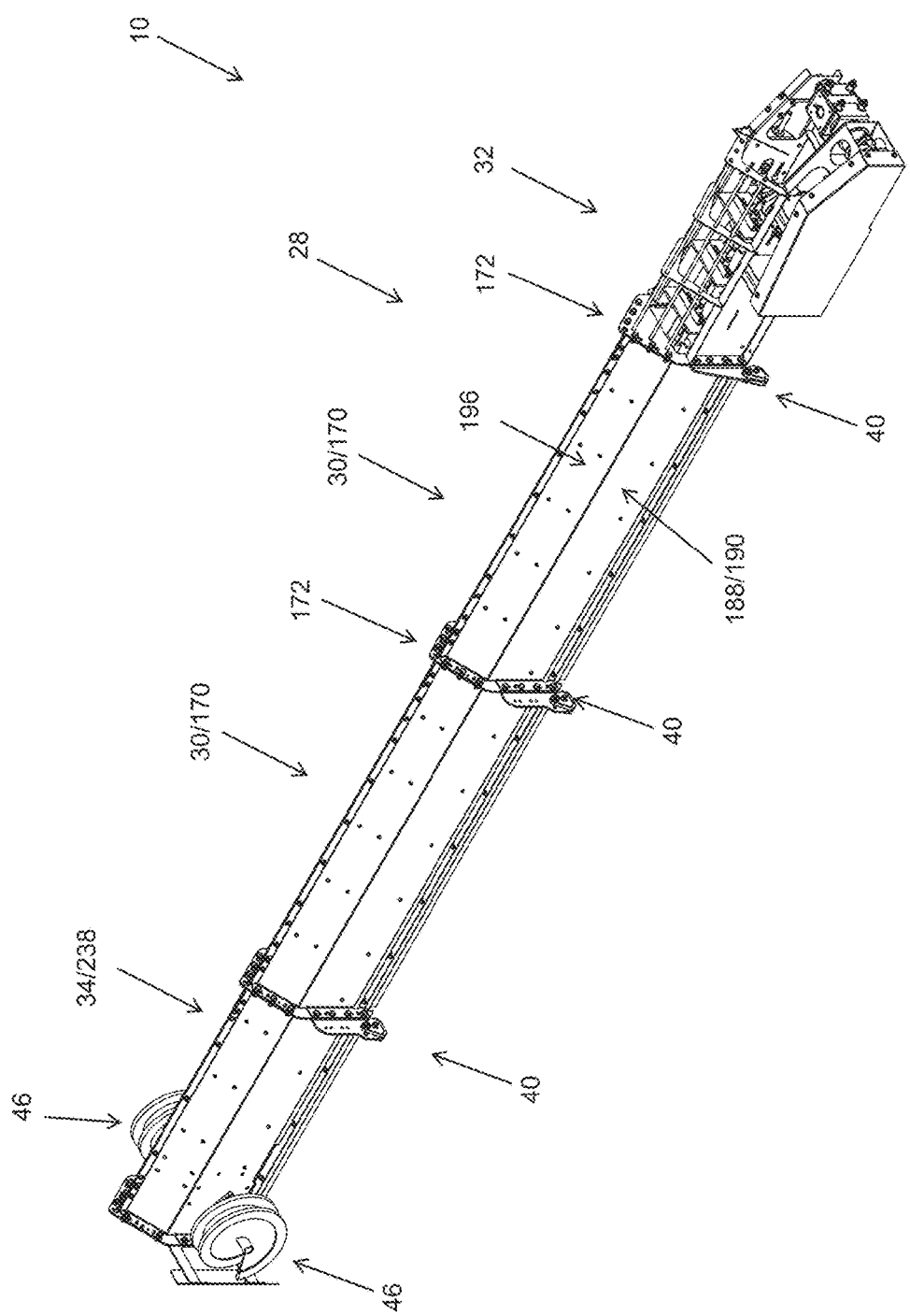
FIG. 32 shows an upper rear right perspective view of a sweep of an exemplary sweep system, in accordance with one or more embodiments; the view showing a front helical agitator and a rear helical agitator supporting an outward end of the sweep.
Figure 33:
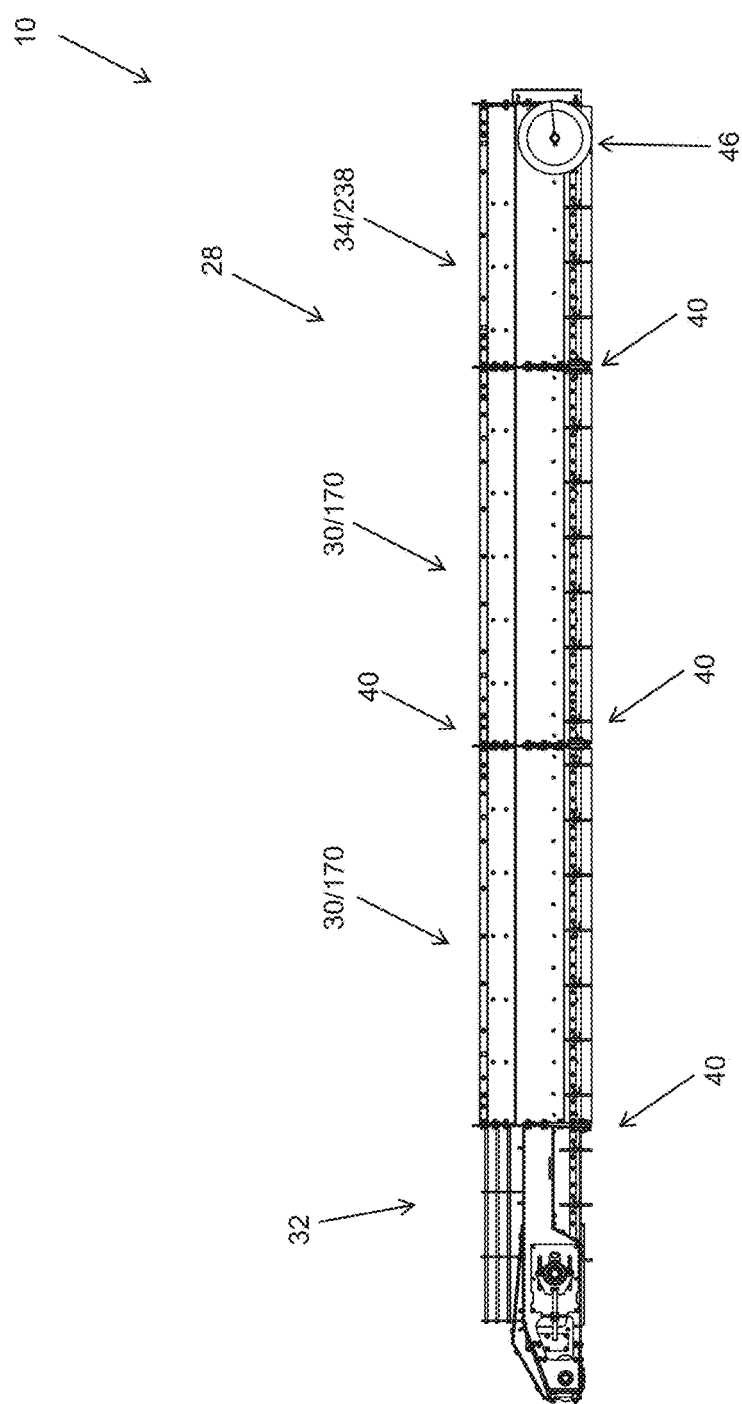
FIG. 33 shows a front view of a sweep of an exemplary sweep system, in accordance with one or more embodiments; the view showing a front helical agitator supporting an outward end of the sweep.
Figure 34:
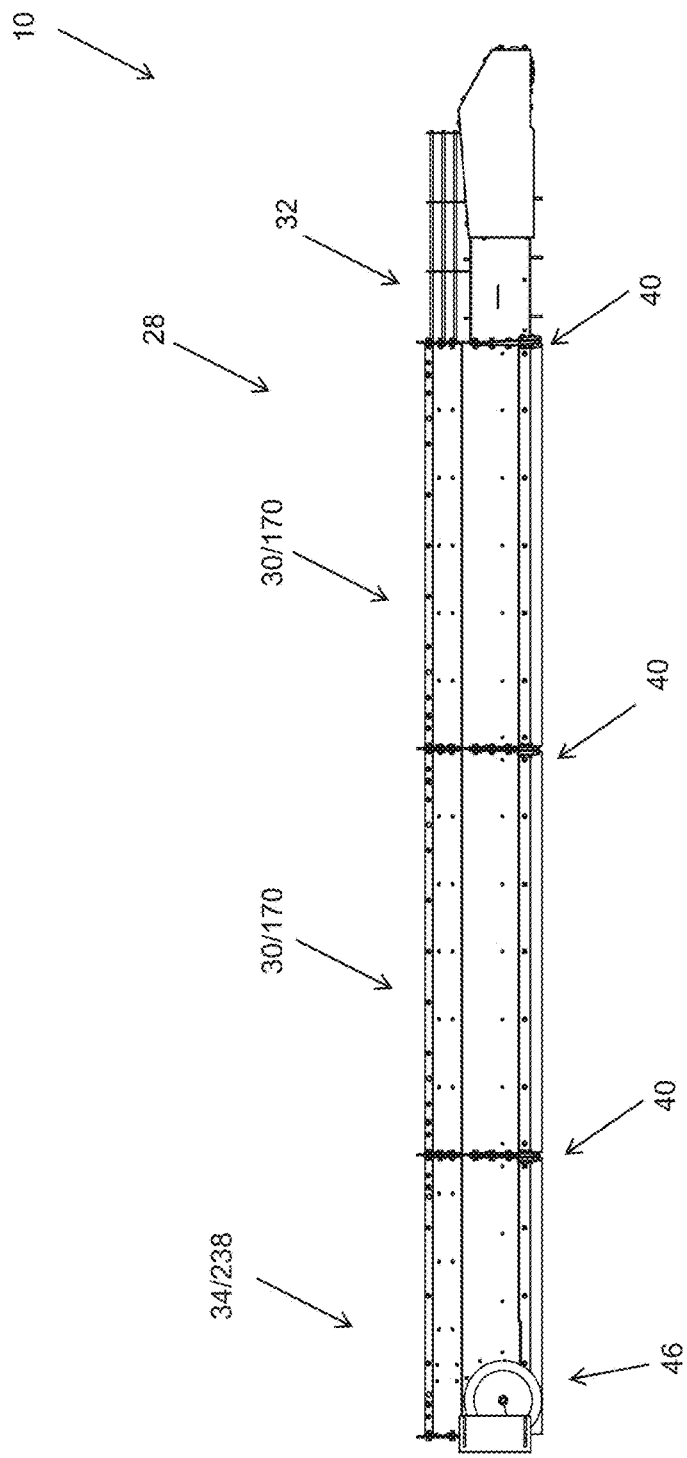
FIG. 34 shows a rear view of a sweep of an exemplary sweep system, in accordance with one or more embodiments; the view showing a rear helical agitator supporting an outward end of the sweep.
Figure 35:
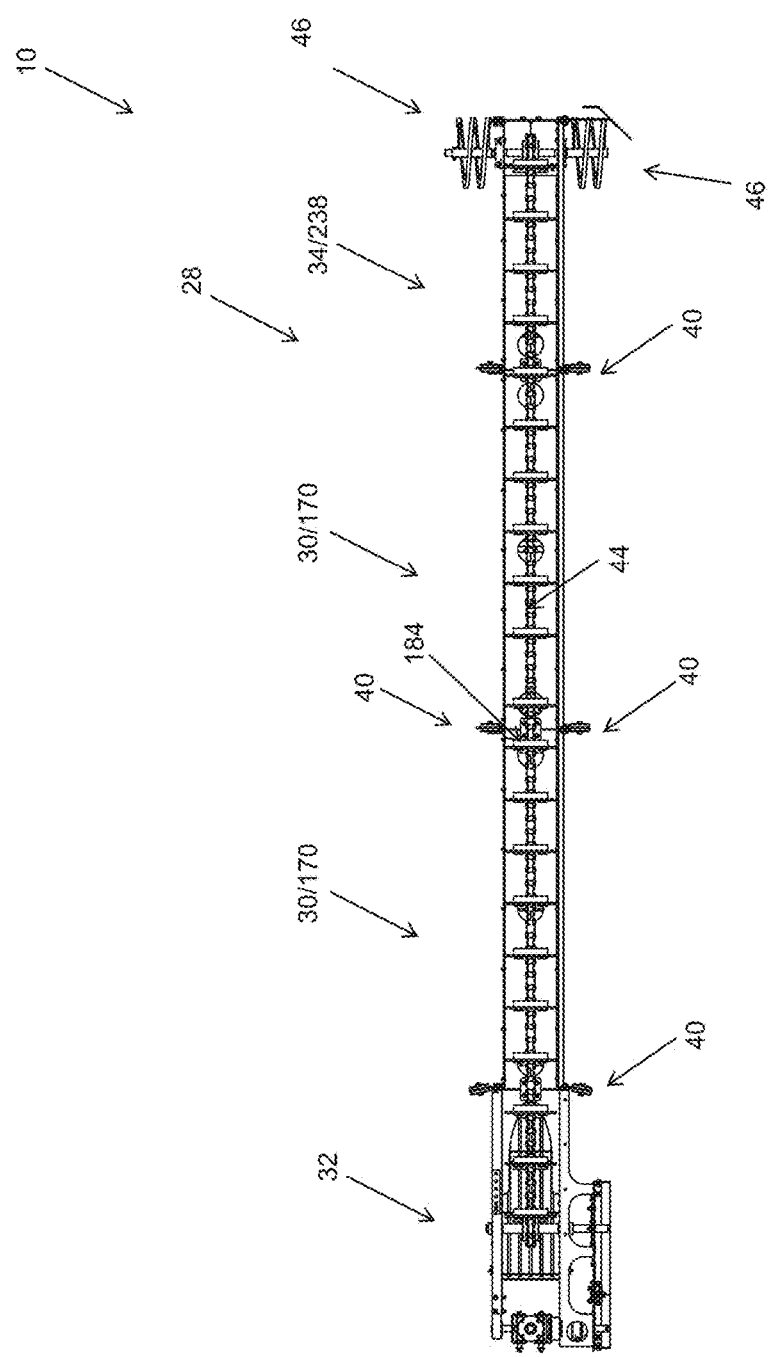
FIG. 35 shows a bottom view of a sweep of an exemplary sweep system, in accordance with one or more embodiments; the view showing a front helical agitator and a rear helical agitator supporting an outward end of the sweep.
Figure 36:
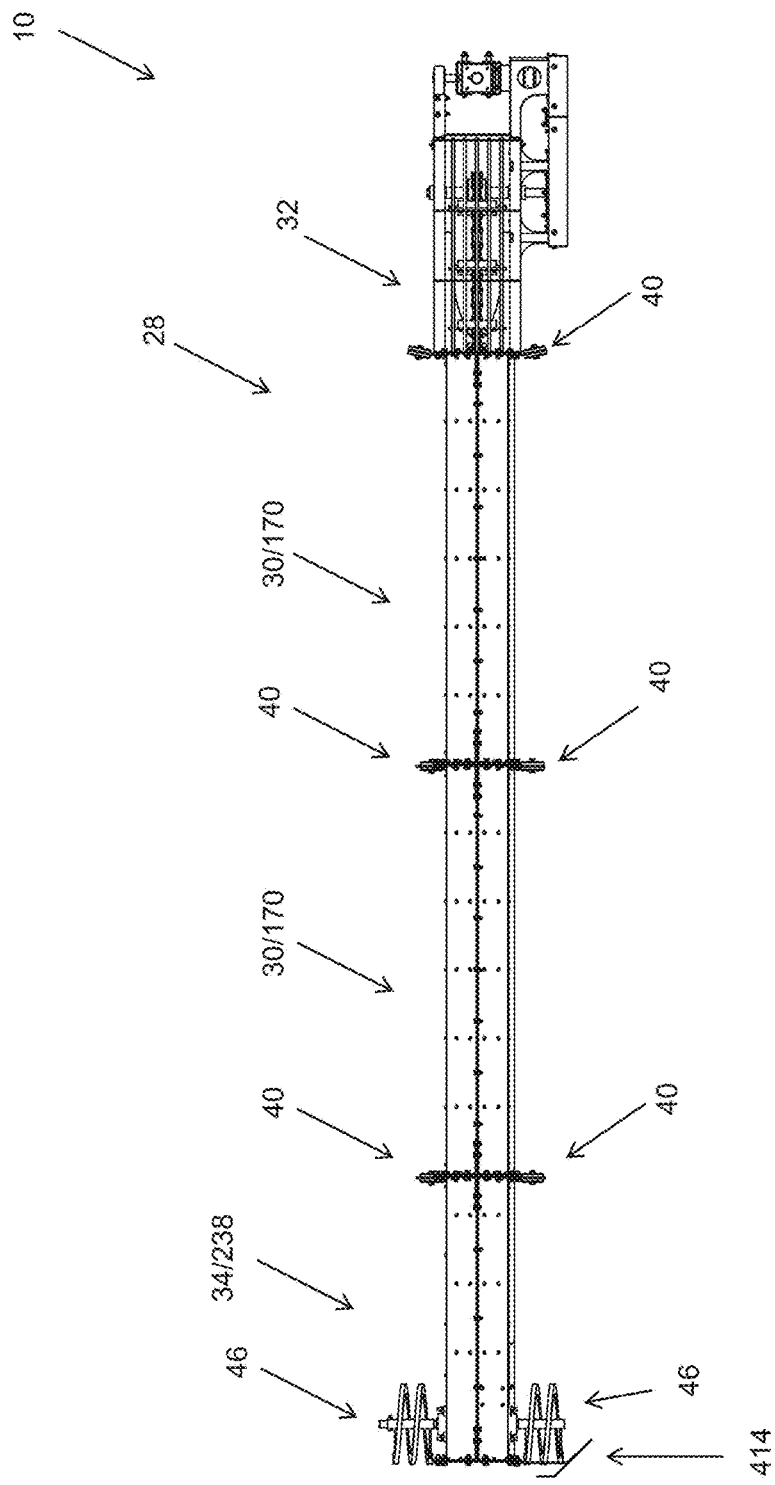
FIG. 36 shows a top view of a sweep of an exemplary sweep system, in accordance with one or more embodiments; the view showing a front helical agitator and a rear helical agitator supporting an outward end of the sweep.
Figure 37:
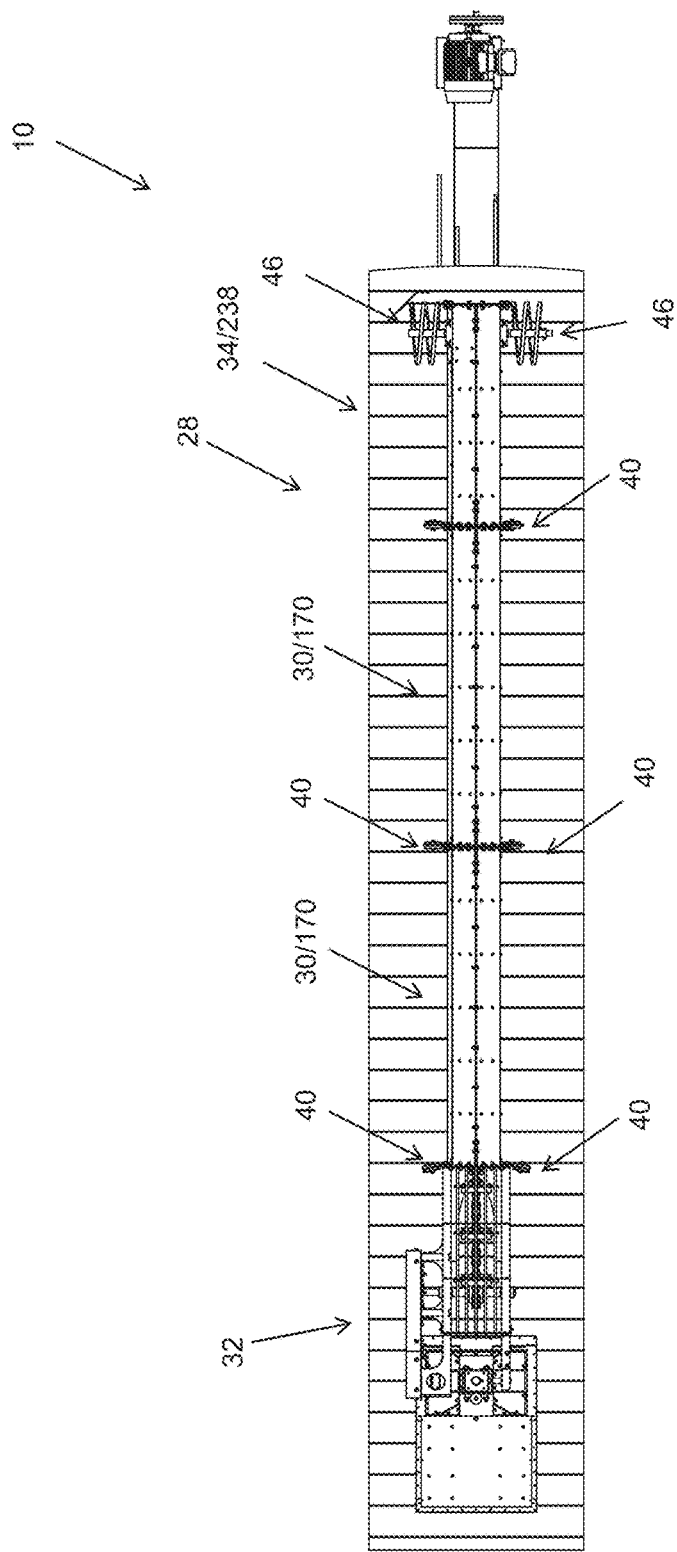
FIG. 37 shows a top view of a sweep of an exemplary sweep system, in accordance with one or more embodiments; the view showing a front helical agitator and a rear helical agitator supporting an outward end of the sweep.
Figure 38:
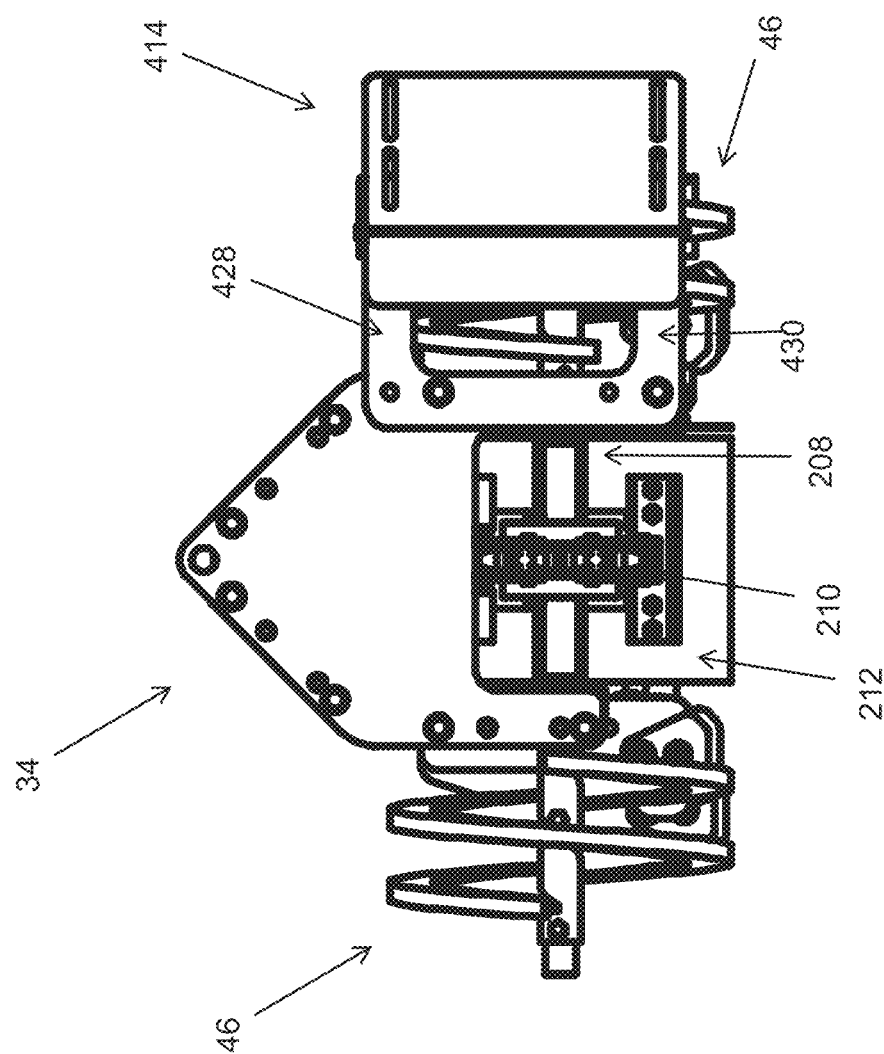
FIG. 38 shows a left side view of a sweep of an exemplary sweep system, in accordance with one or more embodiments; the view showing a front helical agitator and a rear helical agitator supporting an outward end of the sweep.
Figure 39:
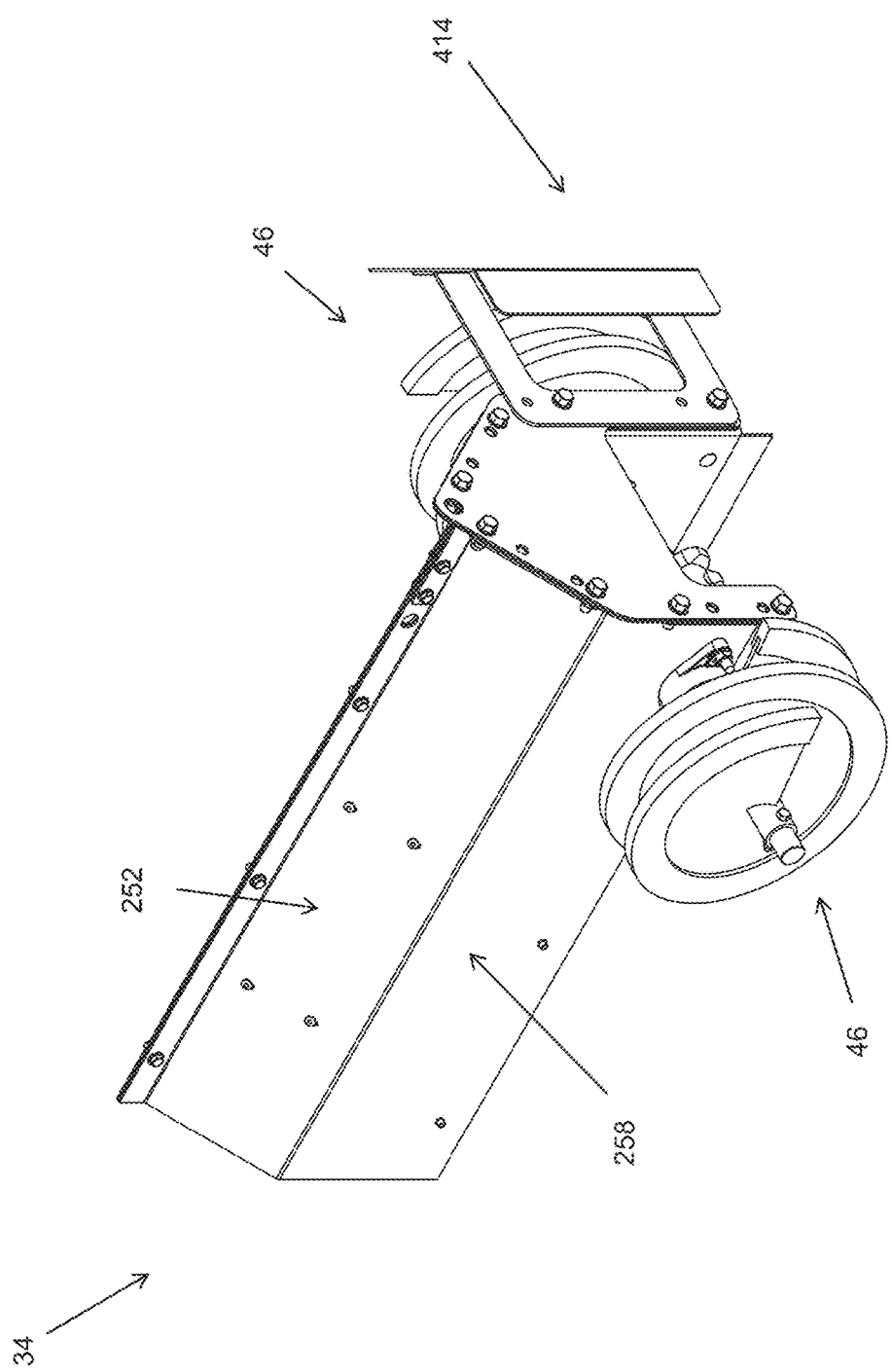
FIG. 39 shows an upper front left perspective view of a tail section of a sweep of an exemplary sweep system, in accordance with one or more embodiments; the view showing a front helical agitator and a rear helical agitator supporting an outward end of the tail section.
Figure 40:
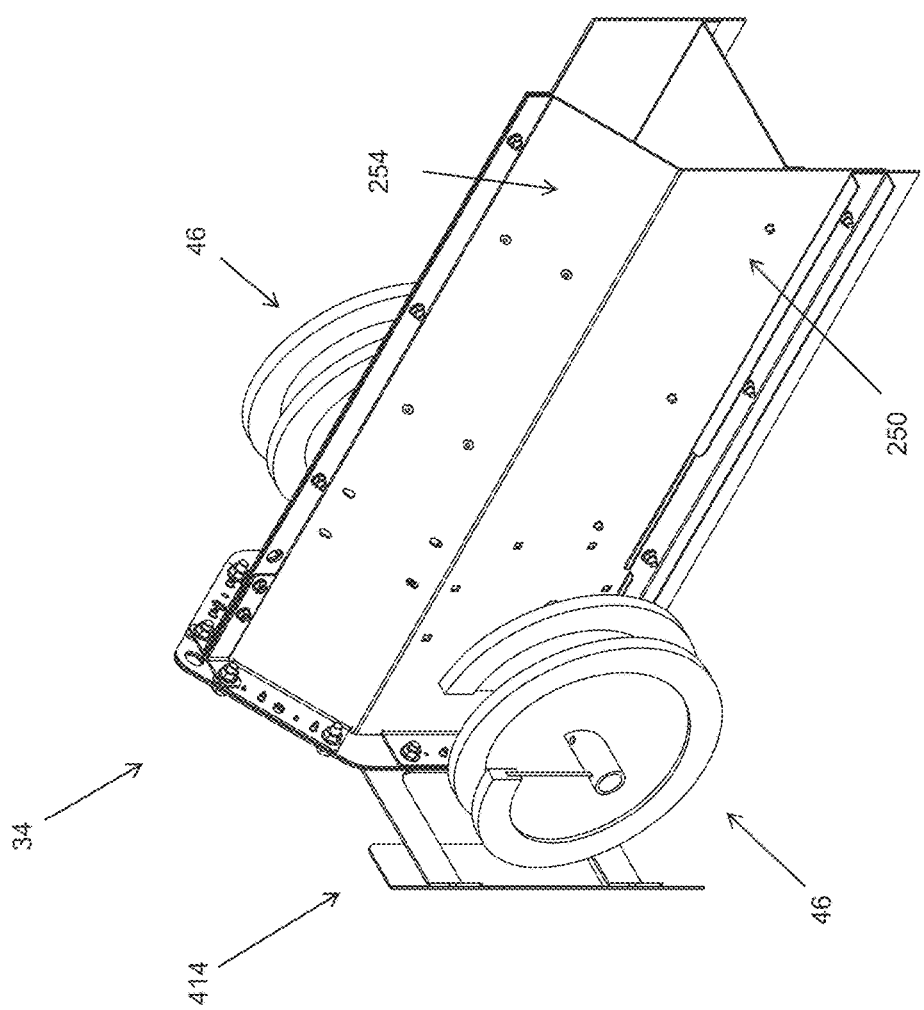
FIG. 40 shows an upper rear right perspective view of a tail section of a sweep of an exemplary sweep system, in accordance with one or more embodiments; the view showing a front helical agitator and a rear helical agitator supporting an outward end of the tail section.
Figure 41:
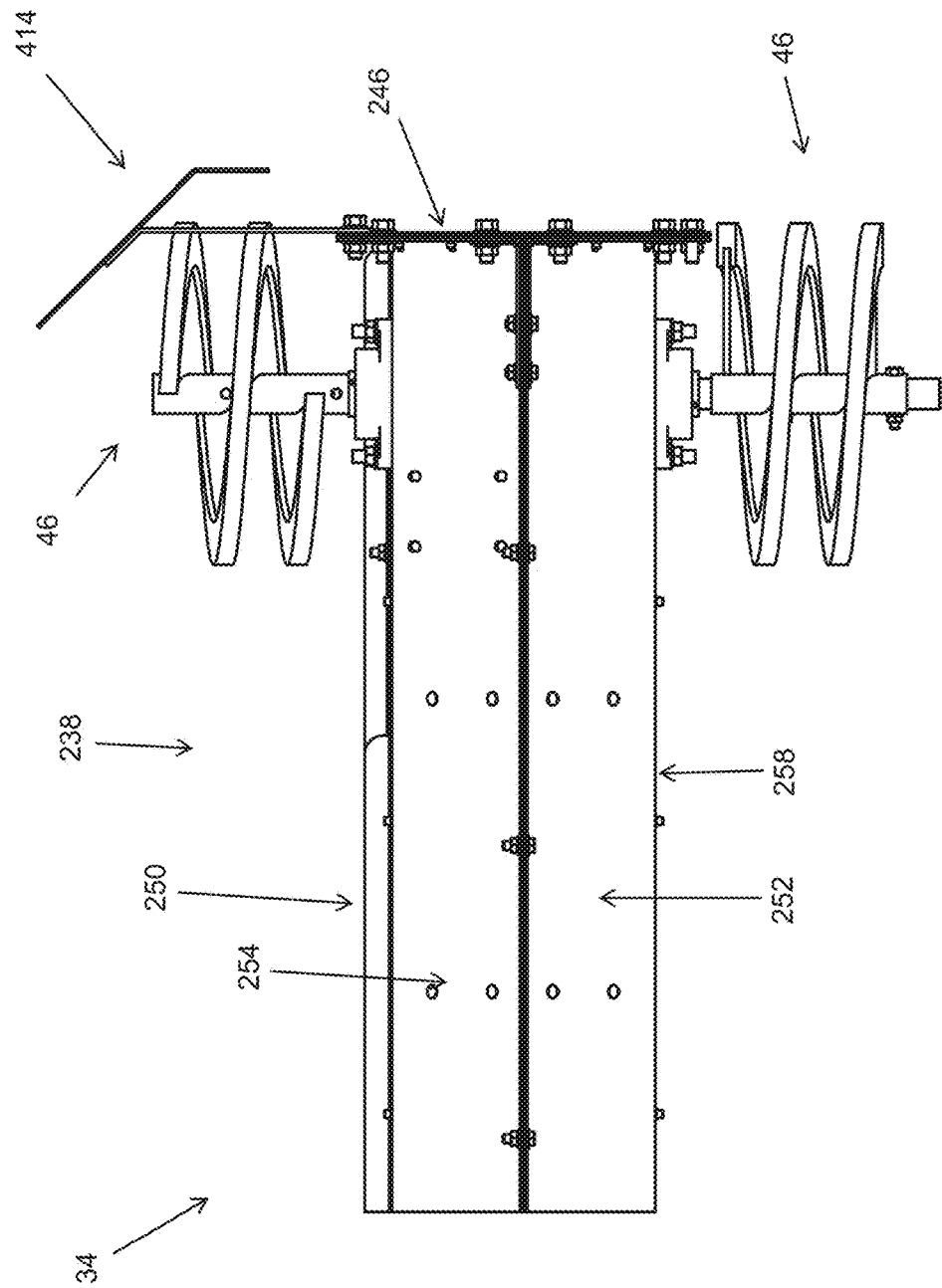
FIG. 41 shows a top view of a tail section of a sweep of an exemplary sweep system, in accordance with one or more embodiments; the view showing a front helical agitator and a rear helical agitator supporting an outward end of the tail section.
Figure 42:
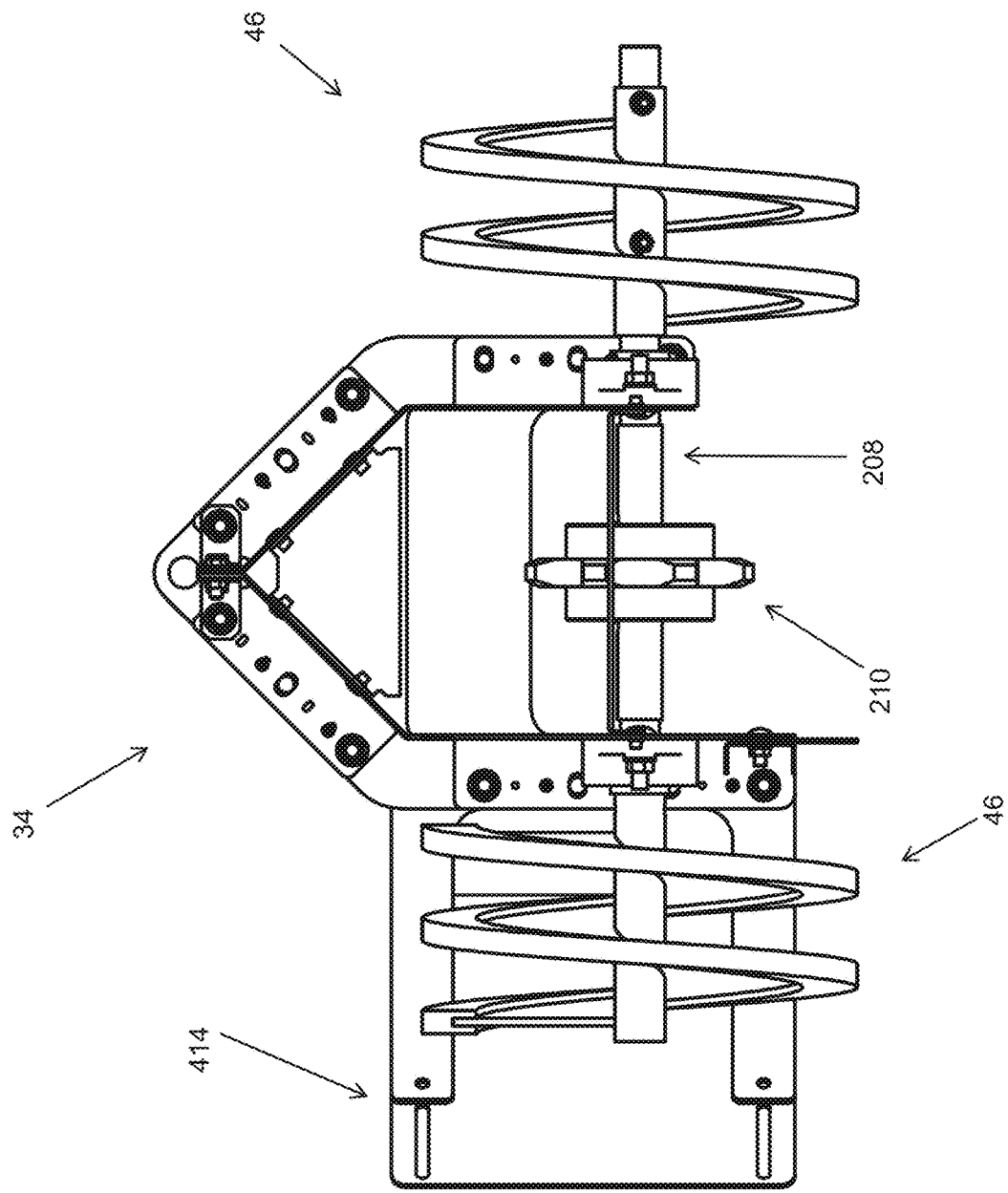
FIG. 42 shows a right side view of a tail section of a sweep of an exemplary sweep system, in accordance with one or more embodiments; the view showing a front helical agitator and a rear helical agitator supporting an outward end of the tail section.
Figure 43:
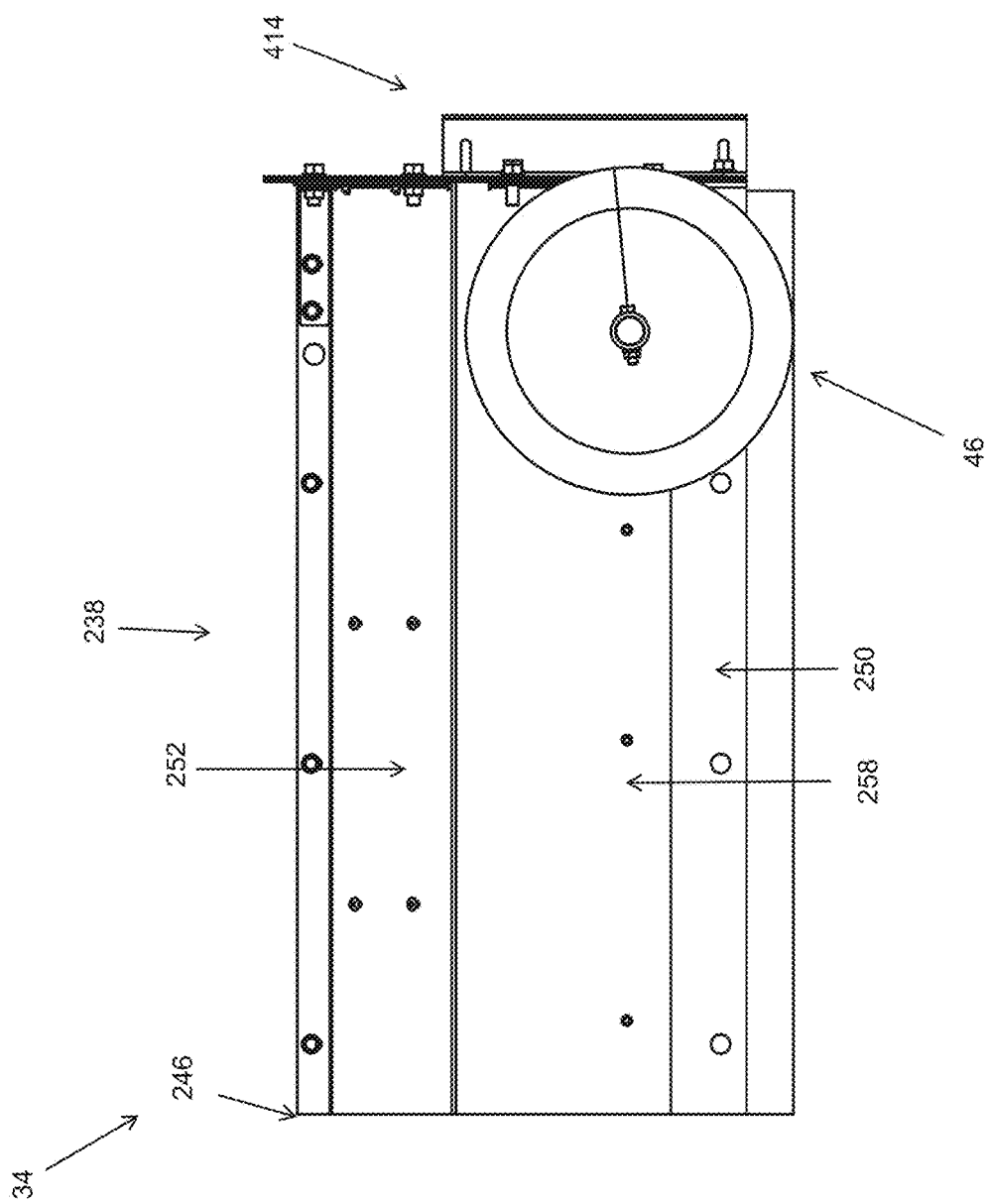
FIG. 43 shows a front view of a tail section of a sweep of an exemplary sweep system, in accordance with one or more embodiments; the view showing a front helical agitator and a rear helical agitator supporting an outward end of the tail section.
Figure 44:
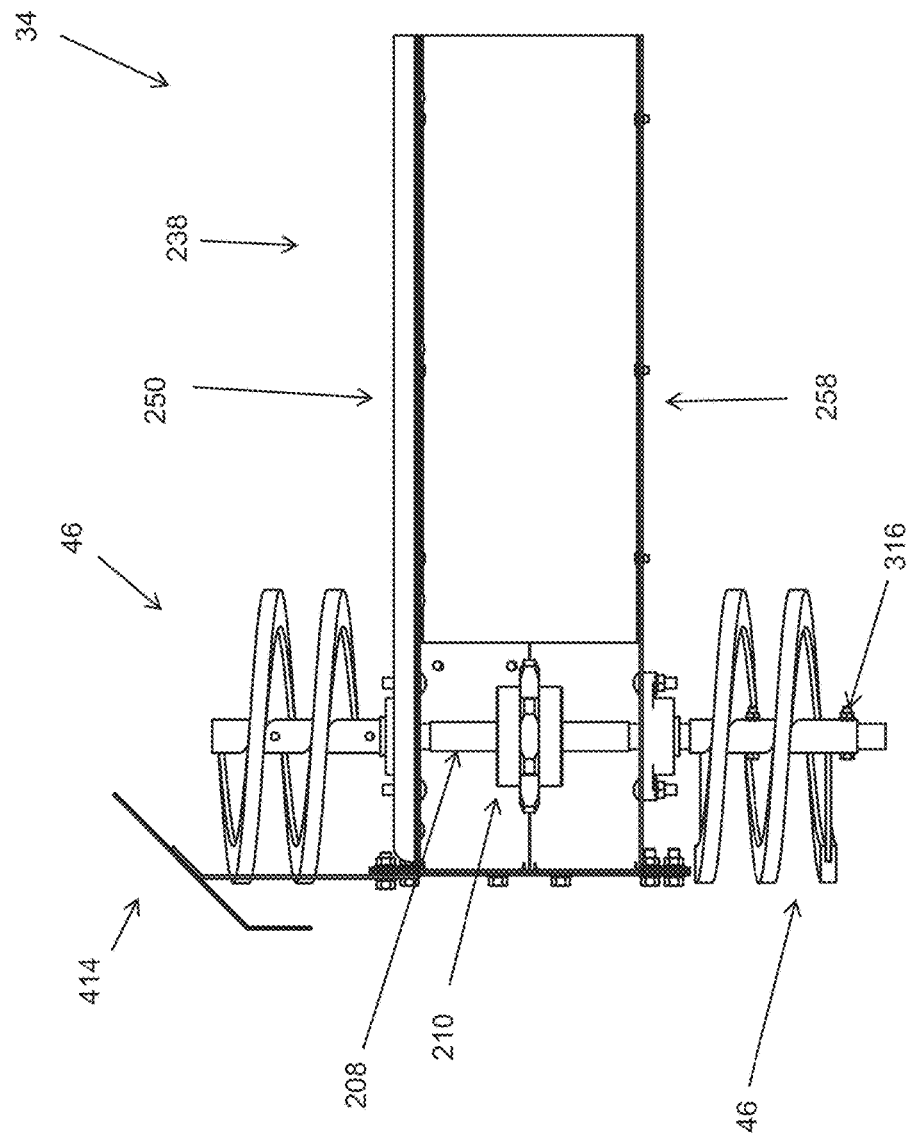
FIG. 44 shows a bottom view of a tail section of a sweep of an exemplary sweep system, in accordance with one or more embodiments; the view showing a front helical agitator and a rear helical agitator supporting an outward end of the tail section.
Figure 45:
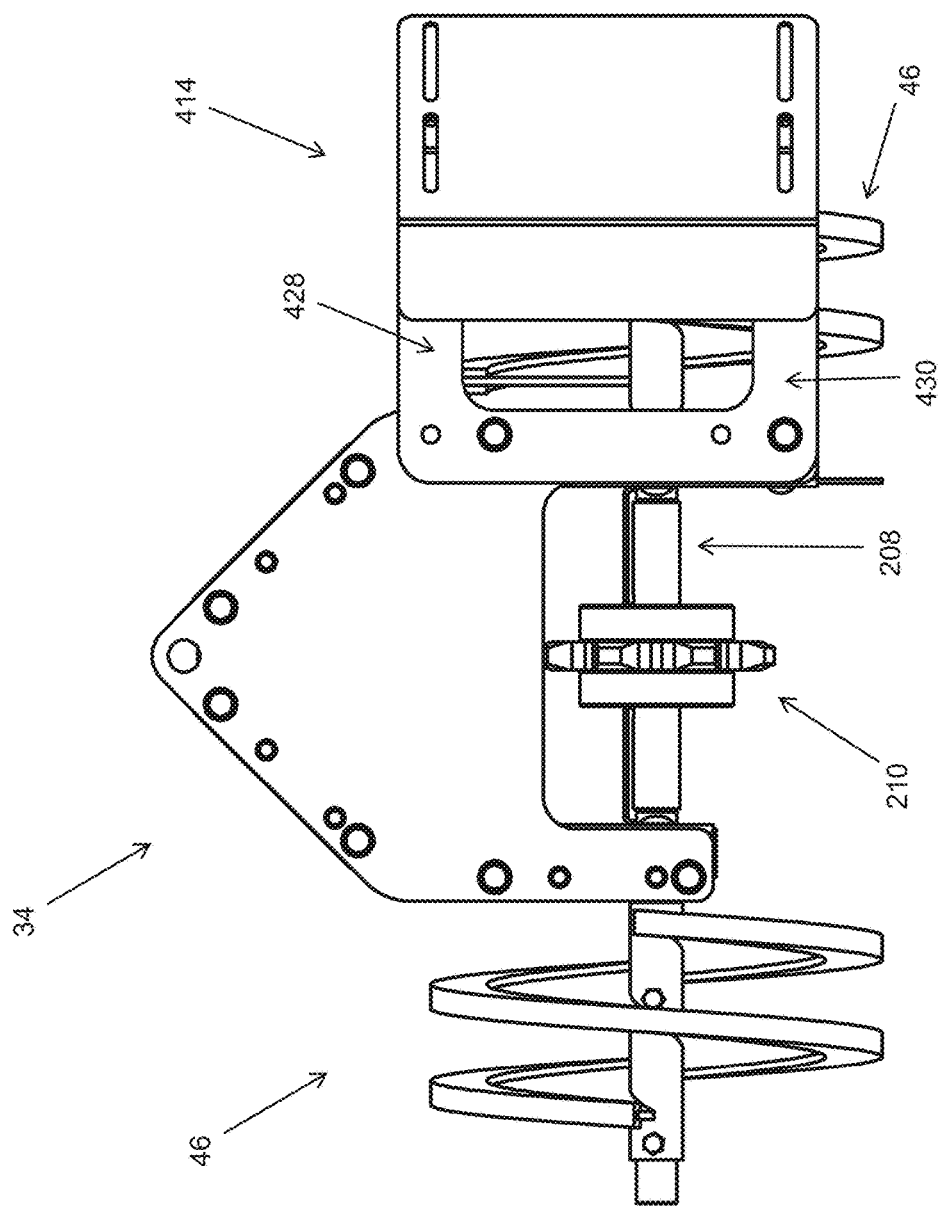
FIG. 45 shows a left side view of a tail section of a sweep of an exemplary sweep system, in accordance with one or more embodiments; the view showing a front helical agitator and a rear helical agitator supporting an outward end of the tail section.
Figure 46:
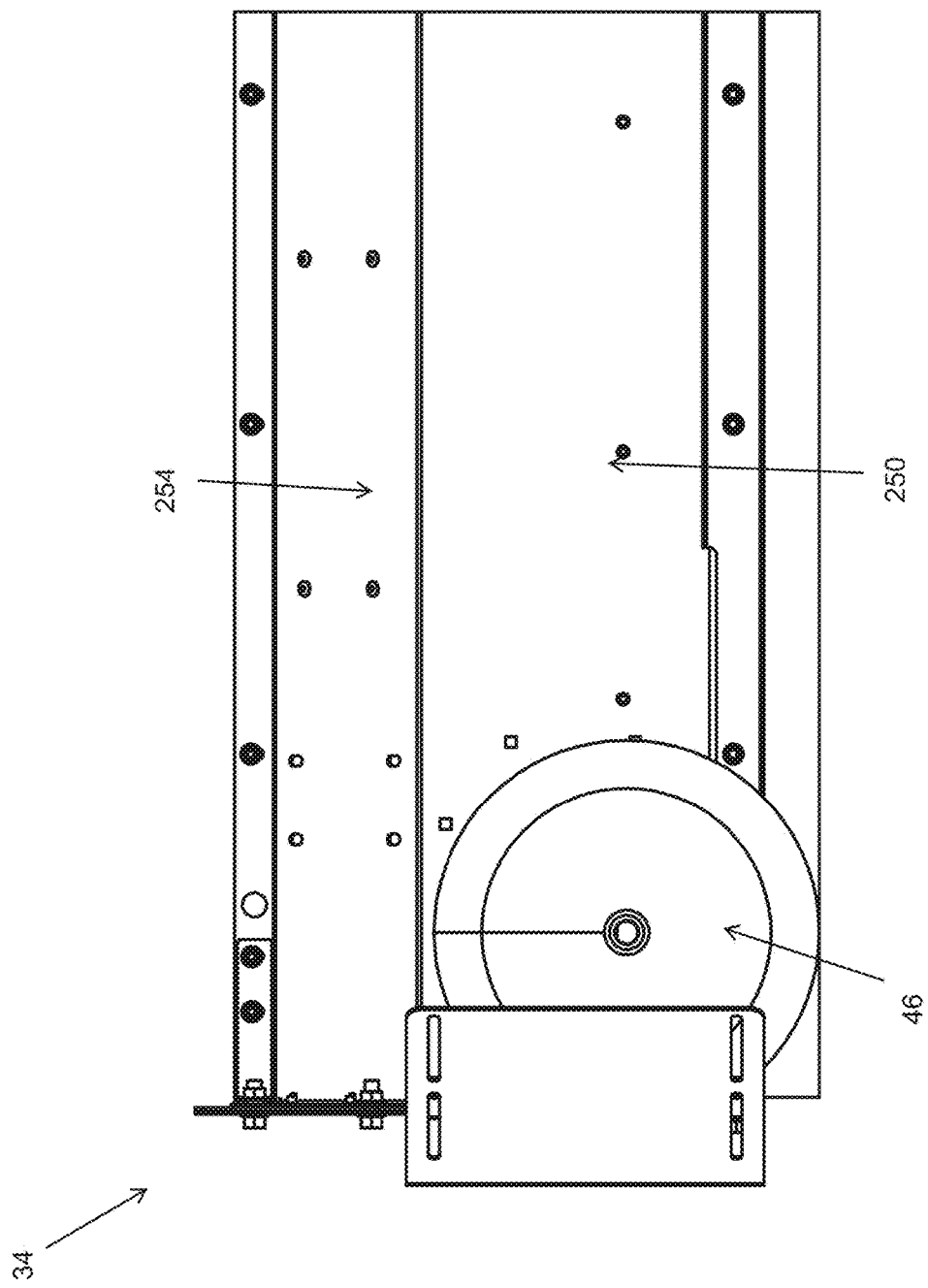
FIG. 46 shows a rear view of a tail section of a sweep of an exemplary sweep system, in accordance with one or more embodiments; the view showing a rear helical agitator supporting an outward end of the tail section.

Agitator 46:

In the arrangement shown, as one example, shaft 208 extends a distance forward of the leading side 186 of tail section weldment 238 of sweep 28. In the arrangement shown, as one example, an agitator 46 is connected to this forward-protruding end of shaft 208. Agitator 46 is formed of any suitable size, shape, and design and is configured to facilitate agitation of grain at the outward end of sweep 28 as sweep 28 rotates around pivot point 36 so as to break up clumps in the grain that may stop rotation of sweep 28 while also providing support for the outward end of sweep 28. FIGS. 15-46 show system 10 having an example agitator 46 consistent with one or more arrangements. In one or more arrangements shown, as one example, agitator 46 has a helical shape configured to engage floor 20 of grain bin 12 and cause sweep 28 to be moved forward when agitator 46 is rotated is an impeller, or propeller or any other device connected to the forward end of shaft 208 that agitates the grain as shaft 208 rotates. In this example arrangement, agitator 46 includes a central hub 300, flighting 302, and a rim member 304.

Central Hub 300:

Central hub 300 is formed of any suitable size, shape, and design and is configured to facilitate connection of agitator 46 with shaft 208. In this example arrangement, central hub 300 has a generally cylindrical shaped tube 308 extending between a rear end 310 and a front end 312. In this example arrangement, tube 308 of central hub 300 is configured to fit over shaft 208 like a collar and connect with shaft 208 using fasteners 316 that extend through holes 314 in tube 308 of central hub 300. However, the arrangements are not so limited. Rather, it is contemplated that in some various arrangements, central hub 300 may be configured to connect with shaft 208 using various means and/or methods including but not limited to, for example, screwing, nailing, bolting, riveting, welding, gluing, affixing, locking, friction fitting, threading, and/or by any other manner or method or the like.

Flighting 302:

Flighting 302 is formed of any suitable size, shape, and design and is configured to facilitate operable connection between central hub 300 and rim member 304. In this example, arrangement flighting 302 has a continuous ribbon shape extending between an inner edge 320, where flighting 302 connects with central hub 300, and an outer edge 322, where flighting 302 connects with rim member 304, and wrapping around central hub 300 along a generally helical path from a front end 324 to a rear end 326. In the arrangement shown, flighting 302 extends in a continuous uninterrupted manner to provide an operable connection between central hub 300 and rim member 304. However, the arrangements are not so limited. Rather, it is contemplated that flighting 302 may connect central hub 300 and rim member 304 with various other structure including but not limited to spokes, arms, wires, cords, and/or any other structure.

Rim Member 304:

Rim member 304 is formed of any suitable size, shape, and design and is configured to provide an outer surface to facilitate contact with, and support of, agitator 46 on floor 20 of grain bin. In the arrangement shown, rim member 304 has a generally rectangular shape having an interior side 328, an exterior side 330, a front side 332, and a back side 334 extending a length along a generally helical path between a front end 336 and a rear end 338. In this example, rim member 304 includes a channel 342 extending along the interior side 328 to facilitate connection with the outer edge 322 of flighting 302. That is in this example, outer edge 322 of flighting 302 fits within channel 342 to operably connect with rim member 304 by frictional fitting. However, the arrangements are not so limited. Rather, it is contemplated that in some various arrangements, rim member 304 may connect with flighting 302 using various means and/or methods including but not limited to, for example, screwing, nailing, bolting, riveting, welding, gluing, affixing, locking, friction fitting, threading, and/or by any other manner or method or the like.

Figure 74:
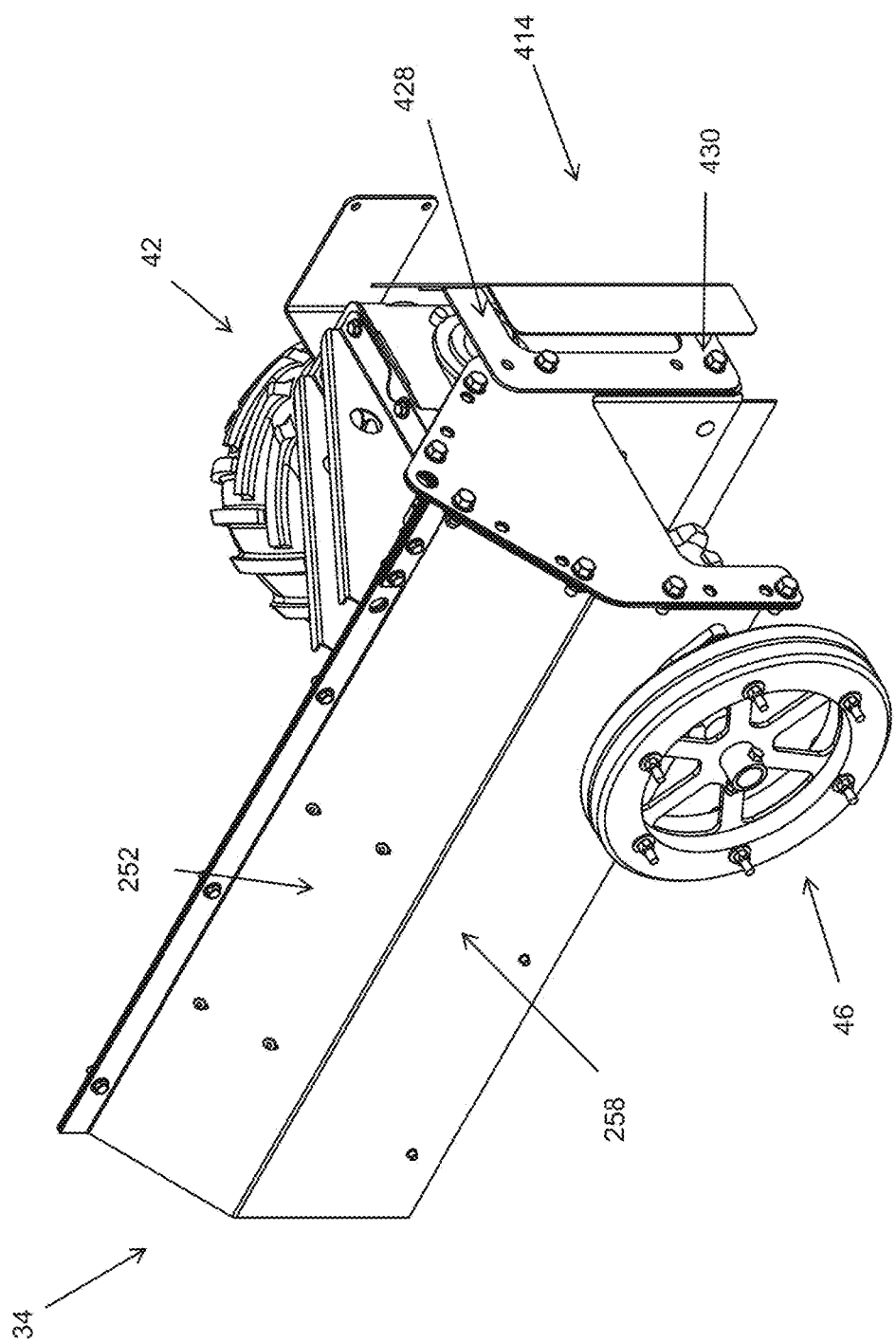
FIG. 74 shows an upper front left perspective view of a tail section of a sweep of an exemplary sweep system, in accordance with one or more embodiments; the view showing a drive wheel and an agitator supporting an outward end of the tail section.
Figure 75:
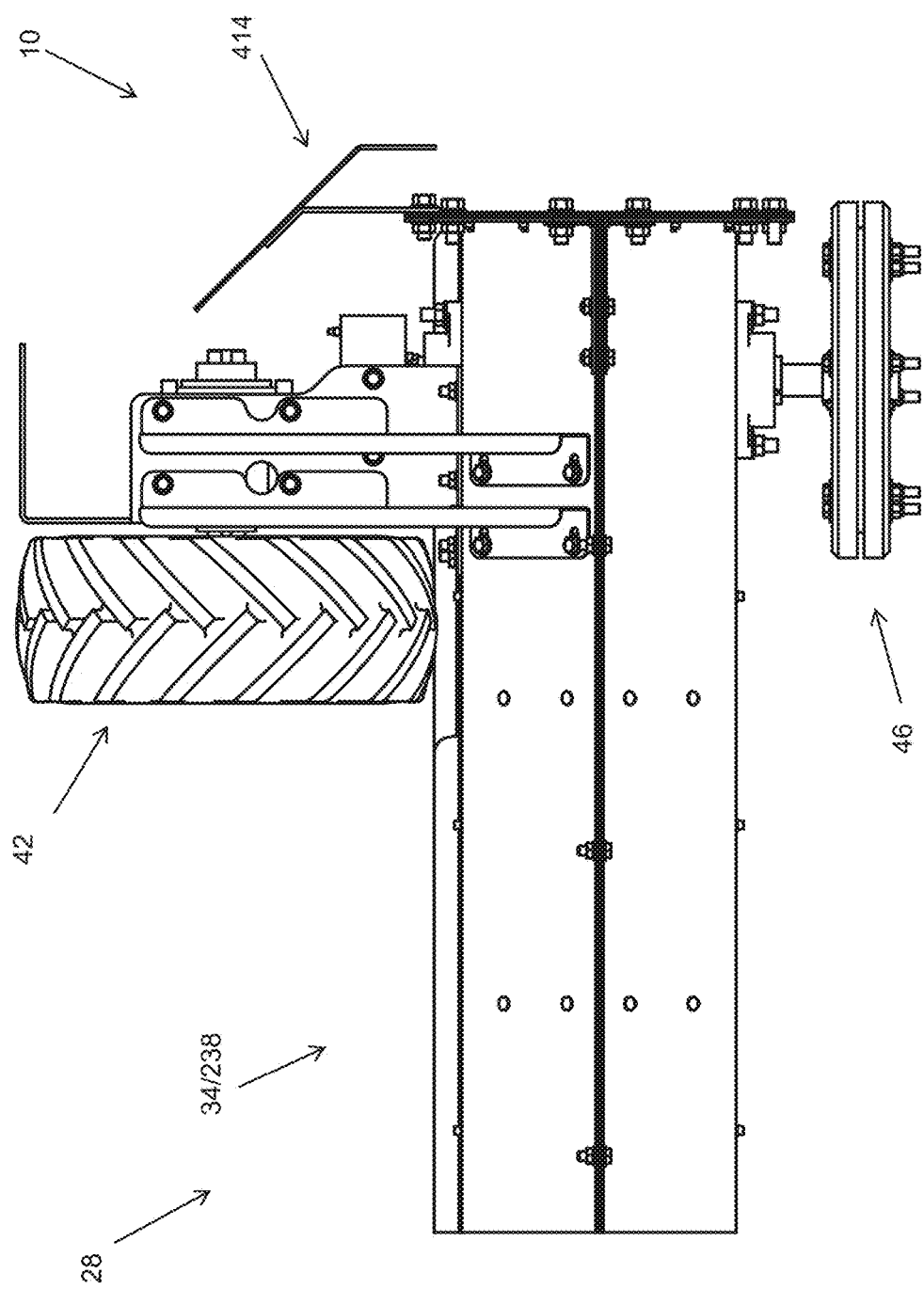
FIG. 75 shows a top view of a tail section of a sweep of an exemplary sweep system, in accordance with one or more embodiments; the view showing a drive wheel and an agitator supporting an outward end of the tail section.
Figure 76:
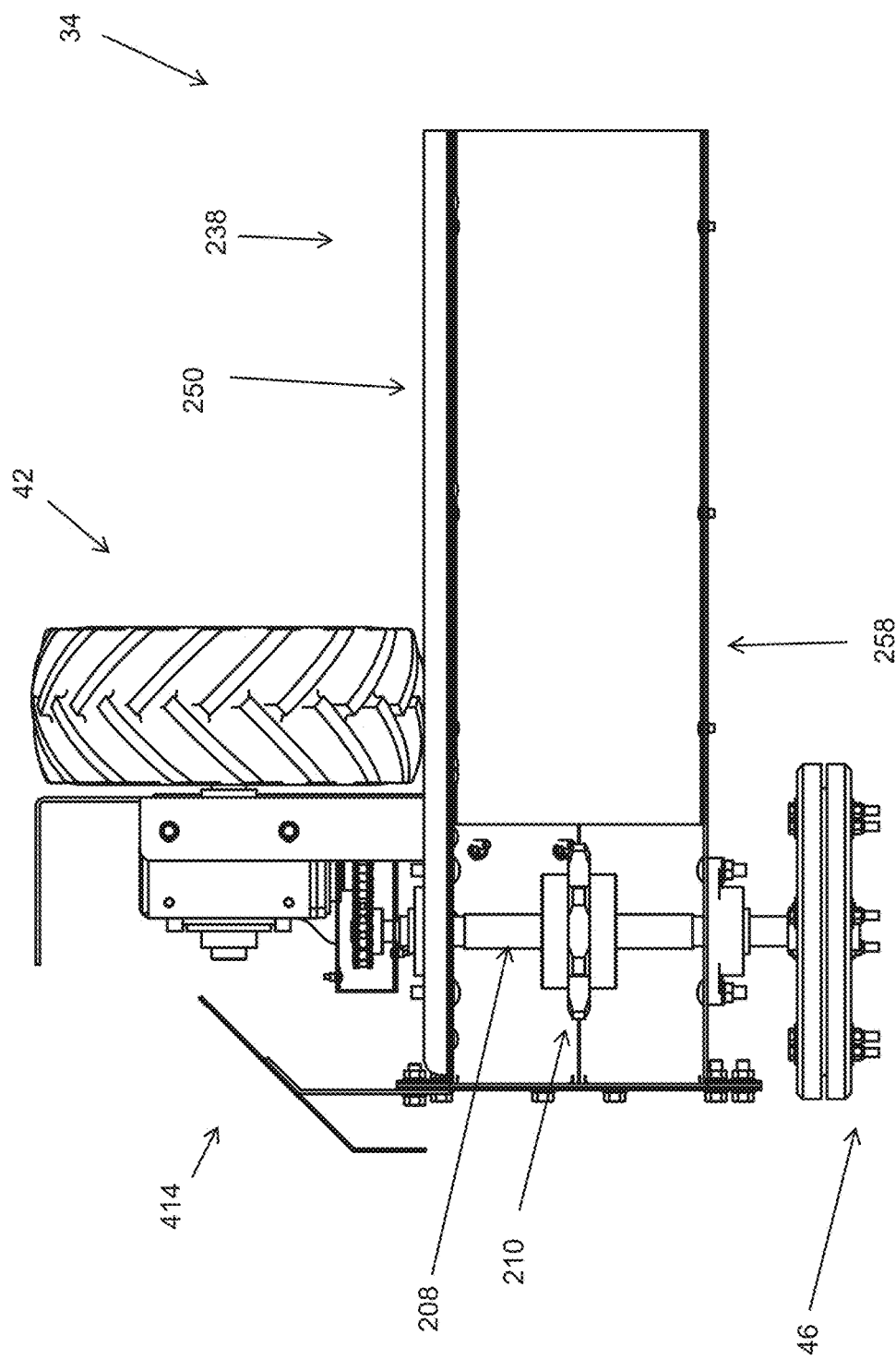
FIG. 76 shows a bottom view of a tail section of a sweep of an exemplary sweep system, in accordance with one or more embodiments; the view showing a drive wheel and an agitator supporting an outward end of the tail section.
Figure 77:
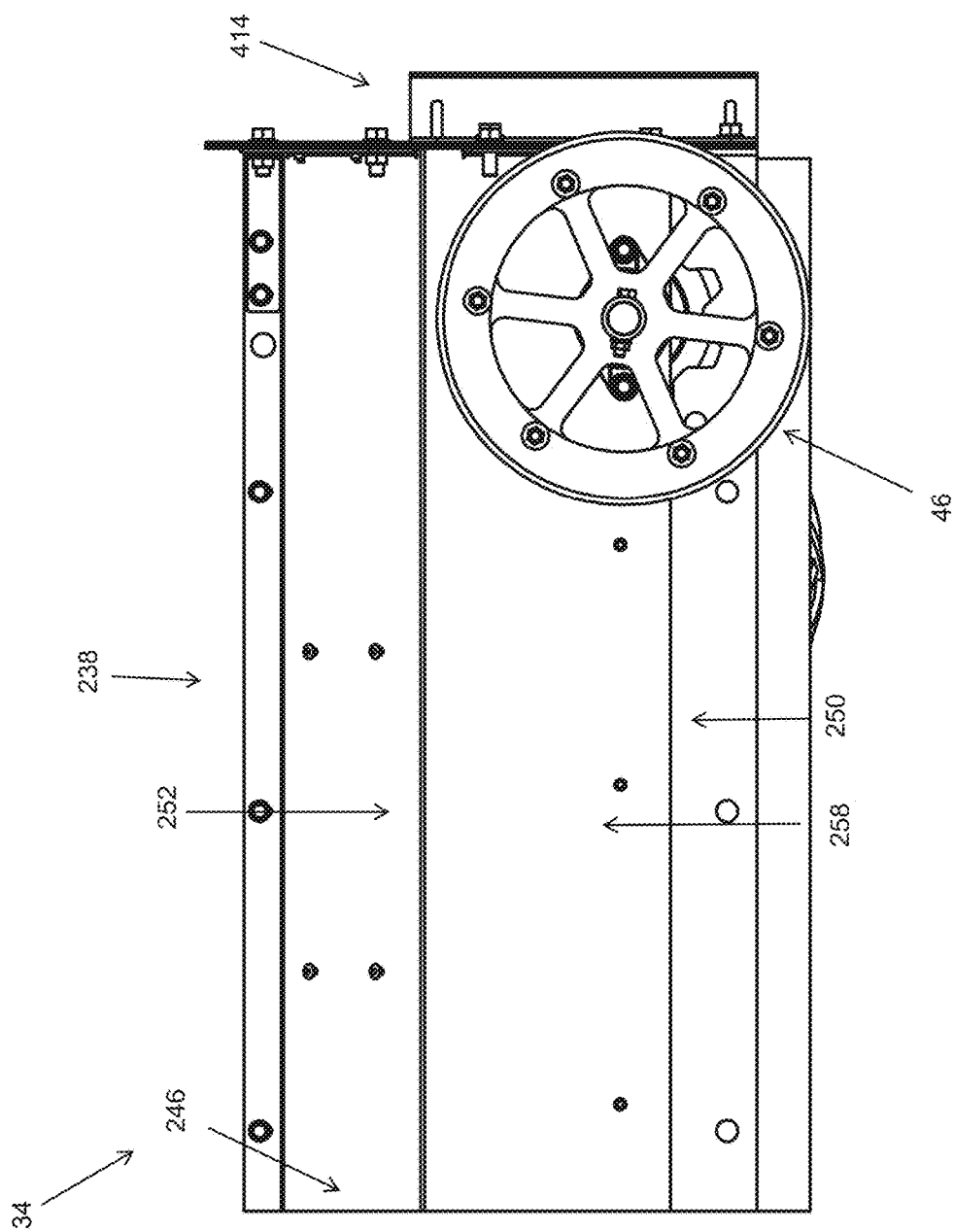
FIG. 77 shows a front view of a tail section of a sweep of an exemplary sweep system, in accordance with one or more embodiments; the view showing an agitator supporting an outward end of the tail section.
Figure 78:
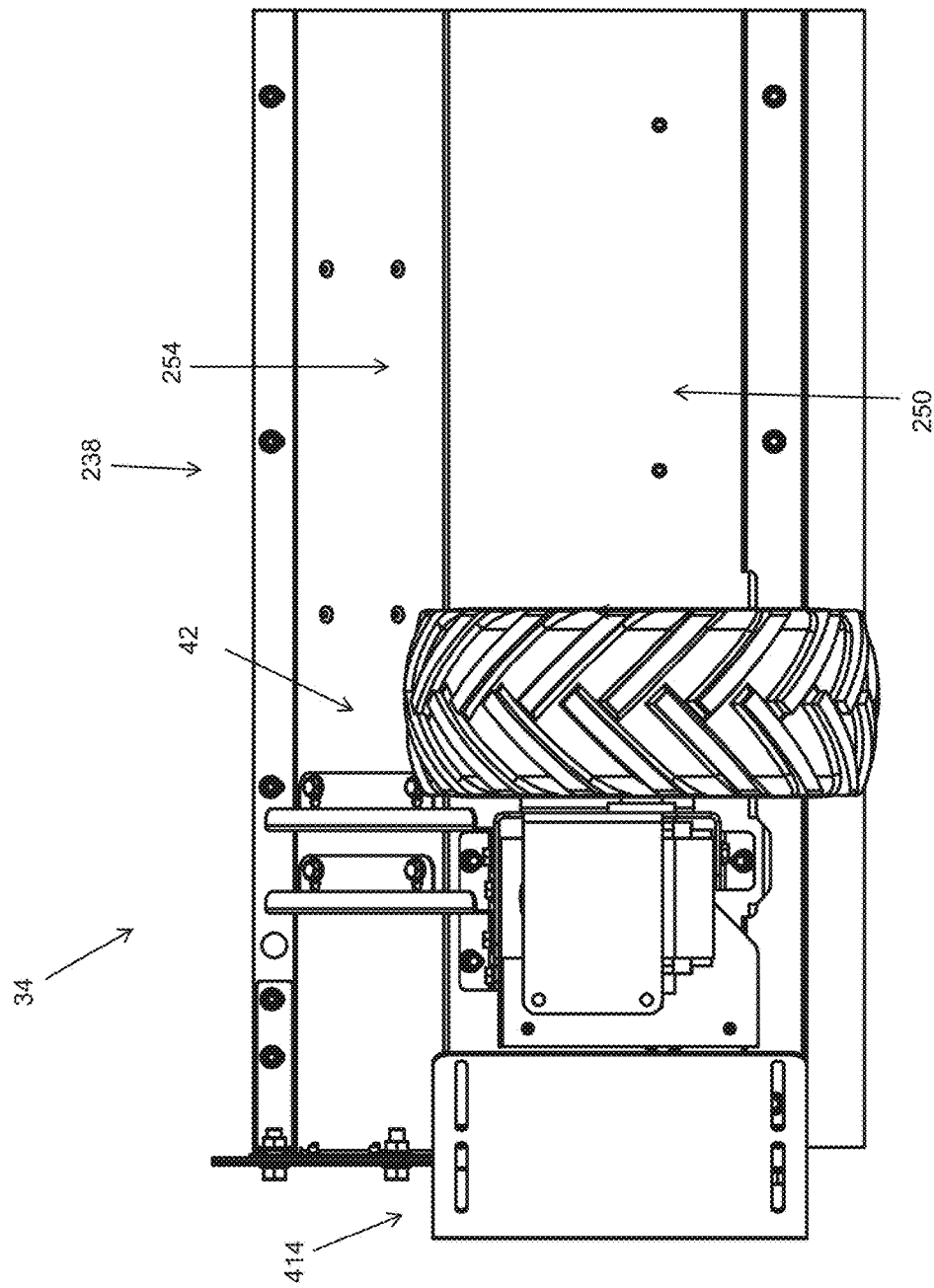
FIG. 78 shows a rear view of a tail section of a sweep of an exemplary sweep system, in accordance with one or more embodiments; the view showing a drive wheel supporting an outward end of the tail section.
Figure 79:
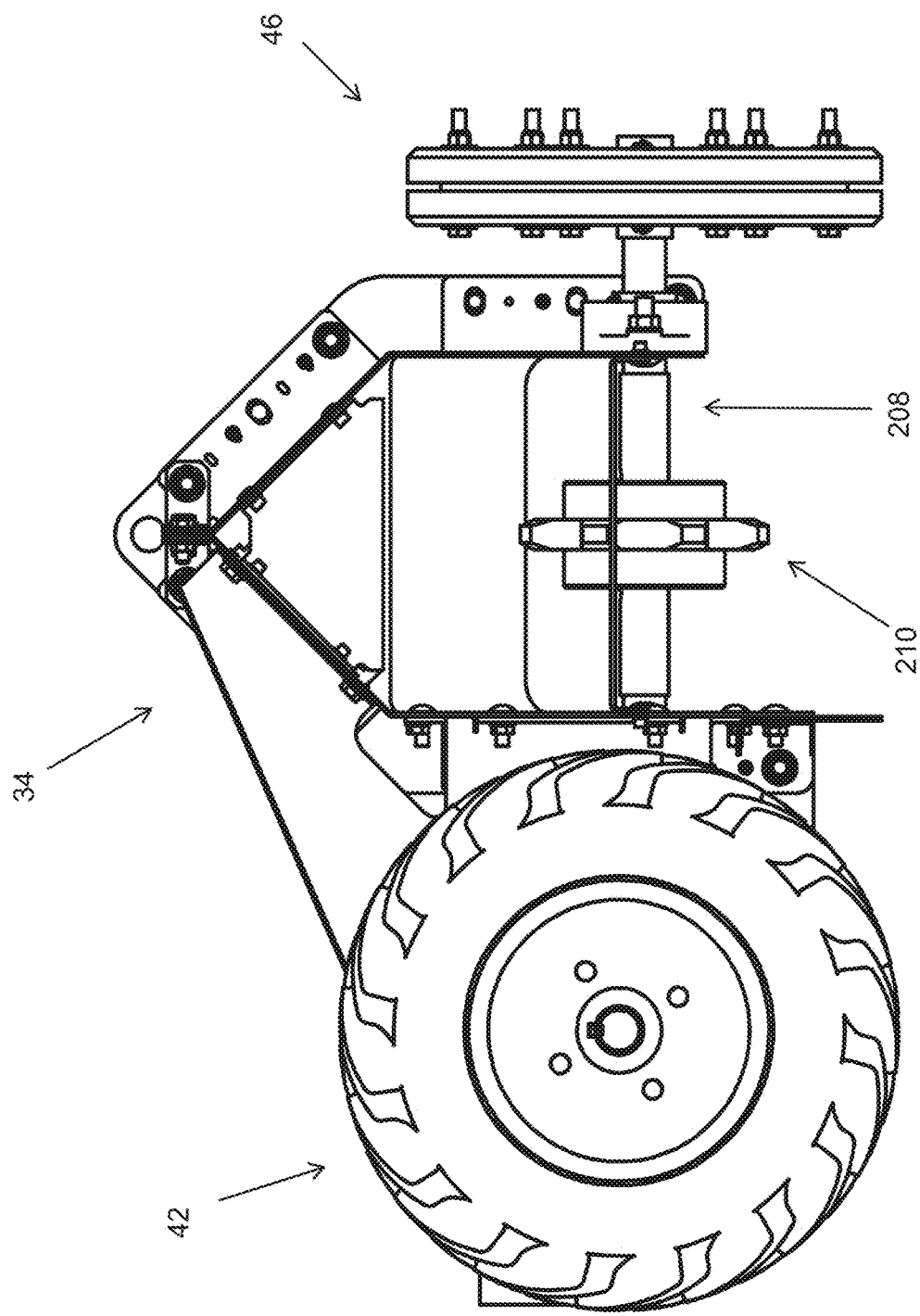
FIG. 79 shows a right side view of a tail section of a sweep of an exemplary sweep system, in accordance with one or more embodiments; the view showing a drive wheel and an agitator supporting an outward end of the tail section.
Figure 80:
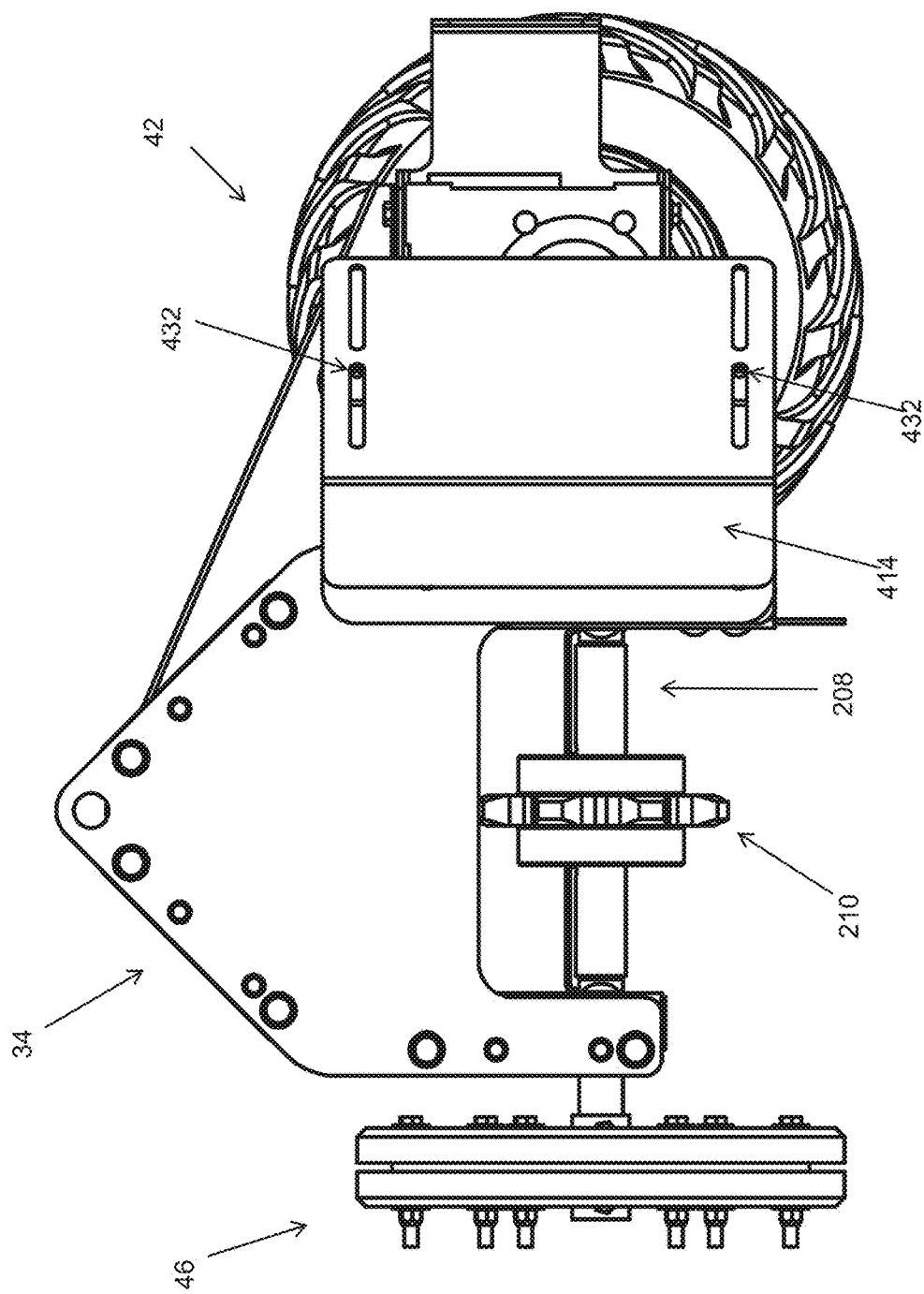
FIG. 80 shows a left side view of a tail section of a sweep of an exemplary sweep system, in accordance with one or more embodiments; the view showing a drive wheel and an agitator supporting an outward end of the tail section.
Figure 81F:
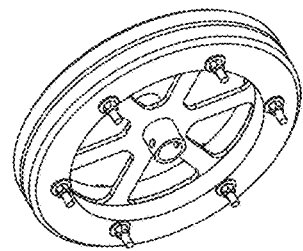
FIG. 81F shows an upper front left perspective view of a central hub of an agitator for use with a sweep system, in accordance with one or more embodiments.
Figure 81E:
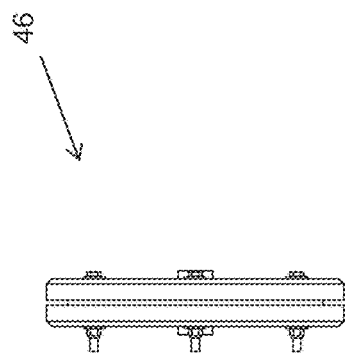
FIG. 81E shows a left side view of a central hub of an agitator for use with a sweep system, in accordance with one or more embodiments.
Figure 81B:
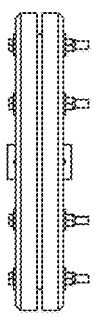
FIG. 81B shows a top view of a central hub of an agitator for use with a sweep system, in accordance with one or more embodiments.
Figure 81C:
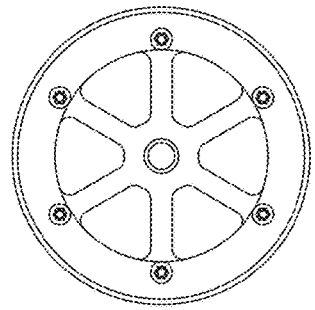
FIG. 81C shows a front view of a central hub of an agitator for use with a sweep system, in accordance with one or more embodiments.
Figure 81D:
FIG. 81D shows a bottom view of a central hub of an agitator for use with a sweep system, in accordance with one or more embodiments.
Figure 81A:
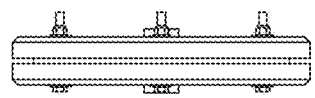
FIG. 81A shows a right side view of a central hub of an agitator for use with a sweep system, in accordance with one or more embodiments.
Figure 82:
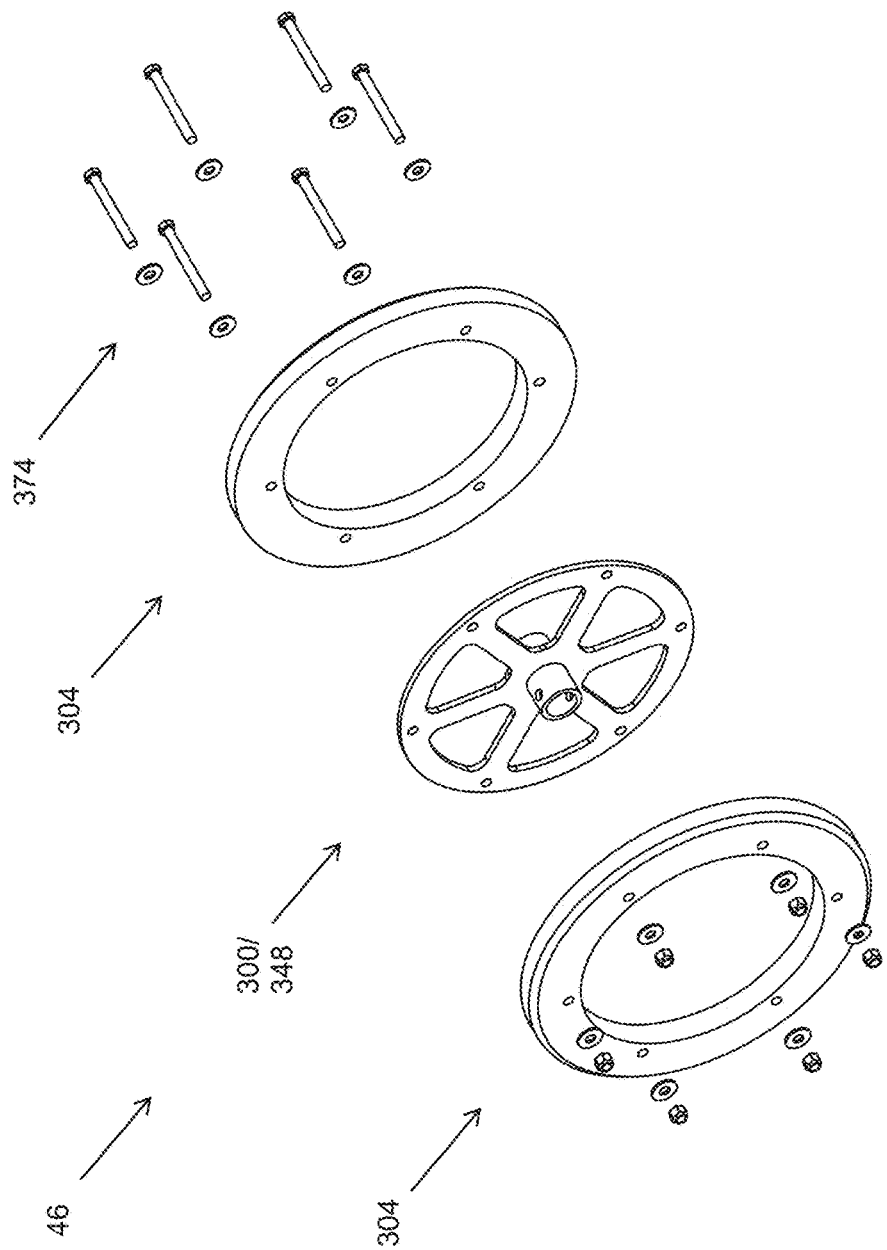
FIG. 82 shows an exploded upper front left perspective view of a central hub of an agitator for use with a sweep system, in accordance with one or more embodiments.
Figure 86:
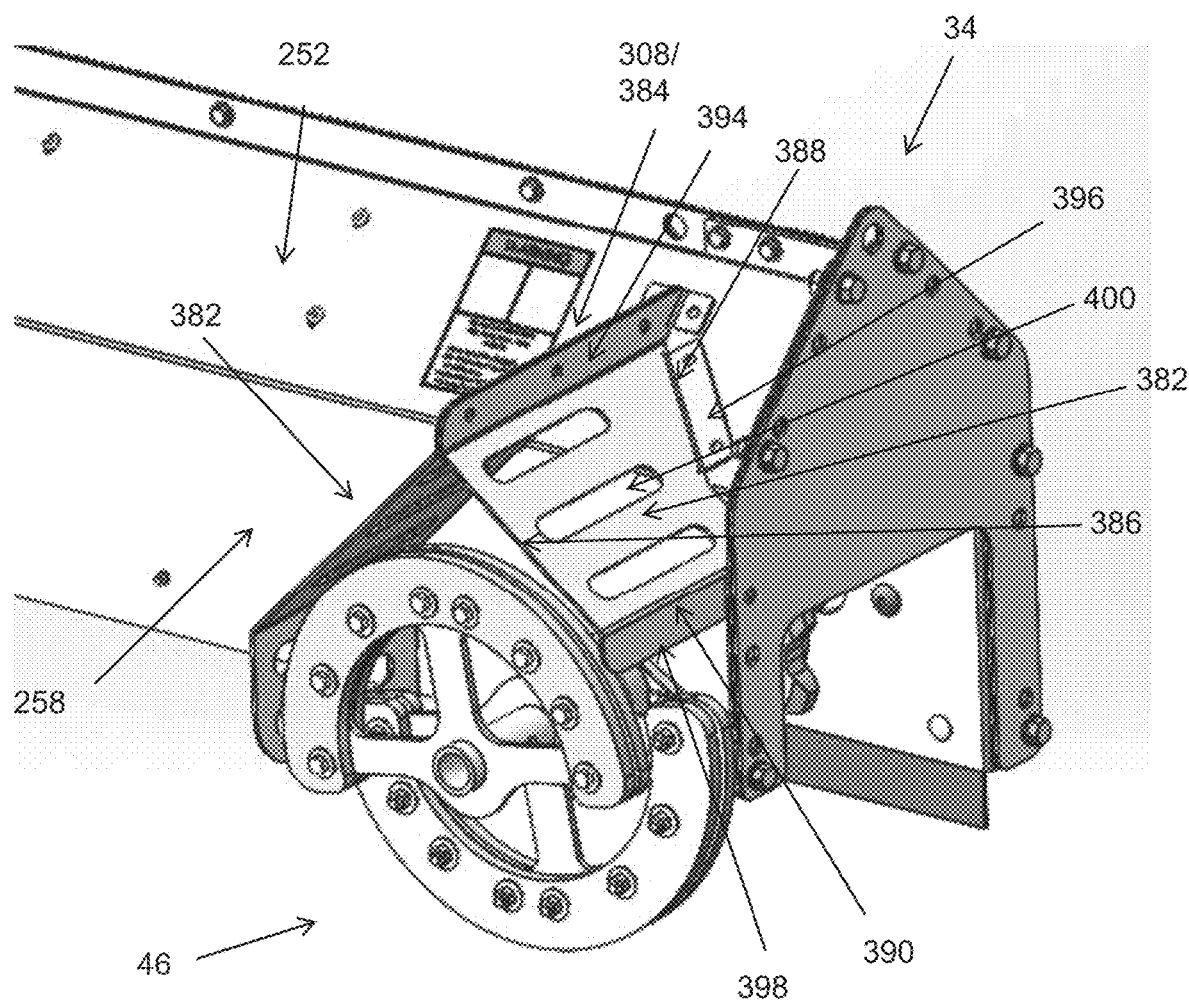
FIG. 86 shows an upper front left perspective view of a tail section of a sweep of an exemplary sweep system, in accordance with one or more embodiments; the view showing a guard positioned on the tail section of the sweep above an agitator.

In some various different arrangements, rim member 304 may be formed out of various different materials to provide suitable frictional engagement with floor 20 and/or provide suitable durability to endure stresses imposed on rim member 304 during use including but not limited to, for example, polymers (e.g., UHMW), rubbers, fibers, plastics, composites, fiberglass, and/or any combination of these materials or other materials and other reinforcement structures (e.g., steel belts). In one arrangement, rim member 304 is formed of a UHMW, plastic and/or fiberglass material whereas floor 20 is formed of concrete and/or metal. In this arrangement, the use of a UHMW, plastic and/or fiberglass material for rim member 304 provides a level of cushion, protection and wear resistance between the floor 20 and flighting 302. In this arrangement, the use of a UHMW, plastic and/or fiberglass material for rim member 304 also provides enough structural support, rigidity and strength to support the weight of sweep 28, while also having an appropriate coefficient of friction that that facilitates forward movement of the outward end of sweep 28 and/or does not inhibit the forward movement of the outward end of sweep 28. That is, in one arrangement, when agitator 46 rotates, rim member 304 rotates on floor 20, the helical configuration of flighting 302 and rim member 304 helps to pull the outward end of sweep 28 forward, or alternatively the coefficient of kinetic friction between the floor 20 and rim member 304 is such that pusher 42 can easily overcome the friction or engagement between floor 20 and rim member 304. In the arrangement, where agitator 46 is a wheel, such as in FIGS. 74-84D, the perpendicular rotation of agitator 46 to the forward movement of the outward end of sweep 28, along with the material properties and characteristics of the material of rim member 304 as it spins on the material of floor 20, produces a relatively low coefficient of friction or resistance which is easily overcome by the forward pushing force of pusher 42. Or, said another way, as the wheel of agitator 46 rotates perpendicular to the direction of travel of the coefficient of friction between floor 20 and agitator 46 is reduced thereby facilitating easier pushing forward by pusher 42.

In Operation:

In this arrangement, when sweep mechanism 44 is a paddle sweep, a drag chain, a belt, and/or another device that rotates around shaft 208 and/or sprocket 210, sweep mechanism 44 causes rotation of shaft 208. As shaft 208 rotates, this causes rotation of agitator 46. As agitator 46 rotates, front end 324 of flighting 302 and front end 336 of rim member 304 engages and breaks up grain in front of sweep 28. In this example arrangement, the helical shape of flighting 302 causes grain to be moved rearward toward sweep 28, where it can be moved toward a sump 24 by sweep mechanism 44. In this manner, agitator 46 operates as an auger to break up and move grain rearward toward sweep. Simultaneously, in this example arrangement, as agitator 46 rotates, the helical shape of flighting 302 helps to pull the outward end of sweep 28 forward.

In one or more arrangements, agitator 46 is positioned so rim member 304 engages floor and provides support for sweep 28 for example to ensure sweep 28 remains proper distance from floor 20 for proper operation of sweep mechanism 44. In one or more arrangements, as is shown, due to its helical shape, rim member 304 engages floor 20 at an angle as agitator 46 is rotated, which transfers some rearward frictional forces to the floor 20. The rearward frictional forces operate to help pusher 42 move sweep 28 forward during operation. In this manner, agitator 46 operates as a drive mechanism to assist with movement of sweep 28.

Front and Rear Agitators 46:

In one or more arrangements, sweep 28 has a front agitator 46 connected to a forward end of shaft 208 and a rear agitator 46 connected to a rearward end of shaft 208. It this example arrangement, front agitator 46 supports the front end of sweep 28 on floor 20 and rear agitator 46 supports the rear end of sweep 28 on floor 20. In this example arrangement, rim members 304 of front and rear agitators 46 both have left hand helical rotation so as to transfer rearward frictional forces to the floor 20 when shaft 208 is rotated counter-clockwise when sweep mechanism 44 is operated. Due to the application of rearward frictional forces, the front and rear agitators 46 move sweep 28 forward. In one or more arrangements, pusher 42 may be omitted and the front and rear agitators 46 operate as the primary drive mechanism for rotation of sweep 28.

Figure 47:
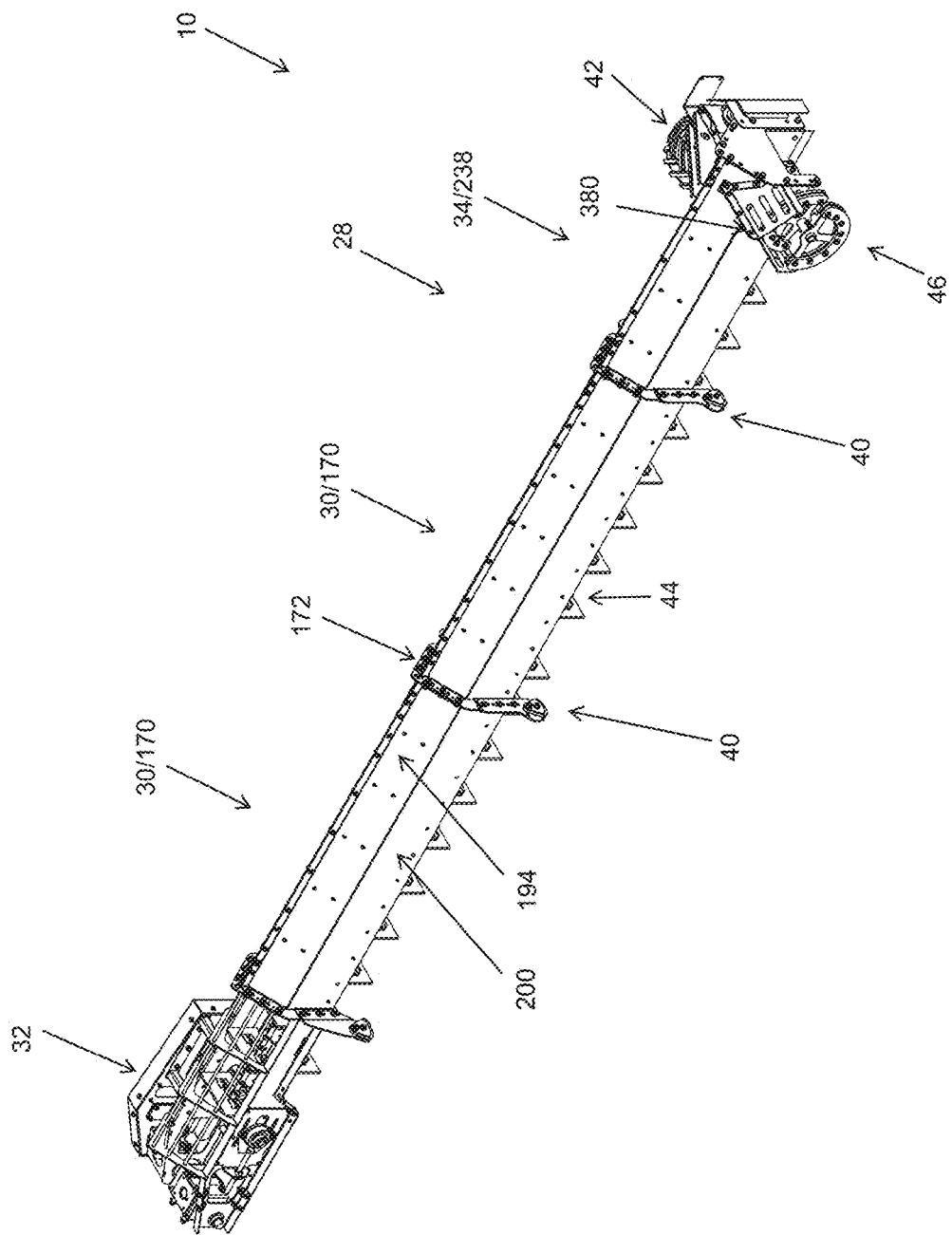
FIG. 47 shows an upper front left perspective view of a sweep of an exemplary sweep system, in accordance with one or more embodiments; the view showing a drive wheel and a segmented agitator supporting an outward end of the sweep; the view showing a guard positioned over the agitator.
Figure 48:
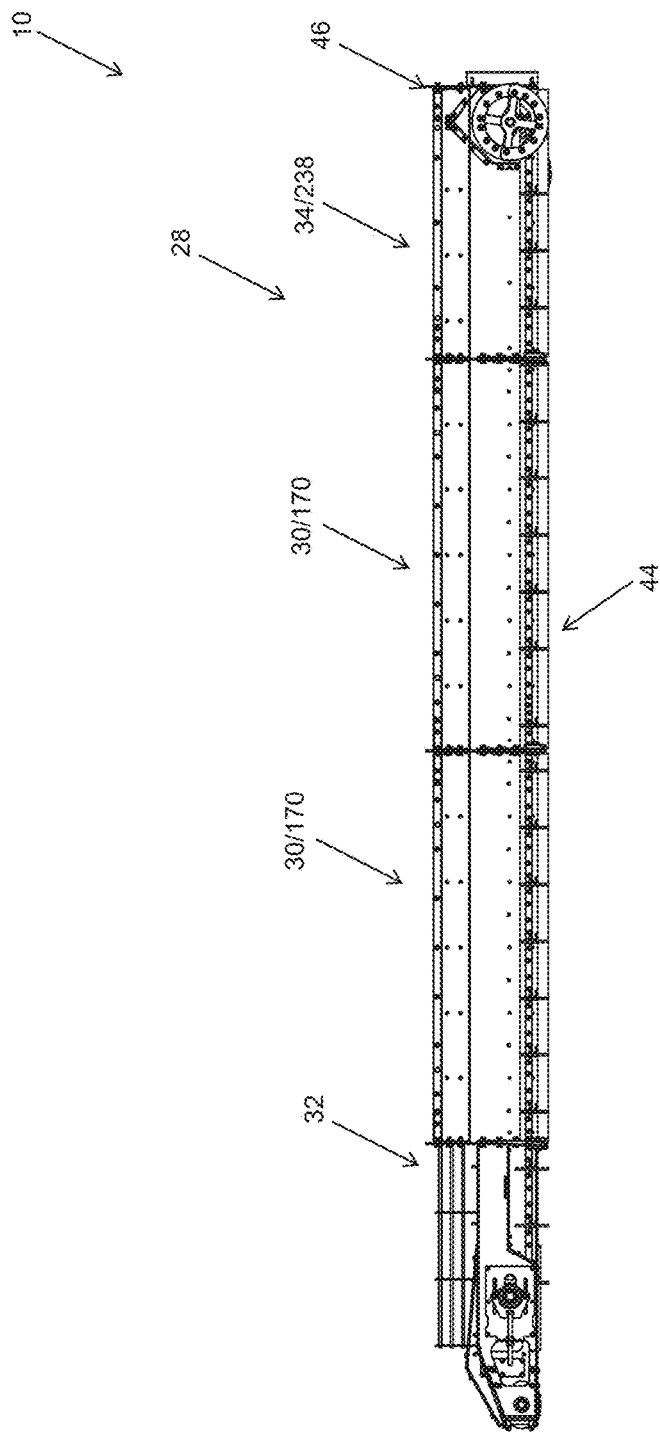
FIG. 48 shows a front view of a sweep of an exemplary sweep system, in accordance with one or more embodiments; the view showing a segmented agitator supporting an outward end of the sweep; the view showing a guard positioned over the agitator.
Figure 49:
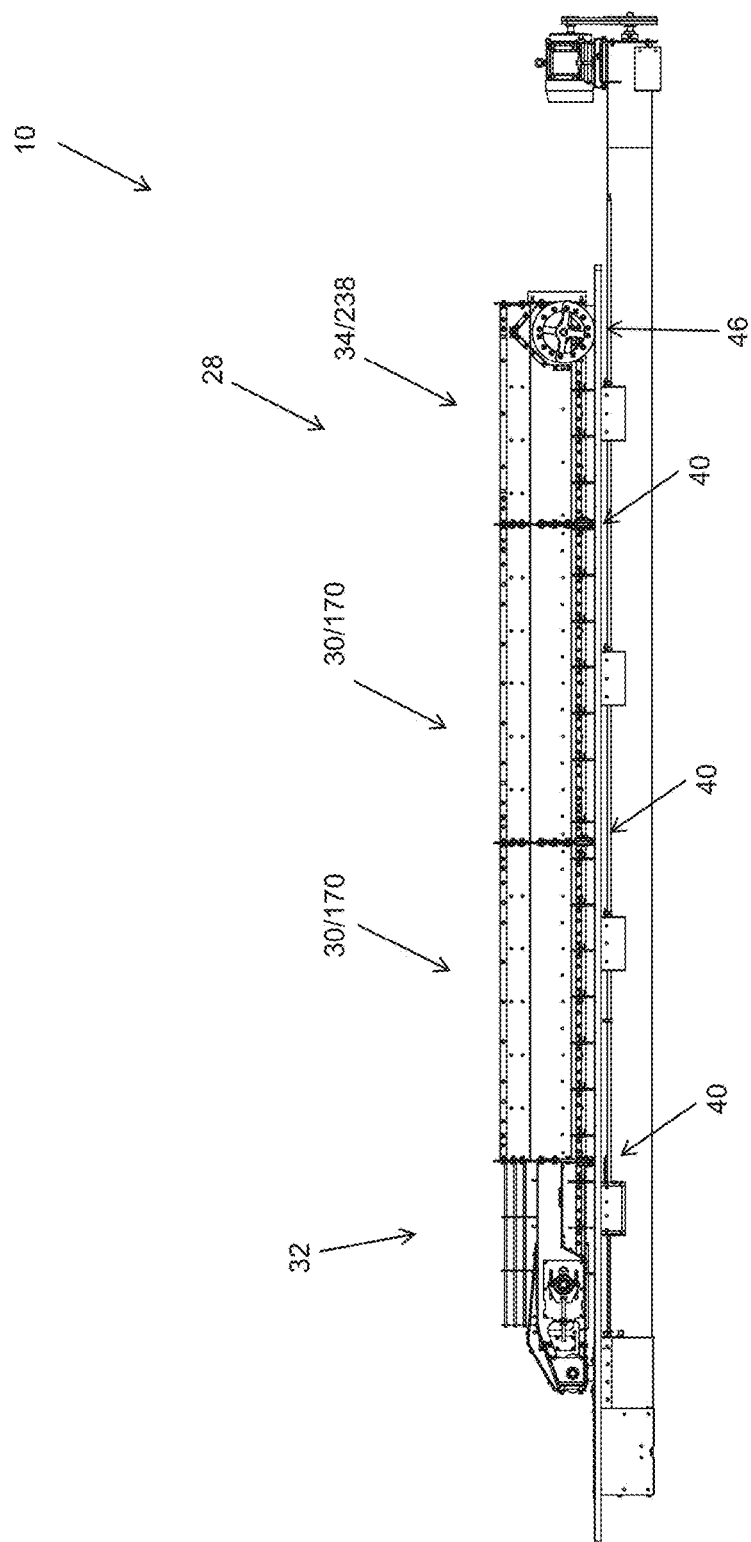
FIG. 49 shows a front view of a sweep of an exemplary sweep system, in accordance with one or more embodiments; the view showing a segmented agitator supporting an outward end of the sweep; the view showing a guard positioned over the agitator; the view showing the sweep system positioned over a grain conveyor.
Figure 50:
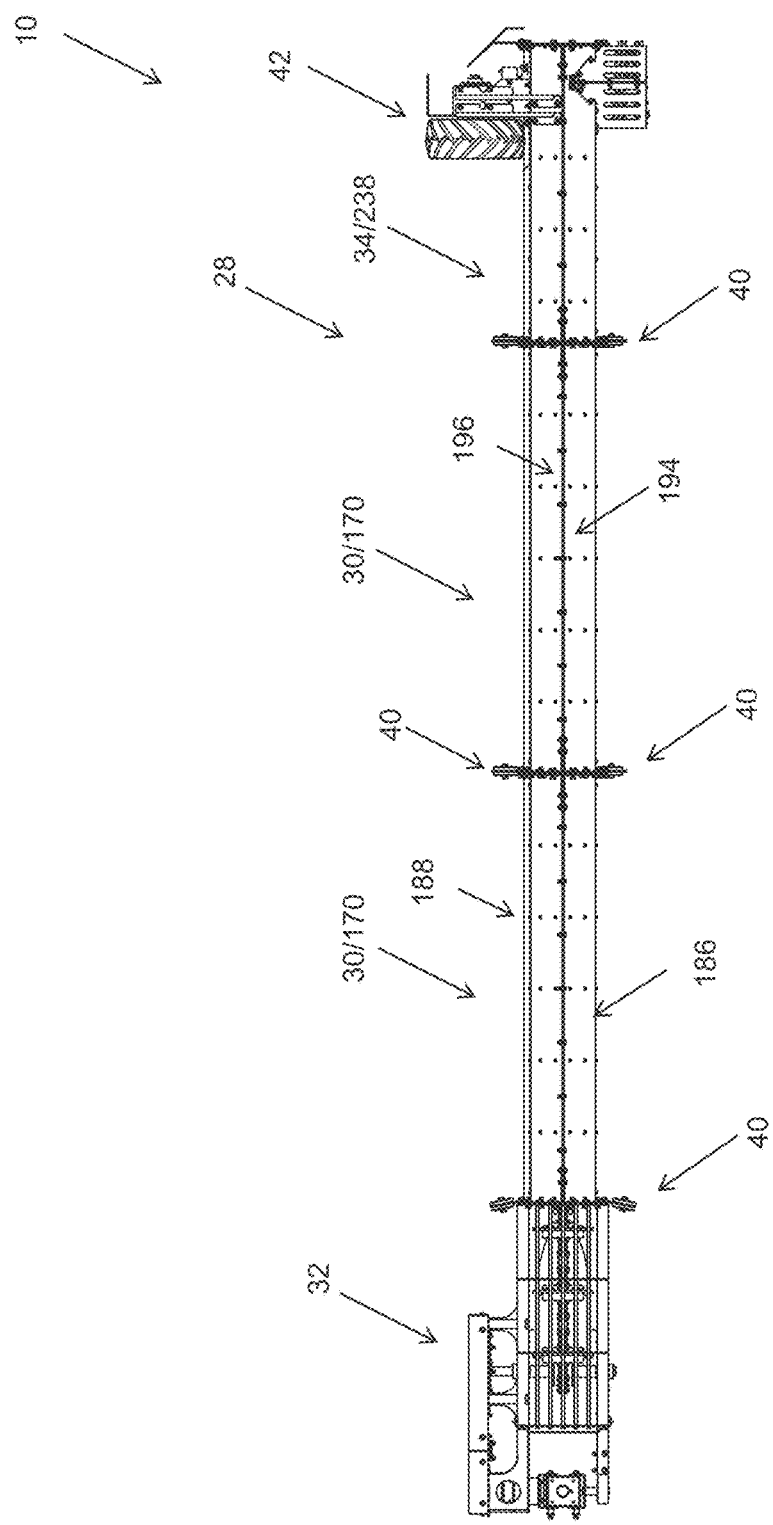
FIG. 50 shows a top view of a sweep of an exemplary sweep system, in accordance with one or more embodiments; the view showing a segmented agitator supporting an outward end of the sweep; the view showing a guard positioned over the agitator.
Figure 51:
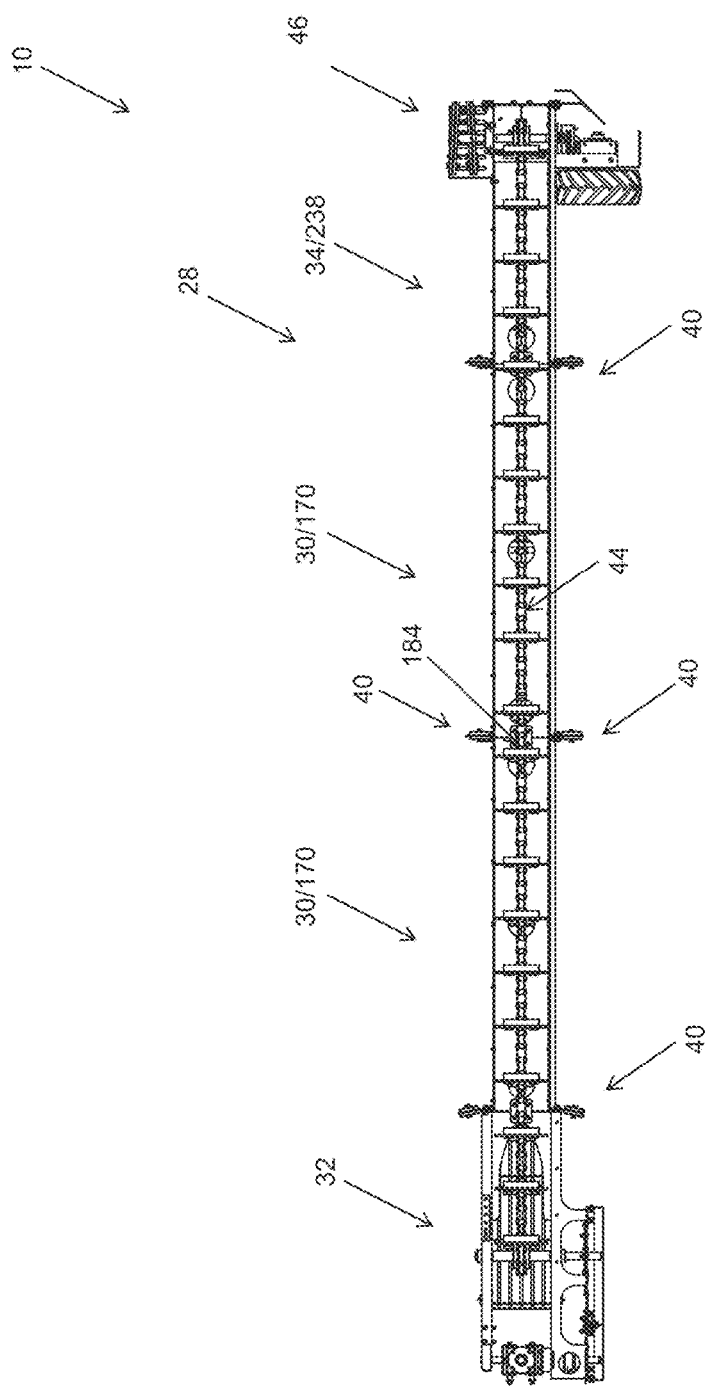
FIG. 51 shows a bottom view of a sweep of an exemplary sweep system, in accordance with one or more embodiments; the view showing a segmented agitator supporting an outward end of the sweep; the view showing a guard positioned over the agitator.
Figure 52:
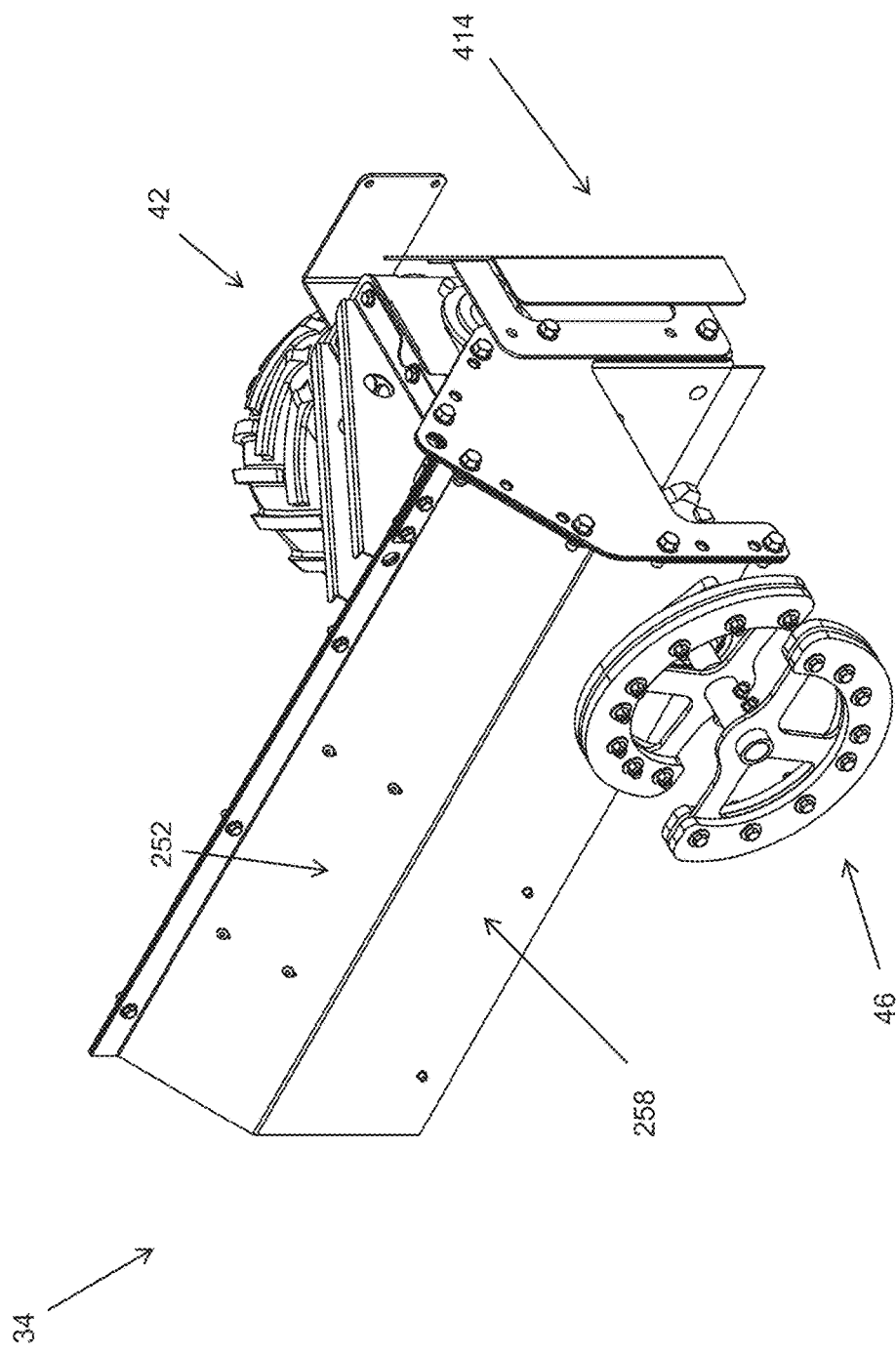
FIG. 52 shows an upper front left perspective view of a tail section of a sweep of an exemplary sweep system, in accordance with one or more embodiments; the view showing a drive wheel and a segmented agitator supporting an outward end of the tail section.
Figure 53:
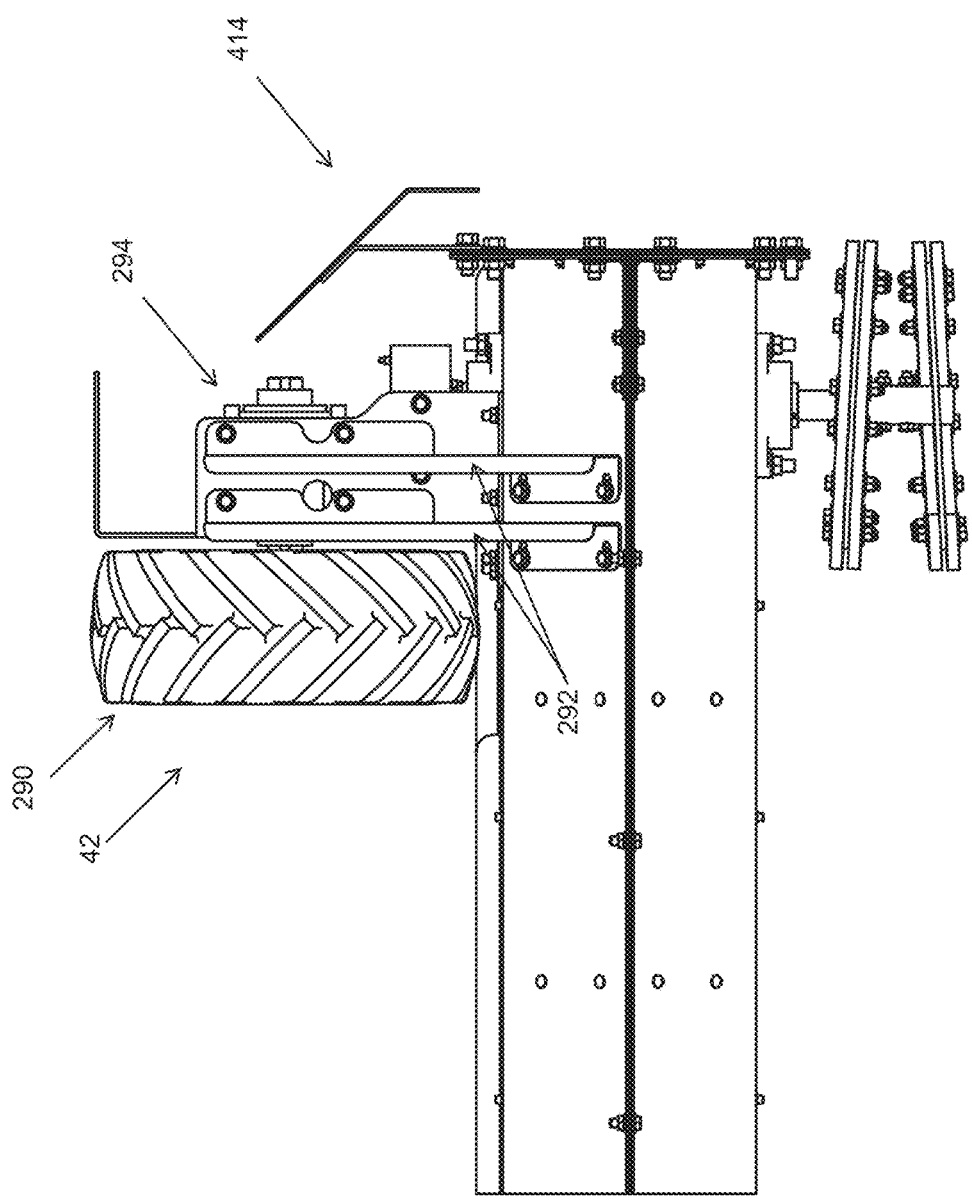
FIG. 53 shows a top view of a tail section of a sweep of an exemplary sweep system, in accordance with one or more embodiments; the view showing a drive wheel and a segmented agitator supporting an outward end of the tail section.
Figure 54:
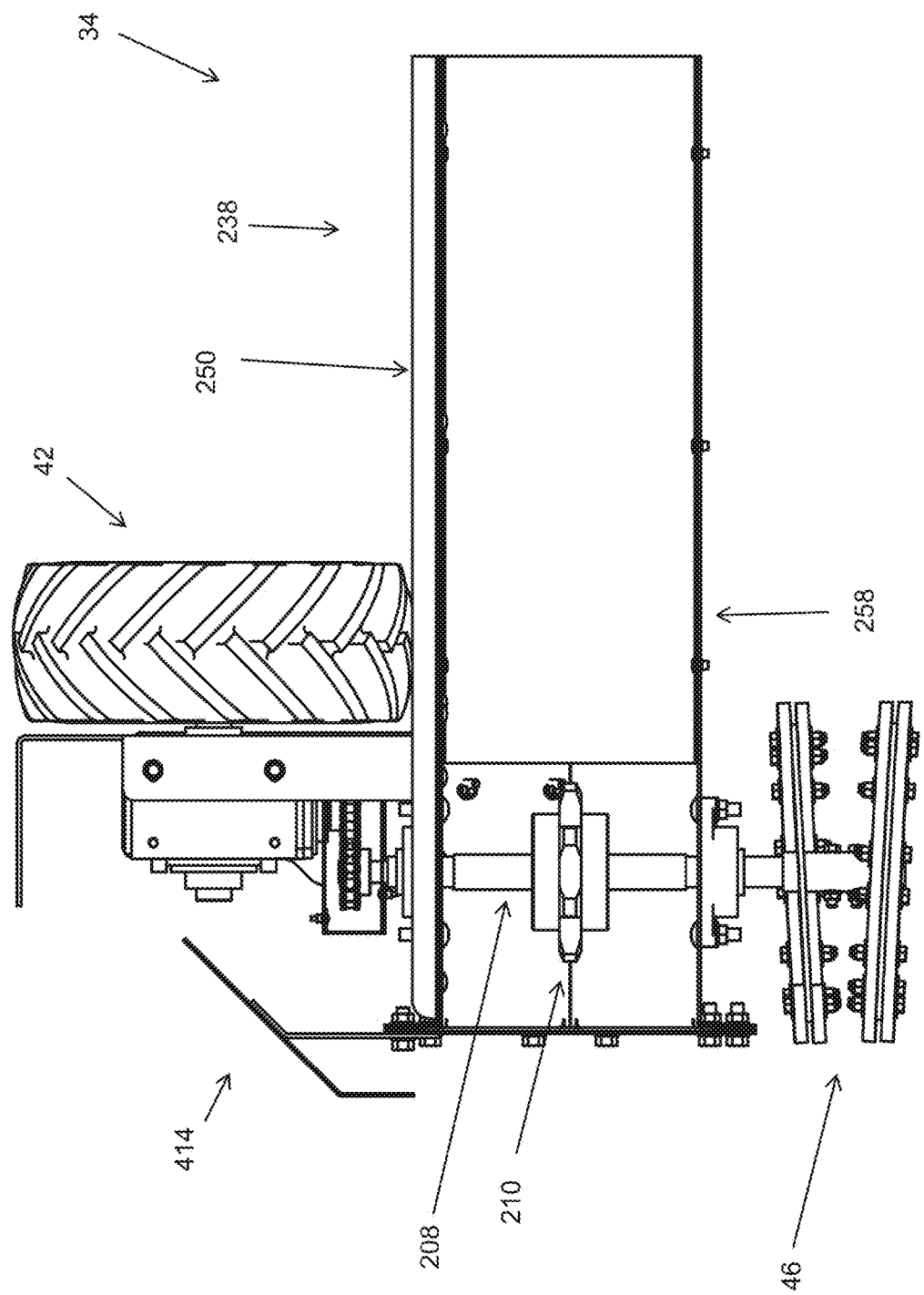
FIG. 54 shows a bottom view of a tail section of a sweep of an exemplary sweep system, in accordance with one or more embodiments; the view showing a drive wheel and a segmented agitator supporting an outward end of the tail section.
Figure 55:
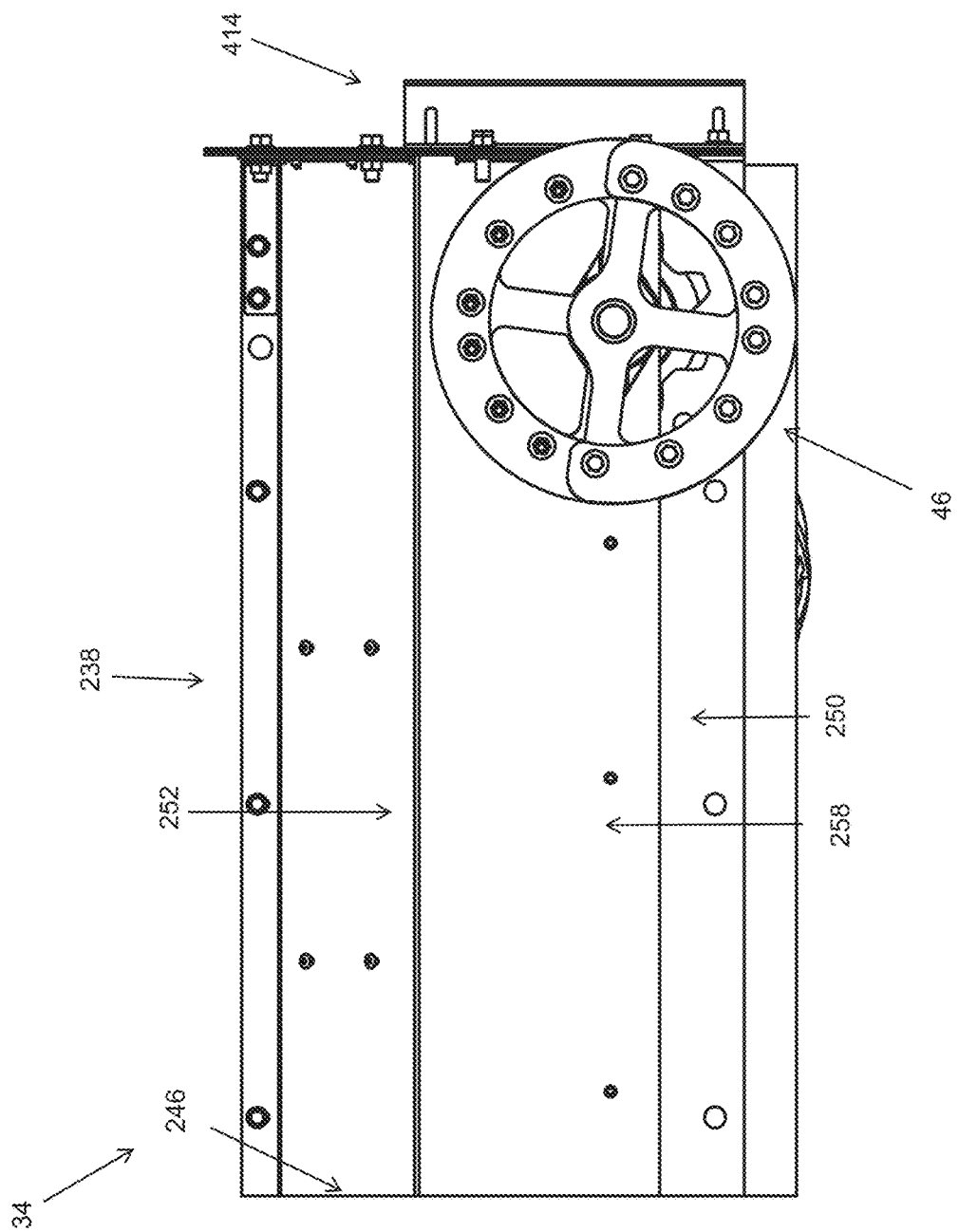
FIG. 55 shows a front view of a tail section of a sweep of an exemplary sweep system, in accordance with one or more embodiments; the view showing a segmented agitator supporting an outward end of the tail section.
Figure 56:
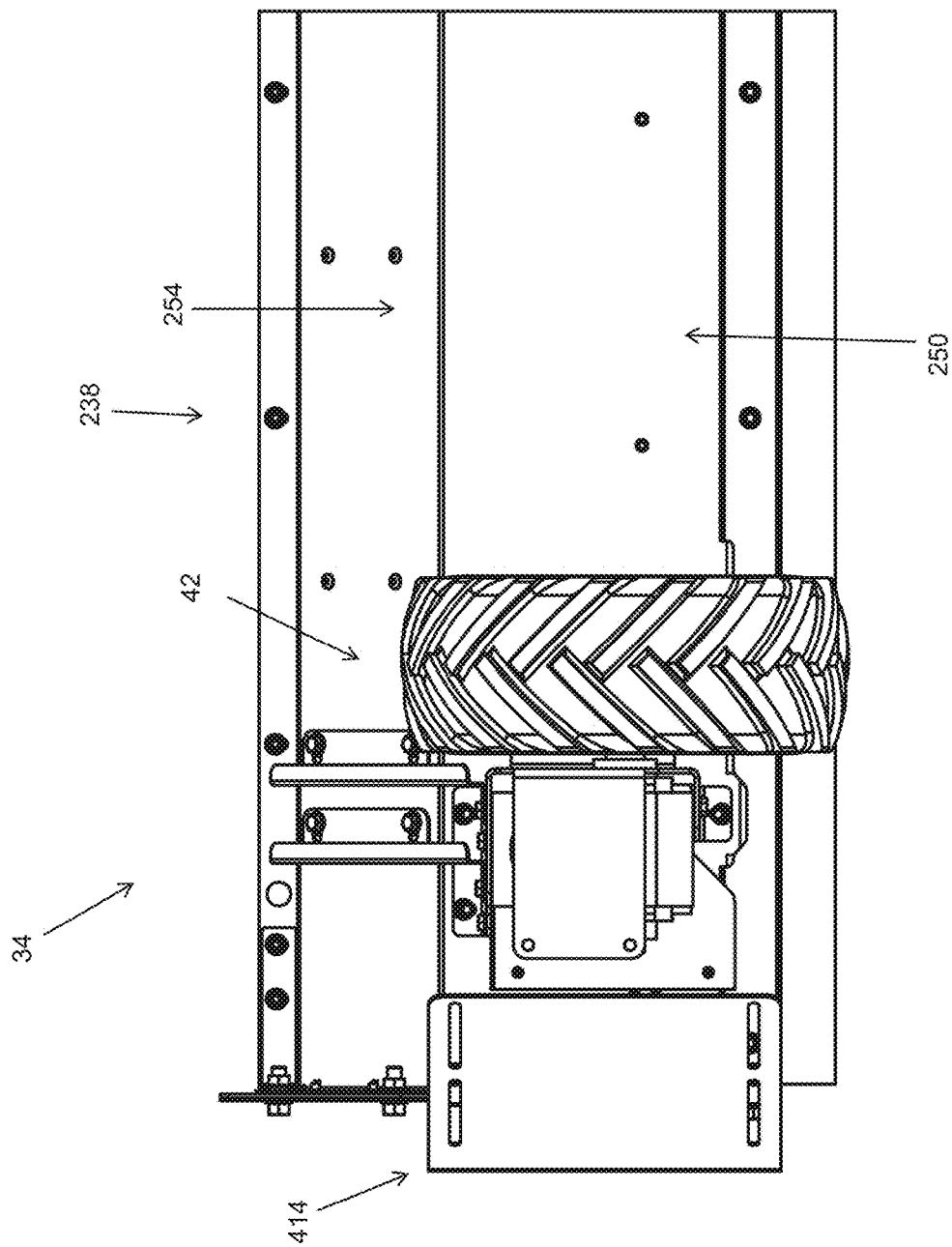
FIG. 56 shows a rear view of a tail section of a sweep of an exemplary sweep system, in accordance with one or more embodiments; the view showing a drive wheel supporting an outward end of the tail section.
Figure 57:
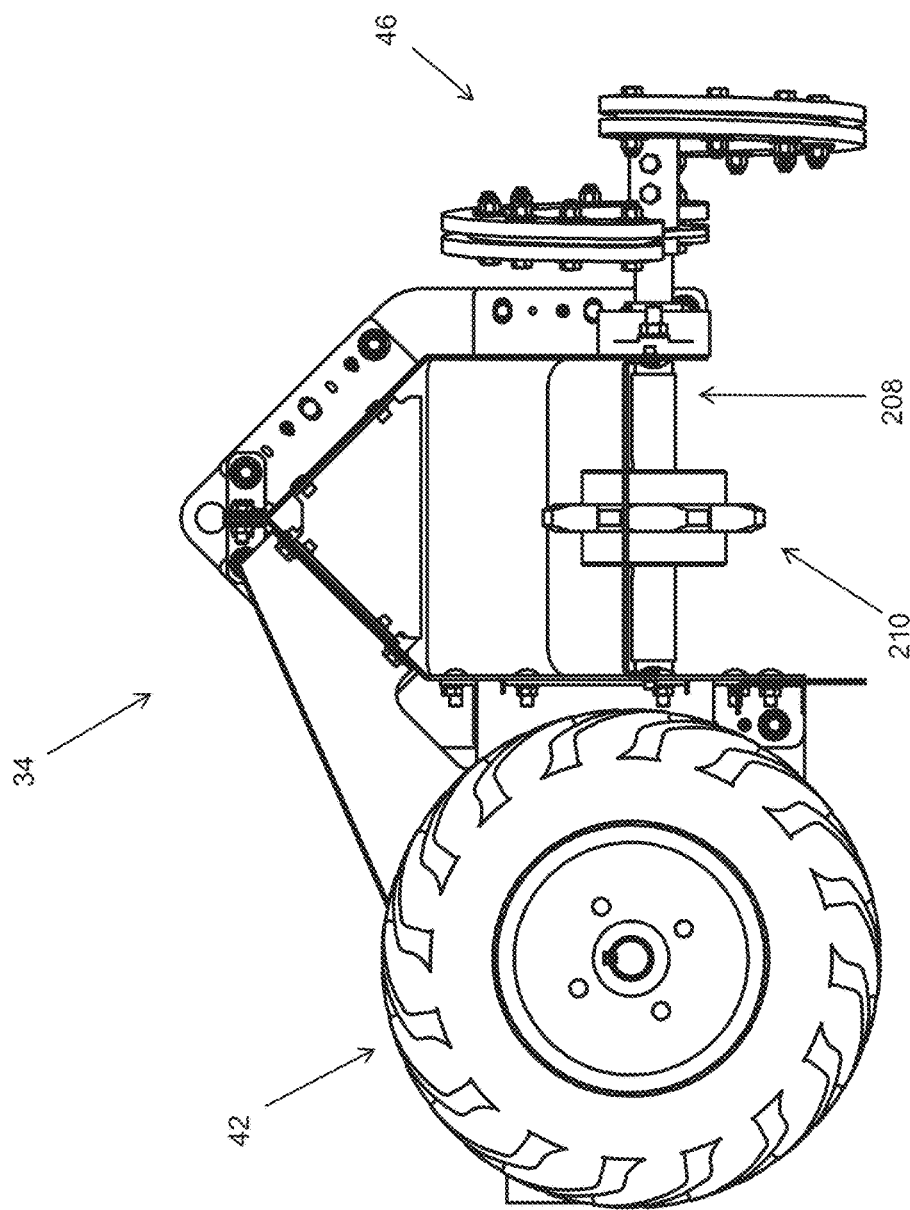
FIG. 57 shows a right side view of a tail section of a sweep of an exemplary sweep system, in accordance with one or more embodiments; the view showing a drive wheel and a segmented agitator supporting an outward end of the tail section.
Figure 58:
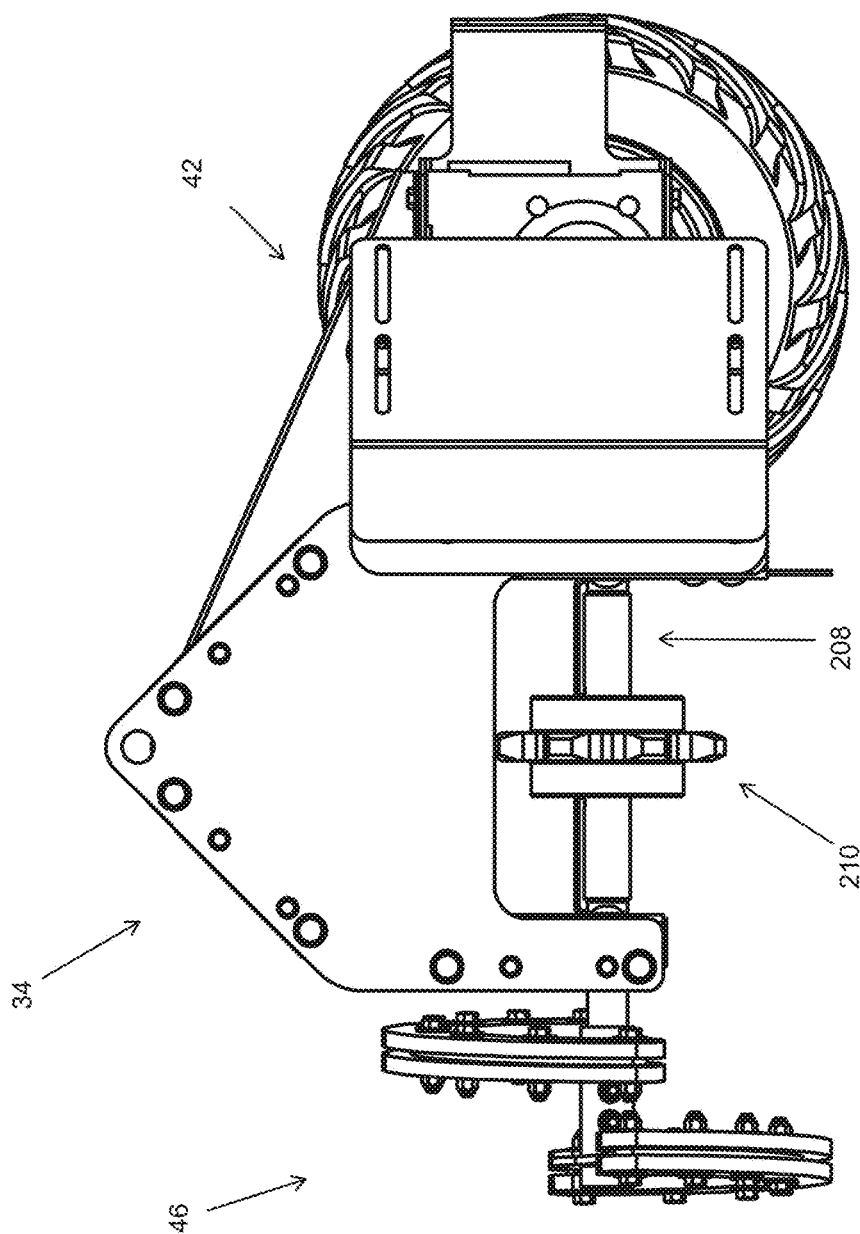
FIG. 58 shows a left side view of a tail section of a sweep of an exemplary sweep system, in accordance with one or more embodiments; the view showing a drive wheel and a segmented agitator supporting an outward end of the tail section.
Figure 59:
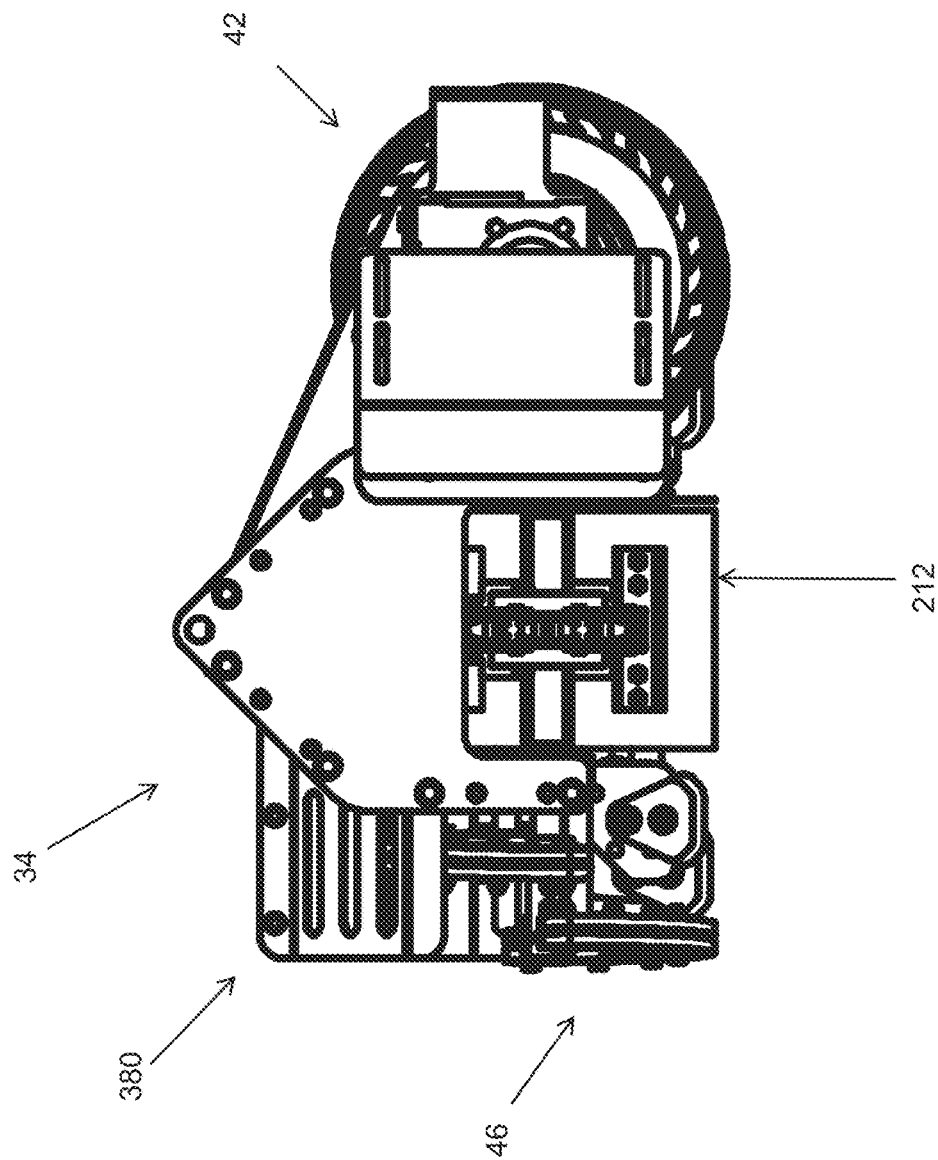
FIG. 59 shows a left side view of a tail section of a sweep of an exemplary sweep system, in accordance with one or more embodiments; the view showing a drive wheel and a segmented agitator supporting an outward end of the tail section.
Figure 60:
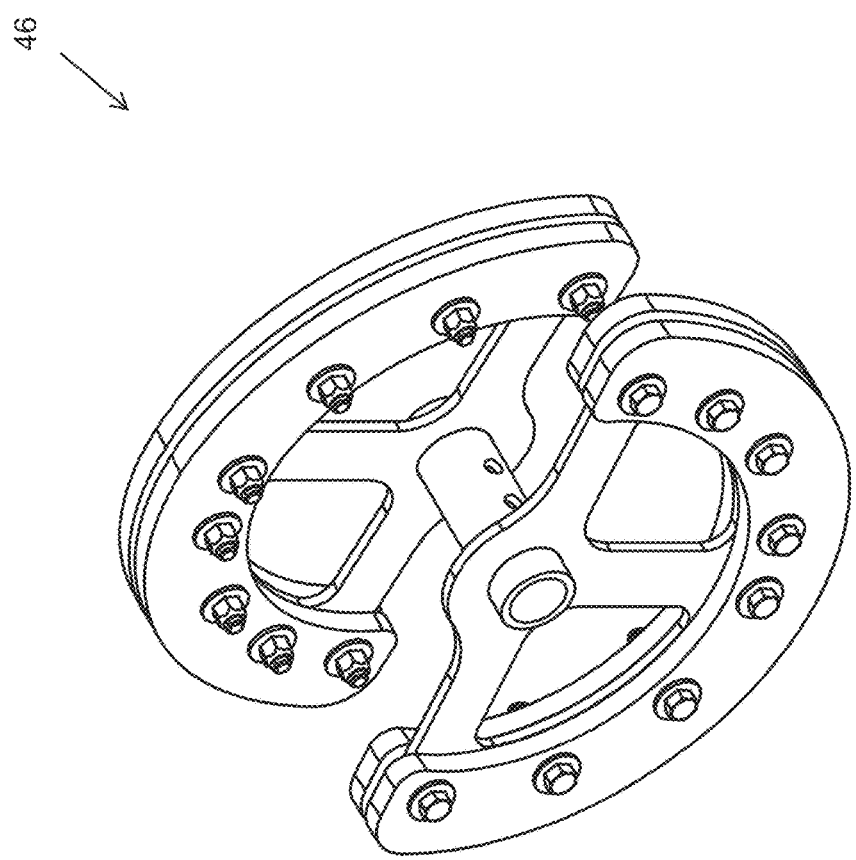
FIG. 60 shows an upper front left perspective view of a segmented agitator for use with a sweep system, in accordance with one or more embodiments.
Figure 61:
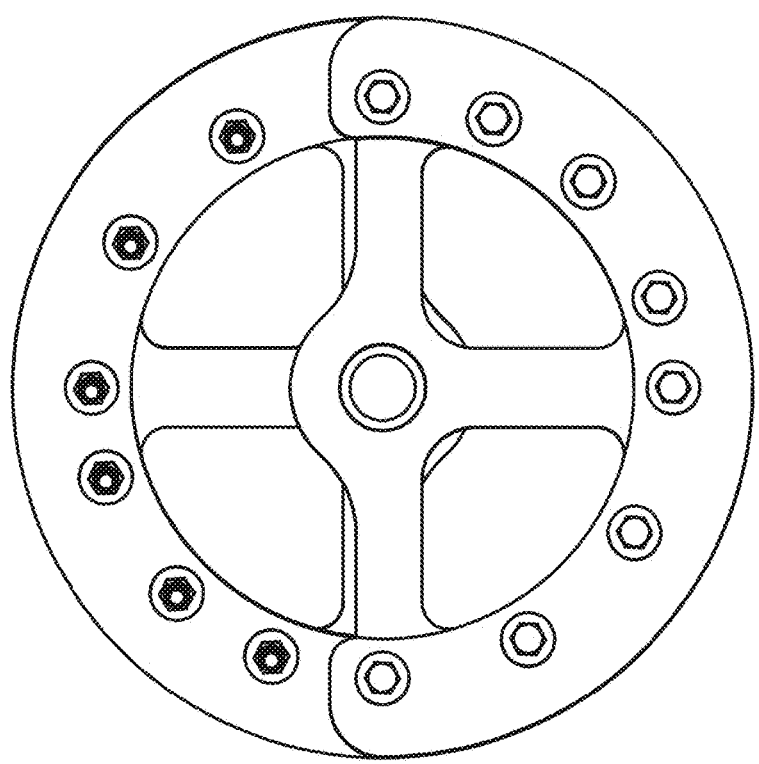
FIG. 61 shows a front view of a segmented agitator for use with a sweep system, in accordance with one or more embodiments.
Figure 62:
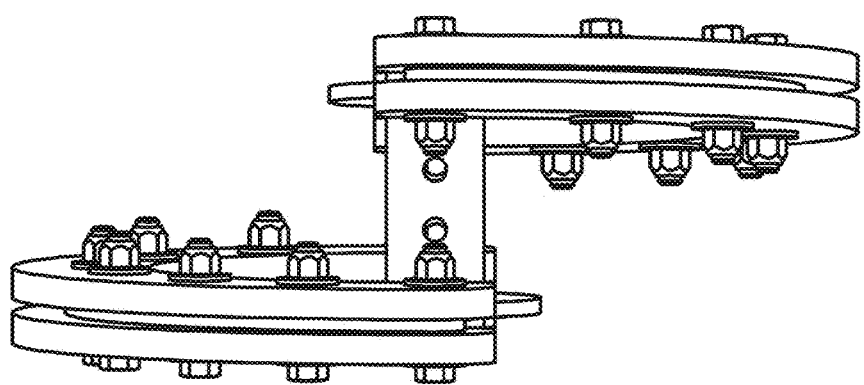
FIG. 62 shows a right side view of a segmented agitator for use with a sweep system, in accordance with one or more embodiments.
Figure 63:
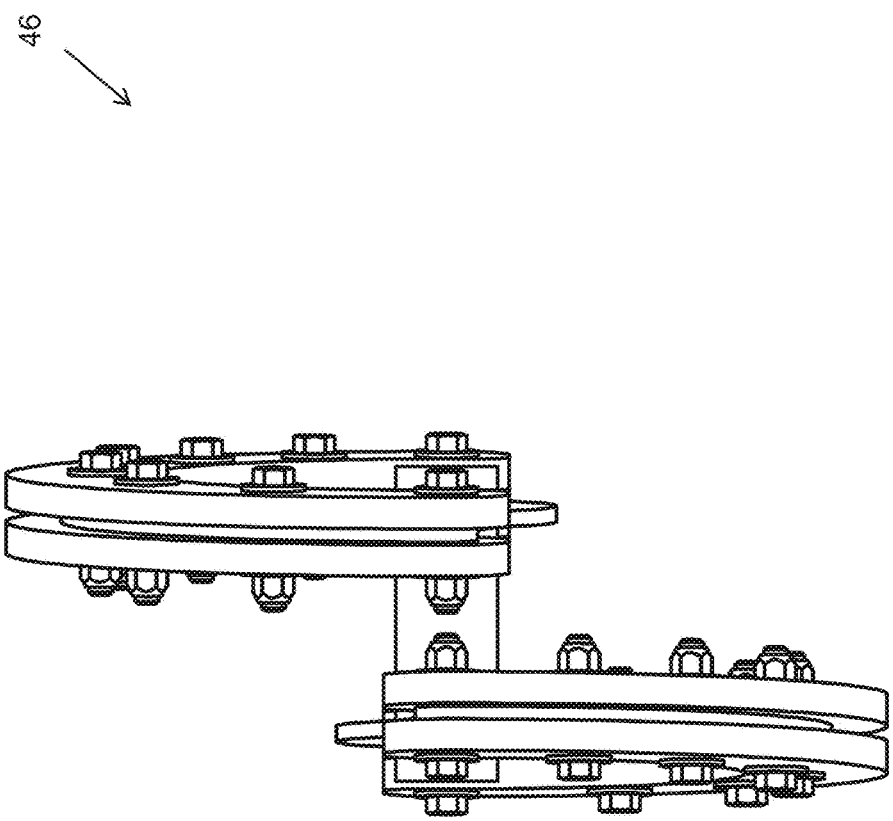
FIG. 63 shows a left side view of a segmented agitator for use with a sweep system, in accordance with one or more embodiments.
Figure 64:
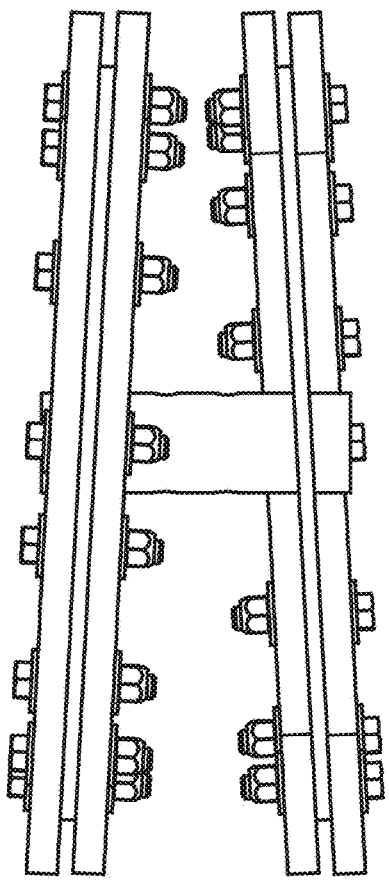
FIG. 64 shows a top view of a segmented agitator for use with a sweep system, in accordance with one or more embodiments.
Figure 66:
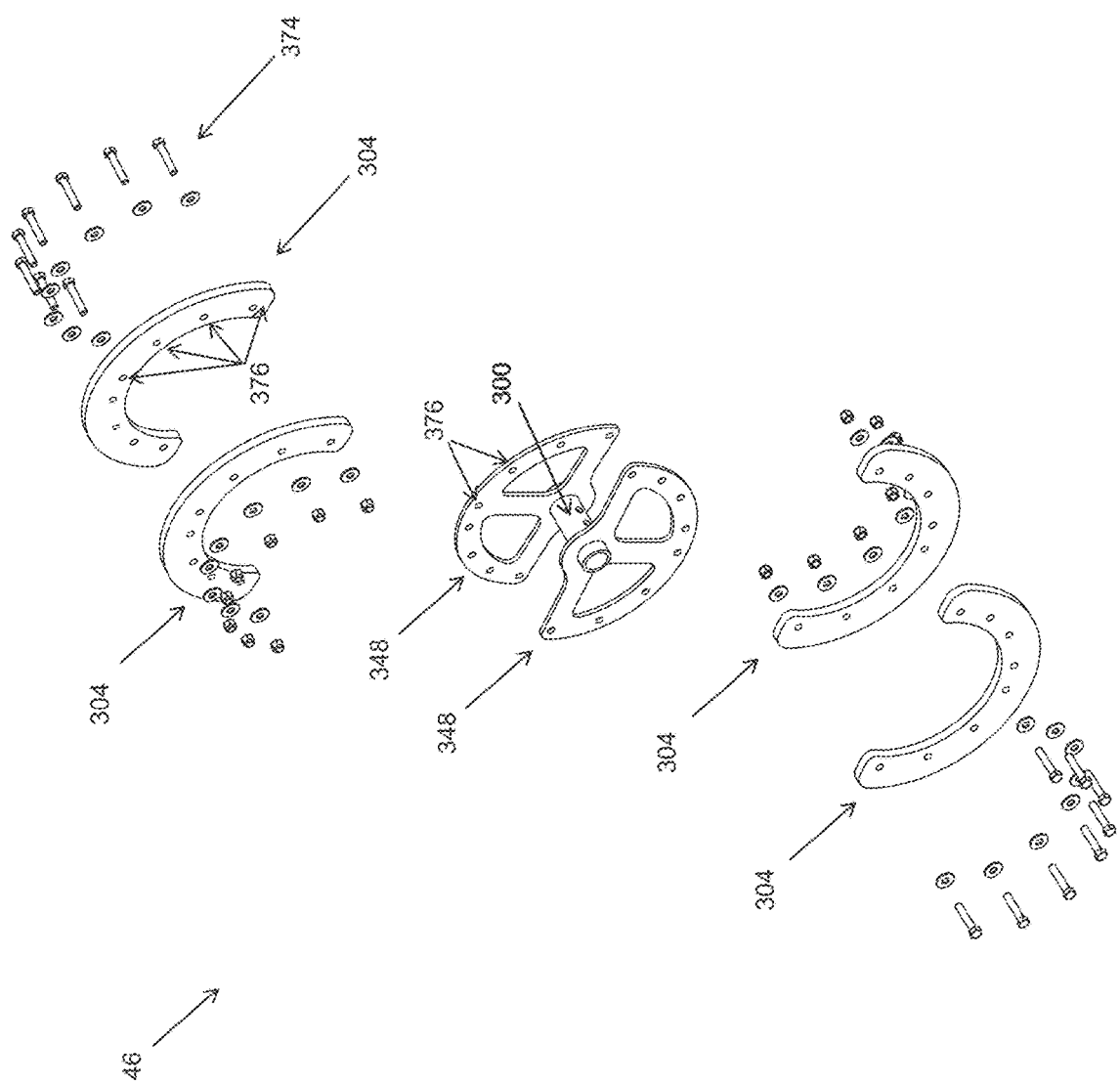
FIG. 66 shows an exploded upper front left perspective view of a segmented agitator for use with a sweep system, in accordance with one or more embodiments.
Figure 67:
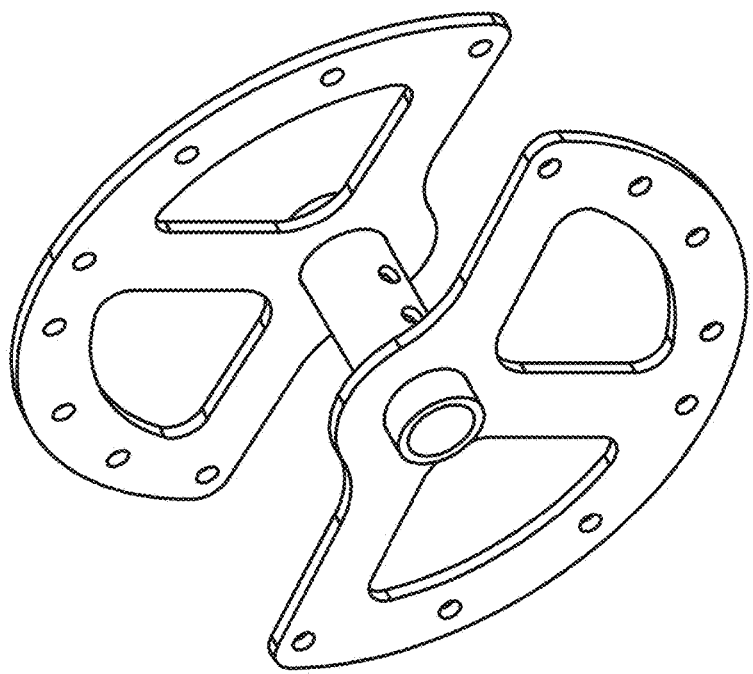
FIG. 67 shows an upper front left perspective view of a central hub of a segmented agitator for use with a sweep system, in accordance with one or more embodiments.
Figure 68:
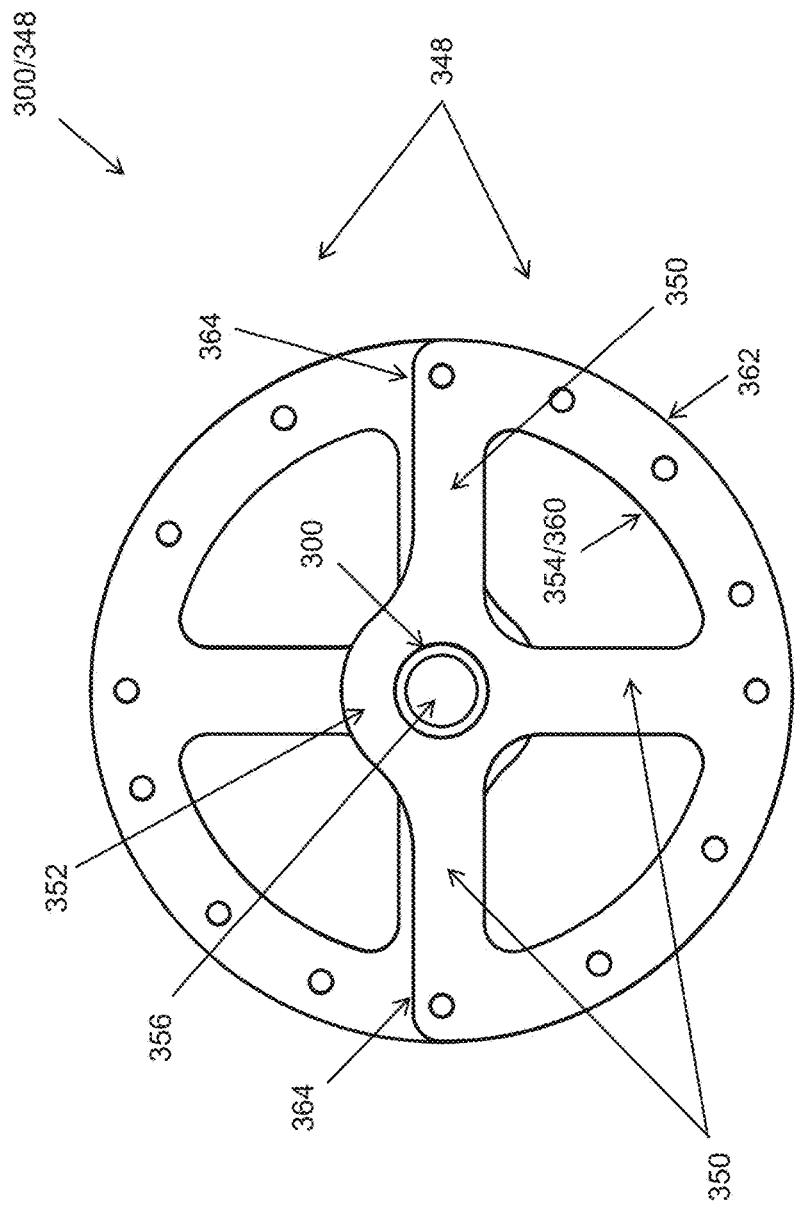
FIG. 68 shows a front view of a central hub of a segmented agitator for use with a sweep system, in accordance with one or more embodiments.
Figure 69:
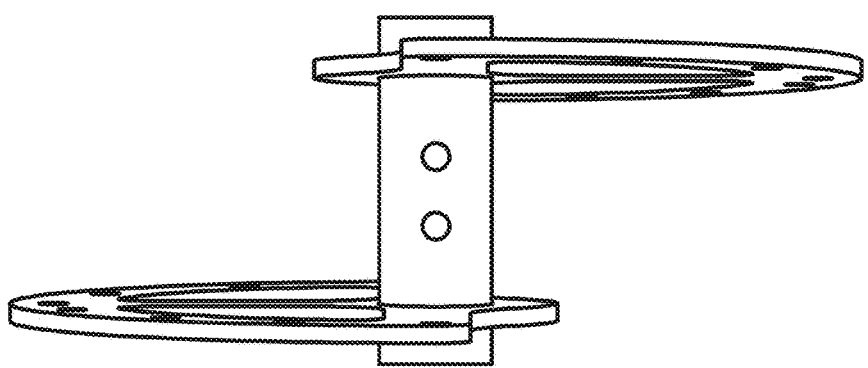
FIG. 69 shows a right side view of a central hub of a segmented agitator for use with a sweep system, in accordance with one or more embodiments.
Figure 70:
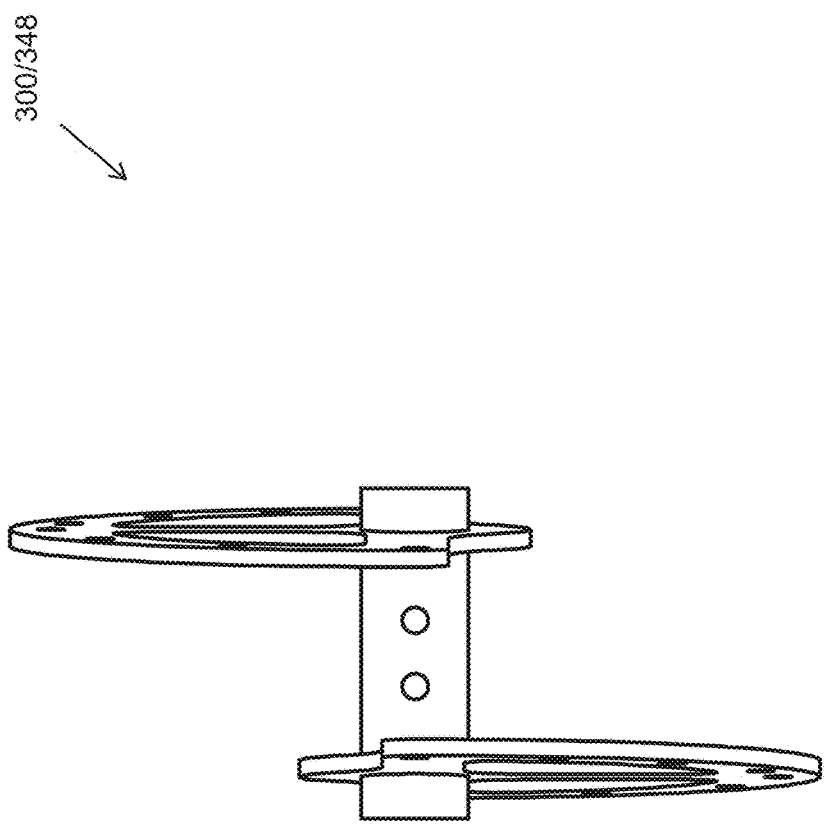
FIG. 70 shows a left side view of a central hub of a segmented agitator for use with a sweep system, in accordance with one or more embodiments.
Figure 71:
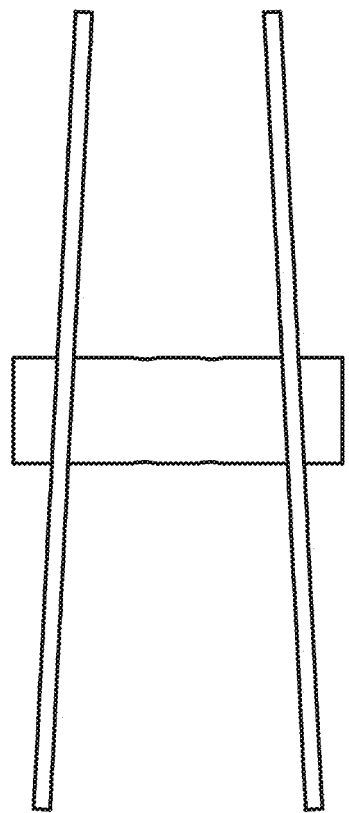
FIG. 71 shows a top view of a central hub of a segmented agitator for use with a sweep system, in accordance with one or more embodiments.
Figure 72:
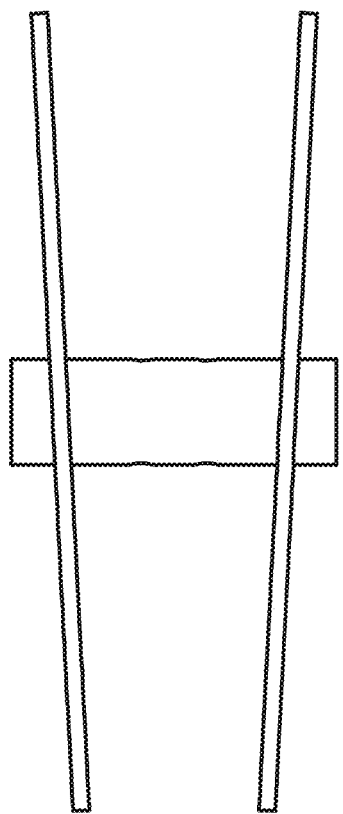
FIG. 72 shows a bottom view of a central hub of a segmented agitator for use with a sweep system, in accordance with one or more embodiments.

Alternative Agitator 46:

FIGS. 47-73 show system 10 having one example agitator 46 consistent with one or more arrangements. In this example arrangement, agitator 46 includes central hub 300, plurality of frame members 348, and a plurality of rim members 304.

Frame Members 348

Frame members 348 are formed of any suitable size, shape, and design and are configured to facilitate operable connection between central hub 300 and rim member 304. Frame members 348 provide a similar function as flighting 302 but may be easier and less costly to manufacture as they may be formed of generally planar components. In the arrangement shown, as one example, frame members 348 have three arms 350 that extend outward from a center member 352, where frame members 348 connect with central hub 300, to a semi-circular arc member 354 configured to facilitate connection with rim members 304. In this example arrangement, frame members 348 have a hole 356 in center member 352 that is configured to fit over and connect with central hub 300. In one or more arrangements, frame members 348 are connected with central hub 300 by welding. However, the arrangements are not so limited. Rather, it is contemplated that in some various arrangements, frame members 348 may connect with central hub 300 using various means and/or methods including but not limited to, for example, screwing, nailing, bolting, riveting, welding, gluing, affixing, locking, friction fitting, threading, and/or by any other manner or method or the like.

Arc member 354 is formed of any suitable size, shape, and design, and is configured to facilitate connection with one or more rim members 304. In the arrangement shown, semi-circular arc member 354 is a generally planar elongated member having a curved outer edge 362 and a curved inner edge 360 extending between opposing outer ends 364. In this example arrangement, a pair of rim members 304 are connected to semi-circular arc member 354 of each frame members 348, with the semi-circular arc member 354 sandwiched between the pair of rim members 304. In this example arrangement, rim members 304 are generally planar elongated members having a curved inner edge 368, a curved outer edge 370 extending between opposing outer ends 372. In this example arrangement, rim members 304 are connected to semi-circular arc member 354 by fasteners 374 extending through holes 376 in rim members 304 and semi-circular arc member 354. However, the arrangements are not so limited. Rather, it is contemplated that in some various arrangements, rim members 304 may connect with semi-circular arc member 354 using various means and/or methods including but not limited to, for example, screwing, nailing, bolting, riveting, welding, gluing, affixing, locking, friction fitting, threading, and/or by any other manner or method or the like.

Rim Members 304:

In this example arrangement, when rim members 304 are connected to semi-circular arc member 354, curved outer edges 370 of rim members 304 extend outward beyond curved outer edge 362 of semi-circular arc member 354. Curved outer edges 370 of rim members 304 provide an outer surface to facilitate contact with, and support of agitator 46, on floor 20 of grain bin while preventing curved outer edge 362 of semi-circular arc member 354 from contacting the floor 20.

In the arrangement shown, agitator 46 includes two frame members 348 with semi-circular arc member 354 and rim members 304 extending approximately 180 degrees. In this example arrangement, frame members 348 are positioned on opposite sides of central hub 300 so rim members 304 extend 360 degrees around central hub 300. In this manner, rim members 304 provided continuous contact with floor 20 of grain bin 12 as agitator 46 is rotated during operation. Although, agitator 46 is shown having two frame members 348 and rim members 304 extending 180 degrees, the arrangements are not so limited. Rather, it is contemplated that in one or more arrangements, agitator 46 may include more or fewer frame members 348 with rim members 304 extending greater than or less than 180 degrees.

In one or more arrangements, frame members 348 of agitator 46 are connected to central hub 300 at an angle so curved outer edges 370 of rim members 304 contact floor 20 at an angle at agitator 46 is rotated, which transfers some rearward frictional forces to the floor 20. The rearward frictional forces operate to move sweep 28 forward during operation.

Alternative Agitator 46:

While the agitators 46 may be primarily descried as having helical, semi-helical, and/or angled rim membered 304 to facilitate movement of sweep 28, the arrangements are not so limited. Rather, it is contemplated that in one or more arrangements, agitator 46 may be configured to facilitate agitation of grain at the outward end of sweep 28 and support sweep 28 on floor 20 without operating to move sweep forward.

For example, FIGS. 74-84 shown another agitator 46 that may be used on one or more arrangements. In this example arrangement, agitator 46 includes central hub 300, frame member 348 connected to central hub 300, and a pair of rim members 304 connected to frame member 348. In this example arrangement, frame member 348 has an overall circular shape formed by set of arms 350 that extend outward from center member 352, where frame members 348 connect with central hub 300, to a circular-shaped arc member 354 configured to facilitate connection with rim members 304. In this example arrangement, frame members 348 have a hole 356 in center member 352 that is configured to fit over and connect with central hub 300 (e.g., by welding). However, the arrangements are not so limited. Rather, it is contemplated that in some various arrangements, center member 352 may connect with central hub 300 using various means and/or methods including but not limited to, for example, screwing, nailing, bolting, riveting, welding, gluing, affixing, locking, friction fitting, threading, and/or by any other manner or method or the like.

In this example arrangement, arc member 354 is a generally planar ring extending in a circle between curved outer edge 362 and curved inner edge 360. In this example arrangement, a pair of rim members 304 are connected to arc member 354, with the arc member 354 sandwiched between the pair of rim members 304. In this example arrangement, rim members 304 are generally planar rings extending in a circle between curved inner edge 368 and curved outer edge 362. In this example arrangement, rim members 304 are connected to arc member 354 by fasteners 374 extending through holes 376 in rim members 304 and arc member 354. However, the arrangements are not so limited. Rather, it is contemplated that in some various arrangements, rim members 304 may connect with semi-circular arc member 354 using various means and/or methods including but not limited to, for example, screwing, nailing, bolting, riveting, welding, gluing, affixing, locking, friction fitting, threading, and/or by any other manner or method or the like.

While in some arrangement, agitators 46 may be described as having one or two rim members 304 connected to flighting 302 and/or frame members 348, the arrangements are not so limited. Rather, it is contemplated that in some various arrangements, agitators 46 may be adapted to include any number of rim members 304 flighting 302 and/or frame members 348.

In Operation:

In this arrangement, when sweep mechanism 44 is a paddle sweep, a drag chain, a belt, and/or another device that rotates around shaft 208 and/or sprocket 210, sweep mechanism 44 causes rotation of shaft 208. As shaft 208 rotates, this causes rotation of agitator 46. As agitator 46 rotates, a front end of a front rim member 304 and fasteners 374 engages and breaks up grain in front of sweep 28. In this example arrangement, fasteners 374 and edges of arms 350 of frame members 348 engage and help break up clumped grain as agitator 46 is rotated. However, the arrangements are not so limited. Rather, it is contemplated that agitator 46 may be adapted to includes various other structures and/or features to engage and break up grain as agitator 46 is rotated. In this example arrangement, broken up grain can flow rearward through openings between arms 350 of frame members 348 toward sweep 28, where it can be moved toward a sump 24 by sweep mechanism 44. In this manner, agitator 46 operates as an auger to break up and move grain rearward toward sweep.

In one or more arrangements, as agitator 46 rotates, agitator 46 is positioned so rim member 304 engages floor 20 and provides support for sweep 28 for example to ensure sweep 28 remains proper distance from floor 20 for proper operation of sweep mechanism 44. In this example arrangement, rims 304 of agitator 46 are formed of a material that provides a suitably low coefficient of kinetic friction between rims 304 and the floor 20 of grain bin 12 when agitator 46 is rotated that permits agitator 46 and outward end of sweep 28 to be moved forward (e.g., by a pusher 42). That is, as rims 304 rotate around an axis of rotation that is perpendicular to the length of sweep 28, the constantly rotating surface of rims 304 on floor 20 produces a low coefficient of friction (as compared to if rims 304 were not rotating) for the forward movement of the outward end of sweep 28 which is easily overcome by pusher 42. In this manner, agitator 46 operates to support the outward end of sweep 28 on the floor 20 of grain bin 12 thereby helping to maintain the proper height of the sweep 28 off of floor 20, while permitting agitator 46 to be moved forward when rotated to facilitate breaking up of grain.

Guard 380:

In one or more arrangements, sweep 28 of system 10 includes a guard 380 positioned above agitator 46. Guard 380 is formed of any suitable size, shape, and design and is configured to help prevent foreign objects (body parts, tools, shovel, etc. from contacting agitator 46, while permitting passage of grain downward toward agitator 46. In the arrangement shown, as one example, guard 380 has a generally triangular shape having a pair of upper side walls 382 jointed together at a peak 384. In this example arrangement, upper side walls 382 each have a generally planar rectangular shape extending outward and downward at an angle from the peak 384, between a forward edge 386 and a rearward edge 388, to lower edges 390.

In this example arrangement, upper side walls 382 have upper flanges 394 extending upward at peak 384 to facilitate joining of upper side walls together 382. In this example arrangement, upper side walls 382 have rear flanges 396 extending along rearward edges 388 to facilitate connection of guard 380 to sweep 28. In this example arrangement, guard 380 includes lower side walls 398 that extend further downward from lower edges 390. In the arrangement shown, guard 380 includes a plurality of openings 400 in upper side walls 382 and/or lower side walls 398 to permit moderated downward flow of grain through guard 380 to agitator 46.

Scraper 414:

In the arrangement shown, as one example, sweep 28 includes scraper 414. Scraper 414 is formed of any suitable size, shape and design and is configured to connect to the outward end of the elongated body 30 of sweep 28 and is configured to facilitate the inward movement of as much grain adjacent the interior surface of sidewall 16 as possible so that this grain may be captured by sweep 28 and moved to sump 24.

In the arrangement shown, as one example, scraper 414 is a generally square or rectangular planar member that extends a height between an upper edge 416 and a lower edge 418 and extends a length between a leading edge 420 and a trailing edge 422. In the arrangement shown, as one example, scraper 414 includes a bend 424 positioned a distance rearward of the trailing edge 422 and forward of the forward end of slots 426. Bend 424 extends vertically across scraper 414 from upper edge 416 and lower edge 418. In the arrangement shown, as one example, a pair of slots 426 are positioned in end-to-end relation with one another just inward from each of upper edge 416 and lower edge 418. These slots extend the majority of the distance between trailing edge 422 and bend 424 and facilitate connection to tail section 34.

In the arrangement shown, as one example, to facilitate the attachment of scraper 414 to tail section 34, the trailing side 188 of outward end frame 172 of tail section weldment 238 includes an upper arm 428, which is positioned adjacent the upper end of outward end frame 172, and a lower arm 430, which is positioned adjacent the lower end of outward end frame 172, that extend rearward from the trailing side 188 a distance. In the arrangement shown, as one example, the rearward trailing ends of upper arm 428 and lower arm 430 are bent out of plane with the other portions of outward end frame 172, and angle slightly toward pivot point 36 and the other portions of sweep 28 rearward of the bend. In the arrangement shown, these angled portions positioned at the trailing ends of upper arm 428 and lower arm 430 facilitate connection of the forward-facing surface of scraper 414 to upper arm 428 and lower arm 430 through fasteners 432.

Fasteners 432 extend through slots 426 in scraper 414 and into and/or through the trailing ends of upper arm 428 and lower arm 430 thereby rigidly affixing scraper 414 to tail section weldment 238. The position of scraper 414 may be adjusted by loosening fasteners 432 and sliding scraper 414 further outward or further rearward and then tightening the fasteners 432 again once scraper 414 is in its desired position. In this way, scraper 414 may be quickly and easily and precisely adjusted so as to ensure scraper 414 extends as close as is desired to the interior surface of grain bin 12 so as to capture as much grain as possible.

In the arrangement shown, as one example, when viewed from above or below, the leading edge 420 of scraper 414 extends past the outward end of the other portions of sweep 28 a distance. In this way, scraper 414 helps sweep 28 reach and capture grain positioned outward of the outward end of sweep 28, which is defined by outward end frame 172. This grain is outside of the reach of sweep mechanism 44, such as a paddle sweep, a drag chain, a conveyor, an auger, and/or any other form of a grain moving device. As such, without scraper 414 this grain will remain. With scraper 414, scraper 414 engages this grain and moves it from outside of the outward end of sweep 28 inward a distance, and into the travel path of sweep 28 such that this grain is captured by sweep 28 on a subsequent pass. In this way, the addition of scraper 414 improves the efficiency of sweep 28.

From the above discussion it will be appreciated that the sweep system 10 for grain bins improves upon the state of the art. More specifically, and without limitation, it will be appreciated that the sweep system 10 for grain bins: reduces or eliminates the need for a user to enter the grain bin; works effectively; is robust; is durable; can be used with all kinds of grain; has a long useful life; can be used with an elevated floor without damaging the elevated floor; can be used with paddle sweeps, auger sweeps, and/or any other configuration of a sweep; effectively removes the vast majority of grain from the grain bin; is efficient to use; improves safety; can be used with practically any grain bin; does not cause sagging or collapse of the elevated floor; is high quality; and/or helps to clear clumps in the grain; among countless other advantages and improvements.

It will be appreciated by those skilled in the art that other various modifications could be made to the device without parting from the spirit and scope of this disclosure. All such modifications and changes fall within the scope of the claims and are intended to be covered thereby.

SELECTED REFERENCE NUMERALS

10—Sweep System For Grain Bins
12—Grain Bin
14—Foundation (of Grain Bin 12)
16—Sidewall (of Grain Bin 12)
18—Peaked Roof (of Grain Bin 12)
20—Elevated Floor (of Grain Bin 12)
22—Floor Supports (of Grain Bin 12)
24—Sump (of Grain Bin 12)
26—Grain Conveyor (of Grain Bin 12)
28—Sweep (of System 10)
30—Elongated Body (of Sweep 28)
32—Head Section (of Sweep 28)
34—Tail Section (of Sweep 28)
36—Pivot Point (of Sweep 28)
40—Sweep Supports
42—Pusher (of Sweep 28)
44—Sweep Mechanism (of Sweep 28)
46—Agitator (of Sweep 28)

48—Scraper (of Sweep 28)
50—Electrical Lead (of Sweep 28) (not shown)
52—Upper End (of Floor Supports 22)
54—Lower End (of Floor Supports 22)
60—Planks (of Elevated Floor 20)
62—Opening (of Sump 24)
64—Gate (of Sump 24)
66—Control Mechanism (of Sump 24)
68—Horizontal Supports (of Sump 24)
70—Connectors (of Sump 24)
72—Vertical Supports (of Sump 24)
74—Upper Wall (of Grain Conveyor 26)
76—Mounting Plate (of System 10)
78—Hole (of Mounting Plate 76)
80—Housing (of Grain Conveyor 26)
82—Output End (of Grain Conveyor 26)
84—Hollow Interior (of Grain Conveyor 26)
86—Auger (of Grain Conveyor 26)
88—Shaft (of Grain Conveyor 26)
90—Flighting (of Grain Conveyor 26)
92—Motor
96—Wear Plates (of Elevated Floor 20)
100—Wear Tracks (of Elevated Floor 20)
102—Bridging Supports (of Grain Bin 12)
104—Horizontal Members (of Bridging Supports 102)
106—Vertical Members (of Bridging Supports 102)
108—Drive Housing (of Bridging Supports 102)
112—Outward End (of Head Section 32)
114—Inward End (of Head Section 32)
116—Arms (of Head Section 32)
118—Frame Members (of Head Section 32)
120—Bars (of Head Section)
122—Openings (of Head Section 32)
124—Gearbox (of Head Section 32)
126—Shaft (of Head Section 32)
128—Sprocket (of Head Section 32)
130—Chain (of Head Section 32)
132—Sprocket (of Head Section 32)
134—Collar (of Head Section 32)
136—Bracket (of Head Section 32)
138—Opening (in Arms 116)
140—Sides (of Opening 138)
142—Ends (of Opening 138)
144—Shaft (of Bracket 146)
146—Bracket (of Head Section 32)
158—Gearbox (of Grain Conveyor 26)
160—Shaft (of Gearbox 158)
162—Sprocket (of Shaft 160)
164—Chain (of Grain Conveyor 26)
166—Sprocket (of Gearbox 124)
170—Sections (of Elongated Body 30)
172—End Frame (of Sections 170)
184—Opening (of Sections 170)
186—Leading Edge (of Sections 170)
188—Trailing Edge (of Sections 170)
190—Back Plate (of Sections 170)
194—Front Cover Plate (of Sections 170)
196—Rear Cover Plate (of Sections 170)
200—Front Plate (of Sections 170)
204—Shaft (at Inward End of Sweep Mechanism 44)
206—Sprocket (at Inward End of Sweep Mechanism 44)
208—Shaft (at Outward End of Sweep Mechanism 44)
210—Sprocket (at Outward End of Sweep Mechanism 44)
212—Paddles (of Sweep Mechanism 44)
214—Links (of Sweep Mechanism 44)
220—Carrier Wheels
222—Rolling Member (of Carrier Wheels 220)
224—Axel (of Carrier Wheels 220)
226—Opposing Guides (of Carrier Wheels 220)
228—Attachment Plates (of Carrier Wheels 220)
238—Weldment (of Tail Section 34)
246—End Frame (of Weldment 238)
250—Back Plate (of Weldment 238)
252—Front Cover Plate (of Weldment 238)
254—Rear Cover Plate (of Weldment 238)
258—Front Plate (of Weldment 238)
270—Support Skids
272—Front Edge (of Support Skid 270)
274—Back Edge (of Support Skid 270)
276—Lower Edge (of Support Skid 270)
278—Upper End (of Support Skid 270)
280—Sloped Portions (of Lower Edge 276)
282—Low Friction Material
284—Brackets
290—Drive Wheel (of Pusher 42)
292—Mounting Assembly (of Pusher 42)
294—Drivetrain (of Pusher 42)
300—Central Hub (of Agitator 46)
302—Flighting (of Agitator 46)
304—Rim Member (of Agitator 46)
308—Tube (of Central Hub 300)
310—Rear End (of Tube 308)
312—Front End (of Tube 308)
314—Holes (of Tube 308)
316—Fasteners (of Central Hub 300)
320—Inner Edge (of Flighting 302)
322—Outer Edge (of Flighting 302)
324—Front End (of Flighting 302)
326—Rear End (of Flighting 302)
328—Interior Side (of Rim Member 304)
330—Exterior Side (of Rim Member 304)
332—Front Side (of Rim Member 304)
334—Back Side (of Rim Member 304)
336—Front End (of Rim Member 304)
338—Rear End (of Rim Member 304)
342—Channel (of Rim Member 304)
348—Semi-circular Frame Members (of Central Hub 300)
350—Arms (of Frame Members 348)
352—Center Member (of Frame Members 348)
354—Arc Member (of Frame Members 348)
356—Hole (of Center Member 352)
360—Curved Inner Edge (of Arc Member 354))
362—Curved Outer Edge (of Arc Member 354)
364—Opposing Ends (of Arc Member 354)
368—Curved Inner Edge (of Rim Member 304)
370—Curved Outer Edge (of Rim Member 304)
372—Opposing Ends (of Rim Member 304)
374—Fasteners (of Agitator)
376—Holes
380—Guard (of System 10)
382—Upper Side Walls (of Guard 380)
384—Peak
386—Forward Edge
388—Rearward Edge
390—Lower Edge
394—Upper Flanges
396—Rear Flanges
398—Lower Side Walls
400—Openings
414—Scrapper
416—Upper Edge (of Scraper 414)
418—Lower Edge (of Scraper 414)

420—Leading Edge (of Scraper 414)
422—Trailing Edge (of Scraper 414)
424—Bend (of Scraper 414)
426—Slots (of Scraper 414)
428—Upper Arm (of Outward End Frame 172)
430—Lower Arm (of Outward End Frame 172)
432—Fasteners (of Scraper 414)

What is claimed:

1. A system for a grain bin, comprising:
a sweep apparatus;
the sweep apparatus having an elongated body;
the elongated body extending a length from an outward end to an inward end;
an agitator;
the agitator operatively connected to the elongated body;
the agitator positioned adjacent the outward end of the of the elongated body;
wherein the agitator is configured to rotate, thereby agitating grain so as to facilitate removal of the grain by the sweep apparatus;
wherein the agitator is configured to rotate around an axis of rotation that is positioned at an angle relative to the length of the sweep apparatus;
wherein the agitator is configured to contact a floor of the grain bin in a manner so as to support the elongated body adjacent the outward end of the elongated body.

2. The system of claim 1, wherein the agitator has a helical configuration.

3. The system of claim 1, wherein the agitator is configured to drive the sweep apparatus forward around the grain bin.

4. The system of claim 1, wherein the agitator is configured to break up grain clumps positioned adjacent the outward end of the sweep apparatus.

5. The system of claim 1, wherein the agitator is configured to pull grain toward the sweep apparatus as it rotates.

6. The system of claim 1, wherein the axis of rotation is approximately perpendicular to the length of the sweep apparatus.

7. The system of claim 1, wherein the agitator includes a shaft having flighting extending around the shaft in a helical manner.

8. The system of claim 1, wherein the agitator is configured to engage the floor of the grain bin so as to drive the sweep apparatus forward as the agitator is rotated.

9. The system of claim 1, wherein the agitator is configured to maintain contact with the floor of the grain bin as the agitator is rotated.

10. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
wherein the agitator has an axis of rotation that extends in a direction forward from the elongated body of the sweep apparatus;
the agitator having a central hub;
the agitator having one or more arc-shaped rim members operably connected to the central hub;
wherein operation of the sweep apparatus causes the agitator to be rotated thereby agitating grain so as to facilitate removal of the grain by the sweep apparatus.

11. The system of claim 10, wherein the agitator is helical in shape.

12. The system of claim 10, wherein the agitator effectively forms a helical shape.

13. The system of claim 10, wherein the agitator helps to pull the sweep apparatus forward while simultaneously breaking up grain.

14. The system of claim 10, wherein the agitator helps to pull the sweep apparatus forward and wherein the agitator has an axis of rotation that is approximately perpendicular to the length of the sweep apparatus.

15. The system of claim 10, wherein the agitator includes a shaft having flighting extending around the shaft in a helical manner.

16. The system of claim 10, wherein the agitator is positioned adjacent a leading side of the elongated body.

17. The system of claim 10, wherein the one or more arc-shaped rim members are oriented in a helical path.

18. The system of claim 10, wherein the agitator is configured to contact a floor of the grain bin and support the elongate elongated body of the sweep apparatus.

19. The system of claim 10, wherein the agitator is configured to help move the outward end of the elongated body forward when the agitator is rotated.

20. The system of claim 10, wherein the one or more arc-shaped rim members are operably connected to the central hub by a set of connection members.

21. The system of claim 10, further comprising a drive system connected adjacent the outward end of the elongated body;
wherein the drive system is configured to contact with a floor of the grain bin such and move the outward end of the elongated body forward, and thereby rotate the elongated body around the pivot point.

22. The system of claim 10, wherein the outward end of the elongated body travels in a circular path around the pivot point;
a scraper attached adjacent the outward end of the elongated body;
the scraper configured to direct grain that is positioned outside of a circumference of the circular path to a position behind the elongated body that is within the circumference of the circular path as the elongated body rotates around the grain bin.

23. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
the agitator having a central hub;
the agitator having one or more arc-shaped rim members operably connected to the central hub;

wherein operation of the sweep apparatus causes the agitator to be rotated thereby agitating grain so as to facilitate removal of the grain by the sweep apparatus, and
wherein the one or more arc-shaped rim members have a circular ring shape.

24. A system for a grain bin, comprising:
a sweep apparatus,
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
the agitator having a central hub;
the agitator having one or more arc-shaped rim members operably connected to the central hub;
wherein operation of the sweep apparatus causes the agitator to be rotated thereby agitating grain so as to facilitate removal of the grain by the sweep apparatus;
wherein the one or more arc-shaped rim members are operably connected to the central hub by a set of connection members;
wherein the connection members are formed primarily of a first material;
and wherein the one or more arc-shaped rim members are formed of a second material;
wherein the second material has a lower coefficient of friction than the first material.

25. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
the agitator having a central hub;
the agitator having one or more arc-shaped rim members operably connected to the central hub;
wherein operation of the sweep apparatus causes the agitator to be rotated thereby agitating grain so as to facilitate removal of the grain by the sweep apparatus;
wherein the one or more arc-shaped rim members are operably connected to the central hub by a set of connection members;
wherein the connection members are formed primarily of a metallic material;
and wherein the one or more arc-shaped rim members are formed of a non-metallic material.

26. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
the agitator having a central hub;
the agitator having one or more arc-shaped rim members operably connected to the central hub;
wherein operation of the sweep apparatus causes the agitator to be rotated thereby agitating grain so as to facilitate removal of the grain by the sweep apparatus; and
wherein the one or more arc-shaped rim members are formed of an ultra-high molecular weight (UHMW) material.

27. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
wherein operation of the sweep apparatus causes the agitator to be rotated thereby agitating grain so as to facilitate removal of the grain by the sweep apparatus;
wherein the elongated body houses a sweep mechanism having a plurality of links and paddles configured to move grain inward toward the inward end of the elongated body when operated;
wherein the sweep mechanism is mechanically connected to the agitator and is configured to cause the agitator to rotate when the sweep mechanism is operated.

28. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
wherein operation of the sweep apparatus causes the agitator to be rotated thereby agitating grain so as to facilitate removal of the grain by the sweep apparatus, and
wherein a position where the agitator connected to the elongated body is adjustable along a length of the elongated body.

29. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
wherein operation of the sweep apparatus causes the agitator to be rotated thereby agitating grain so as to facilitate removal of the grain by the sweep apparatus;
further comprising at least one skid connected to the sweep apparatus;
wherein the skid is configured to contact a floor of the grain bin so as to support the sweep apparatus;
wherein the skid is configured to slide along the floor as the elongated body rotates around the grain bin.

30. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the elongated body is configured to rotate around the pivot point in a first rotational direction;
an agitator;
the agitator operatively connected to the elongated body;
wherein operation of the sweep apparatus causes the agitator to be rotated thereby agitating grain so as to facilitate removal of the grain by the sweep apparatus; and
wherein the agitator is positioned adjacent a leading side of the elongated body;
further comprising a second agitator positioned adjacent a trailing side of the elongated body.

31. A system for a grain bin, comprising:
a sweep apparatus;
the sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
a drive mechanism;
the drive mechanism configured to rotate the elongated body around the pivot point in a first rotational direction;
wherein the drive mechanism helps to pull the sweep apparatus forward
wherein the agitator is configured to rotate around an axis of rotation that is positioned at an angle relative to the length of the sweep apparatus,
wherein the drive mechanism is configured to break up grain clumps positioned adjacent the outward end of the sweep apparatus.

32. The system of claim 31, wherein the drive mechanism is configured to pull grain toward the sweep apparatus as the drive mechanism rotates.

33. The system of claim 31, wherein the drive mechanism is configured to pull the sweep apparatus forward as the drive mechanism rotates.

34. The system of claim 31, wherein the drive mechanism includes a shaft having flighting extending around the shaft in a helical manner.

35. The system of claim 31, wherein the drive mechanism is configured to engage a floor of the grain bin so as to drive the sweep apparatus forward.

36. The system of claim 31, wherein the drive mechanism is configured to support the outward end of the sweep apparatus.

37. The system of claim 31, wherein the drive mechanism is helical in shape.

38. The system of claim 31, wherein the drive mechanism effectively forms a helical shape.

39. The system of claim 31, wherein the drive mechanism helps to pull the sweep apparatus forward while simultaneously breaking up grain.

40. The system of claim 31, wherein the drive mechanism has an axis of rotation that is approximately perpendicular to the length of the sweep apparatus.

41. A system for a grain bin, comprising:
a sweep apparatus;
the sweep apparatus having an elongated body;
the elongated body extending a length from an outward end to an inward end;
an agitator;
the agitator operatively connected to the elongated body;
the agitator positioned adjacent the outward end of the elongated body;
wherein the agitator is configured to rotate, thereby agitating grain so as to facilitate removal of the grain by the sweep apparatus;
wherein the agitator is configured to contact a floor of the grain bin in a manner so as to support the elongated body adjacent the outward end of the elongated body;
a drive wheel;
wherein the drive wheel is configured to move the outward end of the elongated body forward and rotate the elongated body around a pivot point in a first rotational direction.

* * * * *